(12) United States Patent
Du

(10) Patent No.: US 10,295,784 B2
(45) Date of Patent: *May 21, 2019

(54) IMAGING SYSTEM WITH MOVABLE TRAY OF SELECTABLE OPTICAL ELEMENTS

(71) Applicant: Xing Du, Newport Beach, CA (US)

(72) Inventor: Xing Du, Newport Beach, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 15/389,176

(22) Filed: Dec. 22, 2016

(65) Prior Publication Data

US 2017/0102515 A1 Apr. 13, 2017

Related U.S. Application Data

(63) Continuation-in-part of application No. 15/360,764, filed on Nov. 23, 2016, which is a
(Continued)

(30) Foreign Application Priority Data

May 13, 2015 (CN) .......................... 2015 1 0243445
May 13, 2015 (CN) ...................... 2015 2 0307159 U

(51) Int. Cl.
  *G02B 7/16* (2006.01)
  *G02B 27/64* (2006.01)
  (Continued)

(52) U.S. Cl.
  CPC .............. *G02B 7/16* (2013.01); *G02B 7/006* (2013.01); *G02B 7/04* (2013.01); *G02B 13/0065* (2013.01);
  (Continued)

(58) Field of Classification Search
  CPC . G02B 7/16; G02B 7/006; G02B 7/04; G02B 13/0068; G02B 13/0075; G02B 13/009; G02B 27/646
  (Continued)

(56) References Cited

U.S. PATENT DOCUMENTS 5,113,332 A 5/1992 Richardson
5,128,808 A 7/1992 Dosaka
(Continued)

FOREIGN PATENT DOCUMENTS

CN 103513394 1/2014
CN 203535358 4/2014
(Continued)

OTHER PUBLICATIONS

"U.S. Appl. No. 14/673,580, Non Final Office Action dated Feb. 20, 2018", 12 pgs.
(Continued)

*Primary Examiner* — Kristina M Deherrera
(74) *Attorney, Agent, or Firm* — Schwegman Lundberg & Woessner, P.A.

(57) ABSTRACT

An imaging system for directing one or more optical signals to one or more imaging elements is provided. The imaging system may include an optical element tray. The optical element tray may include optical elements having optical characteristics different from each other. The optical element tray may be configured to be moveable to form one or more optical paths each allowing an optical signal to travel to an imaging element through none, one, or several of the optical elements. In various embodiments, the one or more optical paths may each be selected from a plurality of linear and nonlinear paths formed by the optical elements in the optical element tray and/or additional optical elements external to the optical element tray. In some embodiments, the optical element tray may be moveable along its axis of rotation and/or rotated to enhance image stability of the imaging system.

18 Claims, 24 Drawing Sheets

Related U.S. Application Data continuation-in-part of application No. PCT/CN2015/084913, filed on Jul. 23, 2015, which is a continuation-in-part of application No. 14/612,253, filed on Feb. 2, 2015, now abandoned, and a continuation-in-part of application No. 14/673,580, filed on Mar. 30, 2015, now Pat. No. 10,126,531.

(51) Int. Cl.
  *G02B 13/00* (2006.01)
  *G02B 7/00* (2006.01)
  *G02B 7/04* (2006.01)

(52) U.S. Cl.
  CPC ....... *G02B 13/0075* (2013.01); *G02B 27/646* (2013.01)

(58) Field of Classification Search
  USPC .................................................. 359/821, 557
  See application file for complete search history.

(56) References Cited

U.S. PATENT DOCUMENTS

| | | | |
|---|---|---|---|
| 5,576,897 | A | 11/1996 | Kuo |
| 5,617,260 | A | 4/1997 | McNiven et al. |
| 5,638,222 | A | 6/1997 | Shigehara |
| 5,687,031 | A | 11/1997 | Ishihara |
| 5,818,637 | A | 10/1998 | Hoover et al. |
| 7,835,091 | B2 | 11/2010 | Tseng et al. |
| 8,477,311 | B2 * | 7/2013 | Russell ............... G01J 3/02 356/417 |
| 10,126,531 | B2 | 11/2018 | Du |
| 2002/0141023 | A1 | 10/2002 | Yamada et al. |
| 2011/0280013 | A1 * | 11/2011 | Tafas ............... G02B 21/06 362/232 |
| 2012/0121244 | A1 | 5/2012 | Stavely |
| 2013/0028591 | A1 | 1/2013 | Hicks |
| 2014/0078594 | A1 * | 3/2014 | Springer ............... G02B 7/16 359/672 |
| 2016/0223781 | A1 | 8/2016 | Du |
| 2016/0223783 | A1 | 8/2016 | Du |
| 2017/0139181 | A1 | 5/2017 | Du |

FOREIGN PATENT DOCUMENTS

| | | |
|---|---|---|
| CN | 203982057 | 12/2014 |
| WO | 2013094811 | 6/2013 |

OTHER PUBLICATIONS

"U.S. Appl. No. 15/360,764, Non Final Office Action dated Mar. 27, 2018", 16 pgs.
"U.S. Appl. No. 14/673,580, Examiner Interview Summary dated May 17, 2018", 3 pgs.
"U.S. Appl. No. 14/673,580, Response filed May 15, 2018 to Non Final Office Action dated Feb. 20, 2018", 12 pgs.
U.S. Appl. No. 15/360,764, Response filed Jun. 26, 2018 to Non Final Office Action dated Mar. 27, 2018, 17 pgs.
"International Application Serial No. PCT/CN2015/084913, International Search Report dated Nov. 11, 2015", (w/ English Translation, 11 pgs.
"International Application Serial No. PCT/CN2015/084913, Written Opinion dated Nov. 11, 2015", 5 pgs.
"U.S. Appl. No. 14/612,253, Non-Final Office Action dated Oct. 3, 2016", 17 pgs.
"U.S. Appl. No. 14/612,253, Preliminary Amendment filed Mar. 13, 2015", 6 pgs.
"U.S. Appl. No. 14/612,253, Preliminary Amendment filed Mar. 24, 2015", 69 pgs.
"U.S. Appl. No. 14/673,580, Non Final Office Action dated Jul. 27, 2016", 15 pgs.
"U.S. Appl. No. 14/673,580, Response filed Jun. 29, 2017 to Final Office Action dated May 5, 2017", 10 pgs.
"U.S. Appl. No. 14/673,580, Advisory Action dated Jul. 14, 2017", 5 pgs.
"U.S. Appl. No. 14/673,580, Final Office Action dated May 5, 2017", 17 pgs.
"U.S. Appl. No. 14/673,580, Response filed Oct. 27, 2016 to Non Final Office Action mailed", 10 pgs.
"U.S. Appl. No. 14/673,580, Notice of Allowance dated Jul. 12, 2018", 7 pgs.
"U.S. Appl. No. 15/360,764, Corrected Notice of Allowability dated Sep. 21, 2018", 5 pgs.
"U.S. Appl. No. 15/360,764, Notice of Allowance dated Aug. 15, 2018", 9 pgs.

\* cited by examiner

IMAGING SYSTEM WITH MOVABLE TRAY OF SELECTABLE OPTICAL ELEMENTS

CROSS REFERENCE TO RELATED APPLICATIONS

This application is a continuation-in-part of, and claims benefits to, U.S. patent application Ser. No. 15/360,764, entitled "IMAGING SYSTEM WITH MOVABLE TRAY OF SELECTABLE OPTICAL ELEMENTS", filed Nov. 23, 2016, which is a continuation-in-part of, and claims benefits to, International Patent Application No. PCT/CN2015/084913, entitled "OPTICAL PATH CHANGING SYSTEM AND IMAGING DEVICE", filed Jul. 23, 2015, which claims priority to U.S. patent application Ser. No. 14/612,253, entitled "MOTORIZED INTERCHANGEABLE LENS SYSTEM", filed Feb. 2, 2015, U.S. patent application Ser. No. 14/673,580, entitled "MOTORIZED INTERCHANGEABLE LENS SYSTEM", filed Mar. 30, 2015, Chinese Patent Application No. 201510243445.7, entitled "OPTICAL PATH CHANGING SYSTEM AND IMAGING DEVICE" filed May 13, 2015, and Chinese Utility Model Patent Application No. 201520307159.8, entitled "OPTICAL PATH CHANGING SYSTEM AND IMAGING DEVICE", filed May 13, 2015, which are incorporated herein by reference in their entirety.

TECHNICAL FIELD

This document relates generally to optical imaging and more particularly to a system for changing an optical path to an imaging device by selecting optical elements for the optical path using a movable optical element tray.

BACKGROUND

With the advent of digital cameras and photographing cell phones, people can better capture pictures and share photos. Current technology enables pictures to be easily and conveniently previewed, taken, and reviewed. Digital photography has made cameras compact, portable, and low-powered. However, certain trade-offs are often associated with the portability that miniaturization brings, somewhat undermining the benefits of a readily accessible form of image-capture and picture quality.

A prime lens has a fixed focal length, so a user must adjust his or her relative position to get a desired image. This can impede the capture of an image if there is not enough physical space to properly frame the desired image. A zoom lens is versatile, can be adapted to different photo-taking environments, and is more flexible than the prime lens in term of view finding. When using a zoom lens, a user is able to transition from a wide-angle view to a telephoto view with a single zoom lens without the need to physically move and thus capture alternative views. However, such flexibility is usually at the expense of compromising picture quality, and the image quality from a zoom lens is usually poorer than that from a prime lens. The aperture of a zoom lens is usually smaller than a prime lens, so a zoom lens has less entered light than a prime lens. In addition, a zoom lens usually has more pieces of lenses than a prime lens, which results in scattering and intensity decreasing of the light passing more pieces of lenses. A prime lens preserves the integrity of an image by virtue of its simple design. A prime lens has one focal length and fewer moving parts and lenses than a zoom lens, which yields accuracy of the mechanism and sharper images.

Additionally, for a camera module to provide zoom lens capability, the internal construction of the lens is rather complicated. A zoom lens may generally have over hundreds of individual parts. One poorly machined part truly squander the financial investment in the zoom lens, whether at the manufacturing stage or the commercial stage. Also, zoom lenses usually tend to be bulky and heavy, making them infeasible where portability is paramount.

Prime (or fixed focal length) camera lenses typically provide higher quality images than zoom or variable focal length lenses. Prime lenses also usually tend to be more compact and light weight than zoom lenses. In many modern imaging devices, particularly mobile phones, compactness is of utmost importance, making zoom lenses somewhat impractical. Therefore, most mobile devices do not have zoom function.

SUMMARY

An imaging system for directing one or more optical signals to one or more imaging elements is provided. The imaging system may include an optical element tray. The optical element tray may include optical elements having optical characteristics different from each other. The optical element tray may be configured to be moveable to form one or more optical paths each allowing an optical signal to travel to an imaging element through none, one, or several of the optical elements. In various embodiments, the one or more optical paths may each be selected from a plurality of linear and nonlinear paths formed by the optical elements in the optical element tray and/or additional optical elements external to the optical element tray. In some embodiments, the optical element tray may be moveable along its axis of rotation and/or rotated to enhance image stability of the imaging system.

An example ("Example 1") of system for directing one or more optical signals to one or more imaging elements can include an optical element tray. The optical element tray may have a central axis and may be configured to be rotatable about the central axis to each position selected from a plurality of positions to allow for formation of one or more optical paths each directing an optical signal of the one or more optical signals to an imaging element of the one or more imaging elements. The optical element tray may include one or more optical window openings, one or more optical channels, and a plurality of first optical elements having optical characteristics different from each other. The one or more optical window openings may each be positioned to receive a first optical signal of the one or more optical signals and allow the first optical signal to trawl in a direction substantially parallel to the central axis. The one or more optical channels may each be positioned to receive a second optical signal of the one or more optical signals and allow the second optical signal to travel in a direction substantially perpendicular to the central axis. The first optical elements may each be placed in an optical window opening of the one or more optical window openings or an optical channel of the one or more optical channels.

In Example 2, the subject matter of Example 1 may optionally be configured to further include one or more second optical elements each placed in front of an imaging element of the one or more imaging elements such that the first optical signal or the second optical signal travels through a second optical element of the one or more second optical elements after travelling through an optical window openings of the one or more optical window openings or an optical channel of the one or more optical channels and before reaching an imaging element of the one or more imaging elements.

In Example 3, the subject matter of Example 2 may optionally be configured to further include a first optical entrance configured to receive the first optical signal, and configured such that an optical window opening is selected from the one or more optical window openings to receive the first optical signal from the first optical entrance. The optical element tray is configured to be rotatable to a position allowing for formation of a first optical path of the one or more optical paths. The first optical path includes the first optical entrance, the selected optical window opening, and a second optical element of the one or more second optical elements.

In Example 4, the subject matter of any one or any combination of Examples 2 and 3 may optionally be configured to further include a second optical entrance configured to receive the second optical signal, an incoming reflector configured and positioned to receive the second optical signal from the second optical entrance and redirect the second optical signal to a selected optical channel of the one or more optical channels, and an outgoing reflector configured and positioned to receive the second optical signal from the selected optical channel and redirect the second optical signal toward a second optical element of the one or more second optical elements. The optical element tray is configured to be rotatable to a position allowing for formation of a second optical path of the one or more optical paths. The second optical path includes the second optical entrance, the incoming reflector, the selected optical channel, the outgoing reflector, and the second optical element of the one or more second optical elements.

In Example 5, the subject matter of any one or any combination of Examples 2 to 4 may optionally be configured such that the one or more second optical elements each include one or more lenses.

In Example 6, the subject matter of any one or any combination of Examples 2 to 5 may optionally be configured such that the one or more second optical elements each include one or more filters.

In Example 7, the subject matter of any one or any combination of Examples 1 to 6 may optionally be configured to further include one or more guide poles and one or more sliders. The optical element tray is affixed to the one or more guide poles or the one or more slides to allow displacement of the optical element tray along the central axis of rotation of the optical element tray. The one or more guide poles each have a longitudinal axis and positioned with the longitudinal axis parallel to the central axis of the optical element tray. The one or more sliders are each placed over a guide pole of the guide poles and configured to displace along that guide pole.

In Example 8, the subject matter of Example 7 may optionally be configured such that the optical element tray is affixed to the one or more guide poles.

In Example 9, the subject matter of Example 7 may optionally be configured such that the optical element tray is affixed to the one or more sliders.

In Example 10, the subject matter of any one or any combination of Examples 1 to 9 may optionally be configured such that the one or more imaging elements include a plurality of imaging elements.

In Example 11, the subject matter of Example 10 may optionally be configured such that the one or more optical signals include multiple optical signals, and the one or more optical window openings and the one or more optical channels are arranged in the optical element tray in a manner allowing the multiple optical signals to be received by multiple imaging elements of the plurality of imaging elements simultaneously.

In Example 12, the subject matter of any one or any combination of Examples 1 to 11 may optionally be configured such that the optical element tray is configured for the rotation of the optical element tray to be controlled to compensate for shaking of the system in a direction tangent to a direction of the rotation of the optical element tray.

An example ("Example 13") of an optical imaging system include one or more optical entrances, one or more optical imaging elements, an optical element tray, and a motor. The one or more optical entrances may each be configured to receive an optical signal. The one or more optical imaging elements may each be configured to capture one or more photographic images. The optical element tray may have a central axis and may be configured to be rotated about the central axis. The optical element tray may include a plurality of first optical elements having optical characteristics different from each other, and may be configured to be moveable to form one or more optical paths each allowing an optical signal to travel to an imaging element of the one or more imaging elements through one or more first optical elements of the plurality of first optical elements. The motor may be configured to rotate the optical element tray to a position of a plurality of positions each allowing the one or more optical paths to be formed.

In Example 14, the subject matter of Example 13 may optionally be configured to include a camera. The camera can include the one or more optical entrances, the one or more optical imaging elements, the optical element tray, and the motor.

In Example 15, the subject matter of Example 13 may optionally be configured to include a cellphone including the camera.

In Example 16, the subject matter of any one or any combination of Examples 13 to 15 may optionally be configured such that the one or more optical entrances include multiple optical entrances, the one or more optical imaging elements include multiple optical imaging elements, and the optical element tray is configured to form multiple optical paths of the one or more optical paths.

In Example 17, the subject matter of Example 16 may optionally be configured such that the camera is configured to produce a 3-dimensional photographic image.

In Example 18, the subject matter of any one or any combination of Examples 13 to 17 may optionally be configured such that the optical element tray include one or more optical window openings each allowing passage of an optical signal in a direction substantially parallel to the central axis, one or more optical channels each allowing passage of an optical signal in a direction substantially perpendicular to the central axis, and one or more second optical elements. The plurality of first optical elements includes first optical elements are each placed in an optical window opening of the one or more optical window openings or an optical channel of the one or more optical channels. The one or more optical paths include one or more optical paths each allowing an optical signal to travel to an imaging element of the one or more imaging elements through one or more first optical elements of the plurality of first optical elements and a second optical element of the one or more second optical elements.

In Example 19, the subject matter of any one or any combination of Examples 13 to 18 may optionally be configured to further include one or more guide poles each having a longitudinal axis and positioned with the longitudinal axis parallel to the central axis of the optical element tray. The optical element tray is configured to be displaceable along the one or more guide poles, and the camera is configured to adjust a length of at least one optical path of the one or more optical paths by displacing the optical element tray along the one or more guide poles.

Example 20, the subject matter of any one or any combination of Examples 13 to 19 may optionally be configured such that the camera is configured to sense a movement of the camera and to control the motor to rotate the optical element tray in response to the movement of the camera being sensed to compensate for shaking of the camera in a direction tangent to a direction of the rotation of the optical element tray.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

Figure 1:
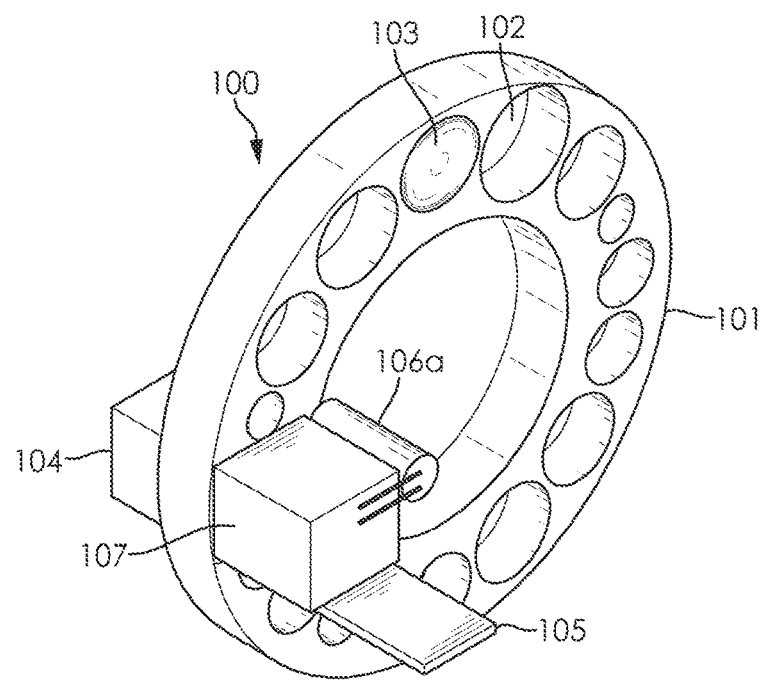
FIG. 1 illustrates a perspective view of an optical path changing system comprising an annular tray and installed with a driving motor according to an embodiment of the present subject matter.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

An optical path changing system in the present subject matter comprises at least one optical element tray (also referred to as lens tray), and optionally can further comprise at least one motor. The motor(s) can be used in cooperation with at least one motor controller. The optical path changing system can further comprise imaging element(s) or operate in cooperation with imaging element(s). Herein, the optical path changing system refers to a system which can make light pass through different optical paths. For example, the system can make light go through lenses with different focal lengths (the system is also referred to as a lens changing system at this point), or can make light go through optical paths with different apertures, or can make light go through optical elements with different filtering effects. It is noted that the "different optical paths" herein not only refers to different geometric paths the light passes. In addition, even if the geometric paths the light passes are the same, if the light experiences different optical elements or apertures, it can also be said that the light passes different optical paths. The optical path changing system (for example, the lens changing system) can be designed to be incorporated into a mobile device, a camera, a camcorder, or another imaging device. The optical element tray has formed within it, a plurality of optical window openings (or holes) or optical channels. An optical window opening may hold a lens, a lens stack, a lens cover, or an optical filter, or an optical window opening may be empty. Empty optical window openings or optical window openings not holding an optical element can be useful for a variety of reasons, which will be described in detail in the following. According to one embodiment, an empty optical window opening allows one piece of lens to be used in the system without being combined with other lenses. Empty optical window openings may also allow for attachment of lens module to the outside of the imaging device. Other than empty optical window openings, optical window openings can hold lenses or lens stacks of different focal lengths, or hold different optical filters. This allows for the flexibility of having a variety of different focal length lenses to be included in a compact device without bringing in the complexity, size and weight of a zoom lens. Since the size, thickness and diameter of different prime lenses varies, the diameters of optical window openings also vary. It is noted that the term "optical element tray" (or "lens tray") does not mean that there must be an optical element (or lens) installed in it, but, as described in the above, it may or may not hold an optical element. In addition, its shape is not necessary as a "tray", but can any suitable shape, as described in following different embodiments.

Lenses or lens stacks may comprise H-cut lenses, D-cut lenses, rectangular lenses, or lenses of any other shape. Lenses of different shapes, such as H-cut lenses, can allow optical element tray space to be used more efficiently and effectively. Lens stacks may optionally include filters or other light refracting elements that change color or geometric effects of the light. One of ordinary skill in the art would recognize that any lens, filter, or other optical element may be used without departing from the spirit and scope of the present invention.

The present subject matter can be useful for creating a compact multi-focal length imaging system that can also be waterproof because all the moving parts can be completely enclosed inside a waterproof case. No moving parts would be directly exposed to water, which greatly simplifying the construction and improving the reliability of a multi-focal length imaging system that can be used under water.

The optical path changing system may contain two or more optical element trays. Each tray moves individually. Therefore, optical elements from different trays can be combined to achieve a greater variety of photographic or optical effects. For example, if Lens A of Tray 1 is combined with Lens B of Tray 2, the result may be a more powerful convergence or divergence of light. In another embodiment, a lens or lens group of Tray 1 may be combined with a filter on Tray 2, and for example with an infrared filter for night vision purposes. Accordingly, a variety of combinations of optical elements can produce many photographic effects.

In one embodiment, the optical path changing system can be combined with a software user interface which can automatically choose an optical element combination for a given situation or according to an instruction input by a user. This feature will b described in greater detail with FIG. 12.

Having described the basic structure and function of the optical path changing system incorporating the present disclosure, various embodiments of the present disclosure will be described in greater detail with reference to the drawings in the following.

FIG. 1 illustrates an optical element tray with multiple optical window openings, which is installed with a motor and an imaging unit. According to one embodiment of the disclosure, the optical path changing system 100 includes an optical element tray 101 and an imaging unit 107. In this particular embodiment of the disclosure, the optical element tray 101 is annular or circular such that there can be a hole in the center of the optical element tray and there are multiple optical window openings 102 around the peripheral circumference of the optical element tray. Each optical window opening holds a lens 103, a stack of lenses, a filter or other optical elements. A motor 106a mounted to the annular ring optical element tray 101 can rotate the ring ray about its central axis in order to position some optical window opening in line with the imaging unit 107. An interface board 105 receives power and signals from the imaging device incorporating the optical path changing system 100. The interface board 105 may be fixed to the imaging unit 107, the motor 106a, or the module casing of the optical element tray 101. One of ordinary skill in the art would recognize that the interface board 105 may be placed anywhere without departing from the spirit and scope of the present disclosure.

Figure 6:
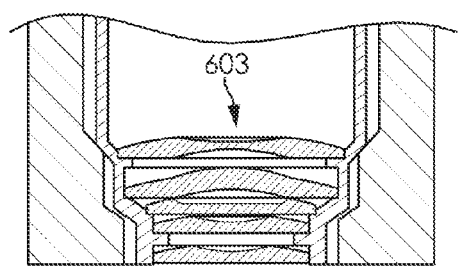
FIG. 6 illustrates a cutaway side view of a stack of lenses that are placed in optical window opening of an optical element tray according to an embodiment of the present subject matter.

The optical element tray 101 is thick enough to hold either a stack of lenses (as shown in FIG. 6 below) or a single lens 103 in each optical window opening 102 at various depths. For example, some lens 103 may be placed near the entrance side of the optical element tray 101, where the lens cover assembly 104 is positioned. Another lens may be placed near the light exit side of the optical element tray 101 where the imaging unit 107 is positioned. The relative depths of the lens 103 or lens stacks embedded within the optical window openings of the optical element tray 101 are determined by the geometry of the lens and the configuration of the imaging unit 107. Lenses of different focal lengths may need to be placed at different positions which are closer to or farther from the imaging unit 107 in order to work correctly. One of ordinary skill in the art would recognize that the properties of the lens 103 or the lens stack would determine the position where it is embodied within the optical element tray 101.

The motor 106a may be arranged at a position such that the drive shaft is perpendicular to the plane of the annular ring optical element tray 101. A pinion gear on the drive shaft of the motor 106a engages with gear teeth on the inner edge of the annular ring optical element tray 101. In another embodiment, the motor 106a is arranged with the drive shaft parallel to the plane of the annular ring optical element tray 101. In this case, a worm gear on the drive shaft of the motor 106a engages with teeth on the outer edge of the annular ring optical element tray 101. The optical element tray may also have gear teeth arranged on the front or rear surface of the annular ring optical element tray 101, and the motor 106a may use a bevel, spiral bevel or hypoid gear arrangement to drive the optical element tray 101. One of ordinary skill in the art would recognize that any way the motor 106a used to drive the optical element tray 101 would not depart from the spirit and scope of the present disclosure.

The optical path changing system 100 may optionally include imaging components, such as an imaging element, a focusing component, an image stabilizer, some additional lenses, a filter, an iris aperture etc. These imaging components may be housed in the imaging unit or housed separately. The imaging element may be any kind of device used for capturing photographic images, including a photo-sensitive film, a CCD image sensor, or a CMOS image sensor. One of ordinary skill in the art would recognize that any kind of imaging element could be used without departing from the spirit and scope of the present disclosure.

A focusing component may be any component that allows the image to be focused on the imaging element. The focusing methods usually comprise moving the imaging element toward or away from the lens, moving the lens toward or away from the imaging element, or moving an imaging assemble within the path of light between the lens and the imaging element. Alternatively, a liquid lens, which changes focal length based on the strength of an electric field, may be used to focus, or mirrors may also be used to focus. In the present disclosure, focusing may be accomplished by moving the imaging element, moving a focusing lens, moving an individual lens or a single stack of lenses, or moving the entire optical element tray. One of ordinary skill in the art would recognize that any kind of focusing method could be used without departing from the spirit and scope of the present invention.

One method of moving a lens or a stack of lenses is to use a voice coil motor. This is done by mounting the lens or the lens stack into the optical window opening by using springs. A first magnet group is attached to the lens assembly, and another magnet group is placed outside the light pathway, between the lens assembly and the imaging element or at the other side of the lens assembly. One of the magnet groups is an electromagnet, and the other can be a permanent magnet.

Energizing the electromagnet and adjusting the current can cause the lens assembly to be pulled toward or pushed away from the imaging element.

The optical path changing system 100 may also cooperatively operate with a separate imaging system not integrated into the optical path changing system 100. The lens cover assembly 104 may include one or more additional lenses, one or more filters, or a glass or plastic cap to protect the lenses from dust and moisture. The lens cover assembly may be incorporated into the body of the mobile phone, camera, or other imaging device that incorporates the optical path changing system 100. It is not necessary that the optical element tray 101 be annular. One of ordinary skill in the art would recognize that the optical element tray may be annular, circular, rectangular, arced, or any shape that is allowed by the imaging device in which the optical path changing system 100 is incorporated, without departing from the spirit and scope of the present disclosure.

FIG. 1 and the other figures illustrate only one piece of lens 103 in an optical window opening 102 in the optical element tray. It should be understood that simplification of the drawings should not be interpreted as limiting. Other forms of lenses such as a stack of lenses can be in the optical window opening 102. Any number of optical window openings 102 may be included in the optical element tray, and each may be referred to as element 102. One of ordinary skill in the art would recognize that the lens 103 may generically refer to any lens in the optical element tray 101, including the lens 103 that is lined up with the imaging unit 107 and hidden from view in the drawing.

Figure 2:
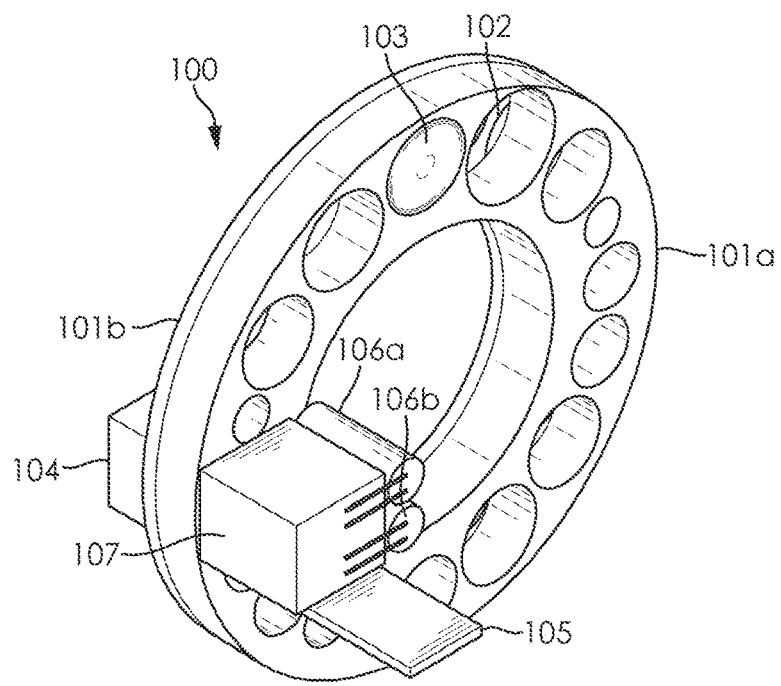
FIG. 2 illustrates a perspective view of an optical path changing system comprising multiple annular trays and installed with driving motors according to an embodiment of the present subject matter.

FIG. 2 illustrates an automatic lens changing system with two optical element trays which can move independently of each other. A first motor 106a controls the movement of the first optical element tray 101a, and a second motor 106b controls the movement of the second optical element tray 101b. The control circuitry for both motors can share the same interface board 105. Independent movement of the two optical element trays 101 allows the lenses from the optical element trays 101a, 101b to be combined to produce a variety of different focal lengths to meet the requirement of different usage situations. Alternatively, the second optical element tray 101b can carry a number of optical filters, while the first optical element tray 101a carries a series of lenses of different focal lengths. When the second optical element tray 101b carries optical filters, at least one of the optical window openings 102 in the second optical element tray 101b can be left empty to provide the user with a "no-filter" option when taking photos. This would allow the user to pick various filters to use with various lenses, presenting a variety of choices to the user.

FIG. 2 illustrates only one piece of lens 103, but this should not be interpreted as limiting. The optical element tray 101 may have any number of optical window openings, and any optical window opening may hold a lens 103 or remain empty. Even if all optical window openings are empty, the empty optical window openings may still serve the purpose of providing varying aperture sizes to change the amount of light entering the imaging unit 107. Although an iris aperture is a preferred method of changing aperture sizes, using an optical element tray with various optical window opening sizes may also be a preferred option under certain circumstances. Therefore, even an optical element tray with no lenses remains within the basic spirit and scope of the present disclosure. In addition, although the first optical element tray 101a and the second optical element tray 101b appear to have the same number of optical window openings 102, this needs not be the case in practice. The second optical element tray 101b may have more or fewer optical window openings 102 than the first optical element tray 101a, and the total number of possible lens combinations is as many as the number of optical window openings 102 in the first optical element tray 101a multiplied by the number of optical window openings 102 in the second optical element tray 101b.

The concepts discussed with reference to FIG. 2 previously may be further expanded to implement three or more layers of optical element trays.

Figure 3:
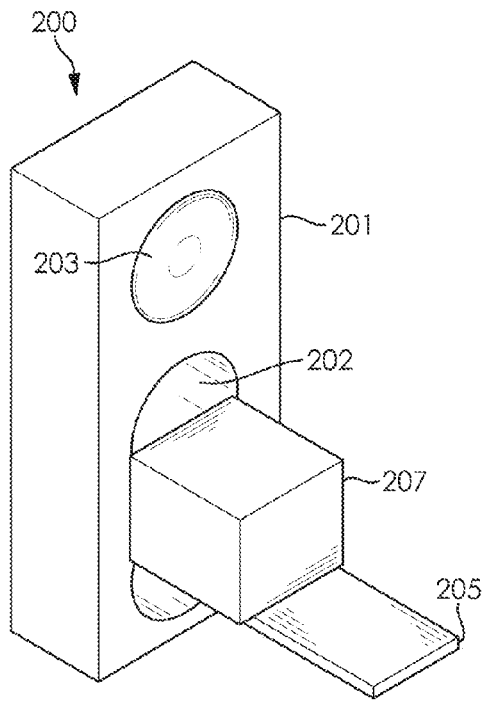
FIG. 3 illustrates a perspective view of an optical path changing system comprising a rectangular tray installed with a single array of lenses according to an embodiment of the present subject matter.

FIG. 3 illustrates the optical path changing system 200 with all optical window openings 202 in the optical element tray 201 arranged in a one-dimensional array. This design may hold fewer lenses than the annular design; otherwise, the optical element tray becomes very long. However, space may be easier to be preserved for such a design within something like a mobile phone. Comparatively, designing a space with curves would be more difficult. The embodiment in FIG. 3 makes the device simple at the cost of reducing the number of lenses.

Motors are not shown in FIG. 3, but a variety of motors and gear mechanisms can be used to move the optical element tray 201 into the desired position. The motor 206 can move the optical element tray as desired by various installation positions such as perpendicular, parallel or transverse in combination with various gears such as worm gears, bevel gears, spiral, hypoid, or rack and pinion gear. A linear motor can also be used for quieter and quicker movement. Alternatively, a piezo motor can also be used to move the optical element tray. One of ordinary skill in the art would recognize that any motor and gear arrangement can be used without departing from the spirit and scope of the present invention.

Figure 4:
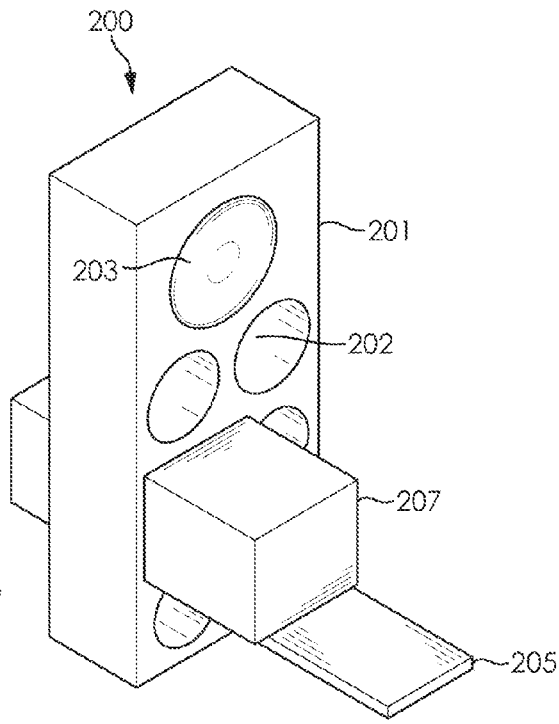
FIG. 4 illustrates a perspective view of an optical path changing system comprising a rectangular tray installed with multiple arrays of lenses according to an embodiment of the present subject matter.

FIG. 4 illustrates an optical path changing system 200 with all optical window openings in the optical element tray 201 arranged into an array two-dimensionally. As seen in FIG. 4, the lenses are arranged into three columns: one column on the left, one column on the right containing the optical window opening labeled 202, and one column in the center containing just one lens 203. Alternatively, the arrangement of the lenses can be described as a first row at the top with just one lens 203, a second row with two optical window openings just below the first row, and so on to the bottom row of window openings. No matter the arrangement of optical window openings, their arrangement can be described as the optical widows being arranged into an array in which each column (row) has one or more optical window openings.

In the case of FIG. 4, two motors can be used to move the optical element tray. An X-axis motor moves the optical element tray along the X-axis and a Y-axis motor moves the optical element tray along the Y-axis. Combining the motion of the X-axis and Y-axis allows the optical element tray to be positioned at any of the lenses on the optical element tray. The optical window openings 202 may be of varying sizes. Some optical window openings may be large enough to overlap into other rows or columns, as illustrated by the lens 203 in the figure. This allows for varying sized optical window openings 202 to be strategically placed within the optical element tray 201 in order to minimize the volume of the optical element tray 201. The X-axis motor and Y-axis motor are capable of moving the optical element tray 201 to any position to select the suitable lens.

The system of motor and gear to move the optical element tray 201 in two dimensions may be more complicated than the motor movement system for moving an optical element tray in one dimension. However, various solution for moving a platform in two dimensions are available in the prior art and one of ordinary skill in the art would recognize that any of such systems could be used without departing from the spirit and scope of the present disclosure.

Figure 5:
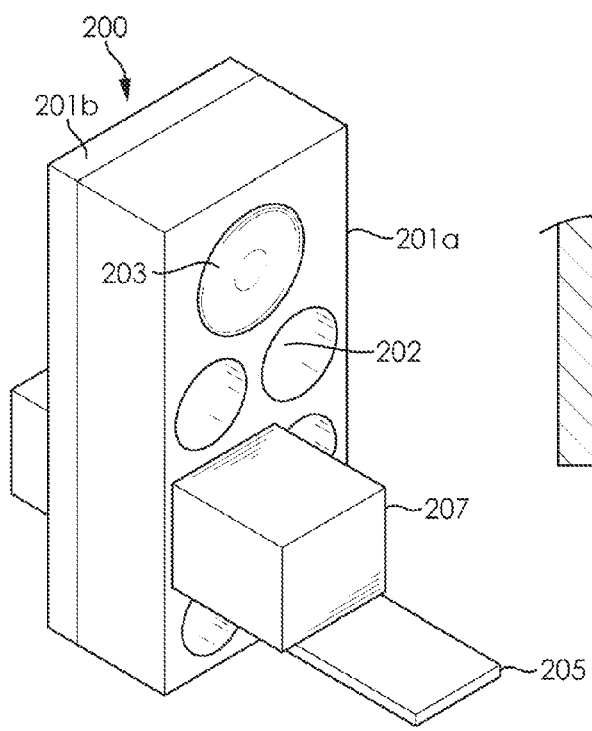
FIG. 5 illustrates a perspective view of an optical path changing system comprising multiple rectangular trays, each installed with multiple arrays of lenses according to an embodiment of the present subject matter.

FIG. 5 illustrates an optical path changing system 200 with multiple rectangular optical element trays 201. In this particular embodiment, a more complex motor system would be required in order to move each optical element independently. However, if the optical element trays are designed to be moved in unison, all optical element trays can be moved by one motor and gear system for moving a single tray.

FIG. 6 illustrates a side cutaway view of a lens stack held in an optical window opening 102, 202. According to some embodiments of the disclosure, the optical window openings 102, 202 may hold nothing, or may hold an optical filter, a single lens, a stack of lenses. A stack of lenses can be used for general purpose, or to some extent, a wide angle lens held by some optical window openings can have macro photography function to take macro photography. The use of lens stack can also correct various aberrations or distortions, for example, chromatic aberration due to differences in the refraction rate of different colors of light on the same material. The lens stack can also be used to achieve greater magnification required for macro photography, or to take extreme close-up photography. When the optical window opening 202 holds no lens, it does not refract the light. This kind of optical window openings can have many functions. First, some lenses or lens stacks require no cooperation of other lenses in order to produce the desired effect. This will be explained in more detail with reference to FIG. 8 below. Second, the optical path changing system may be configured to allow attachment of external optical components, including, but not limited to, microscopes, telescopes, external lenses, filters, or other optical components. In this situation, lenses on the optical element trays may interfere with the desired effect of the external optical components, so an empty optical window opening would be selected to prevent unwanted refraction.

FIGS. 7a-7g illustrate various optical element tray shapes and arrangements that can produce various effects. Each tray system may include a reflector 708 such as a full reflection prism, a mirror, or any other reflection system which can change the direction of the light, allowing for increasing optical path distance between the lens and the imaging unit 707 while still maintaining a compact form factor for the device. The features of each arrangement will be explained in further detail below.

Figure 7A:
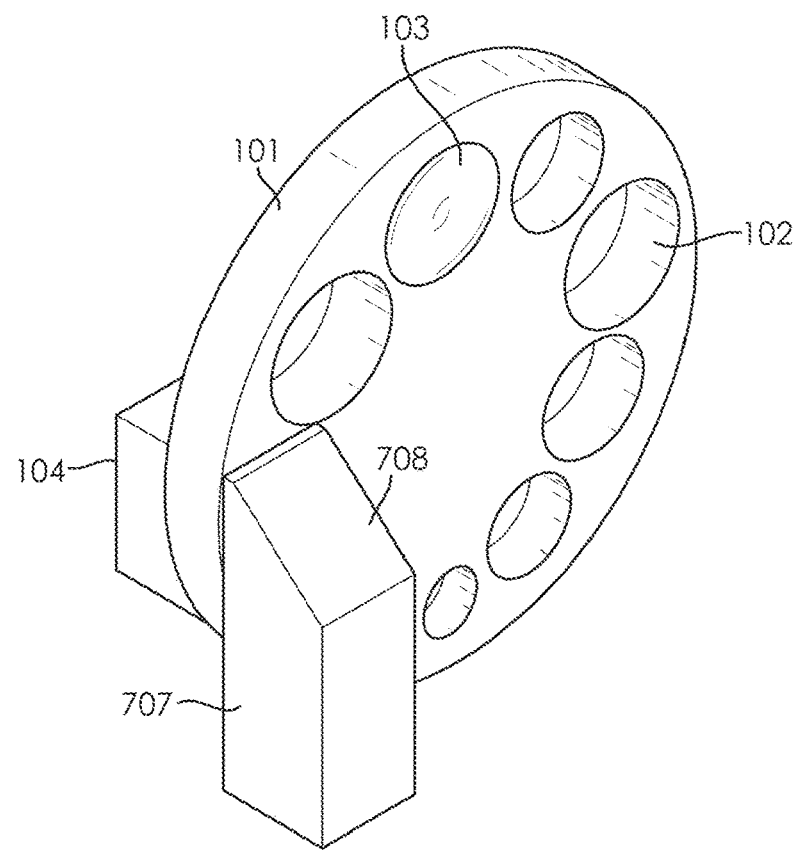
FIG. 7a illustrates a combination of an optical element tray, a reflector, and an imaging element according to an embodiment of the present subject matter.

FIG. 7a illustrates a basic arrangement in which an optical element tray is combined with a reflector 708 which changes the direction of the light passing through the optical element tray. FIG. 7 can be used to prove that an optical element tray installed with a reflector can have more functions and flexibility. The imaging unit 707 is arranged on the exit end of the reflector, allowing flexibility to increase the distance the light travels between the lens and the imaging unit 707 without increasing the thickness of the camera system. In one embodiment, the optical path changing system of FIG. 7a is arranged in a mobile phone such that the circular optical element tray lies flat behind the screen of the mobile phone. The lens cover assembly 104 can be incorporated onto the casing of the mobile phone such that the camera opening window opening is visible on the back of the camera. The reflector 708 reflects the light into the length and width direction of the mobile phone. Without the reflector 708, the imaging unit 707 would have to be installed in the same direction of the lens cover assembly 104, as depicted in FIGS. 1-5, and the thickness of the mobile phone would limit the focal length of the optical path changing system. The reflector provides more flexibility in the distance between the lens and the imaging unit 707, and thus more flexibility in the maximum focal lengths of the optical path changing system.

Figure 7B:
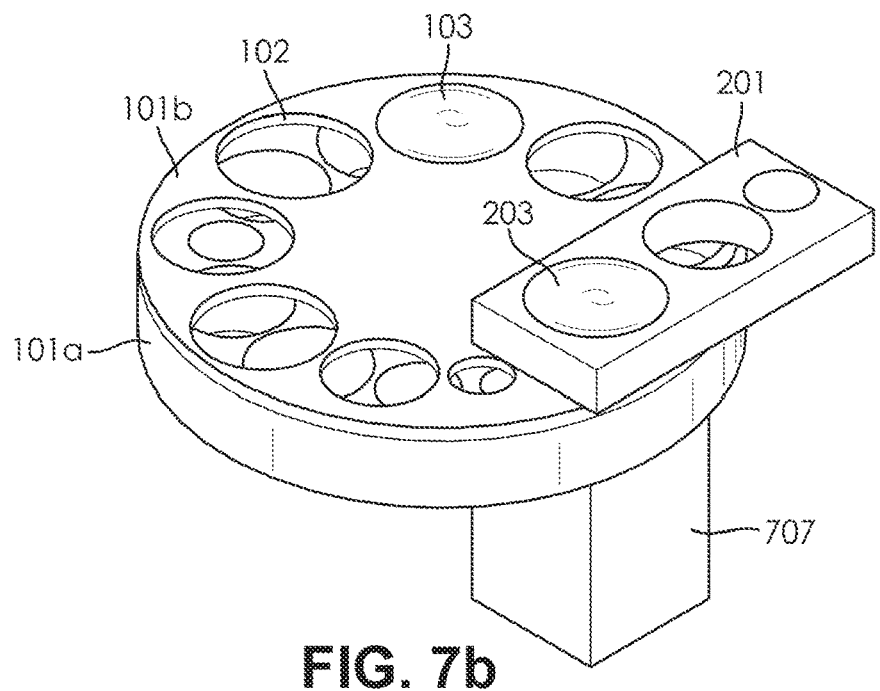
FIG. 7b illustrates a combination of various optical element trays and an imaging element according to an embodiment of the present subject matter.

FIG. 7b illustrates an optical element tray arrangement with three layers of optical element trays, showing that more than two optical element trays may be used and the optical element trays need not be of the same shape, size or type in the optical path changing system. The first optical element tray 101a is thicker than the second optical element tray 101b. The optical window openings 102 of the first optical element tray 101a may hold a stack of lenses as depicted in FIG. 6, or may hold individual lenses 103 at various depths within the optical window openings 102. The second optical element tray 101b is thinner than the first optical element tray 101a and may be used to install either individual lenses or optical filters. The individual lenses may be designed to work in combination with lenses 103 or lens stacks in the first optical element tray. The third optical element tray 201 is a rectangular optical element tray 201. The lenses 103, 203 of all the trays would combine to produce a suitable focal length and/or optical effect, and each of the optical element trays may have one or more empty optical window openings 103, 203. These empty optical window openings may be combined with lenses to produce a suitable optical effect or a suitable focal length which requires fewer than three optical elements. The imaging unit 707 is arranged perpendicular to the optical element trays to show that the optical path changing systems need not necessarily use a reflector 708 in FIG. 7a.

Figure 7C:
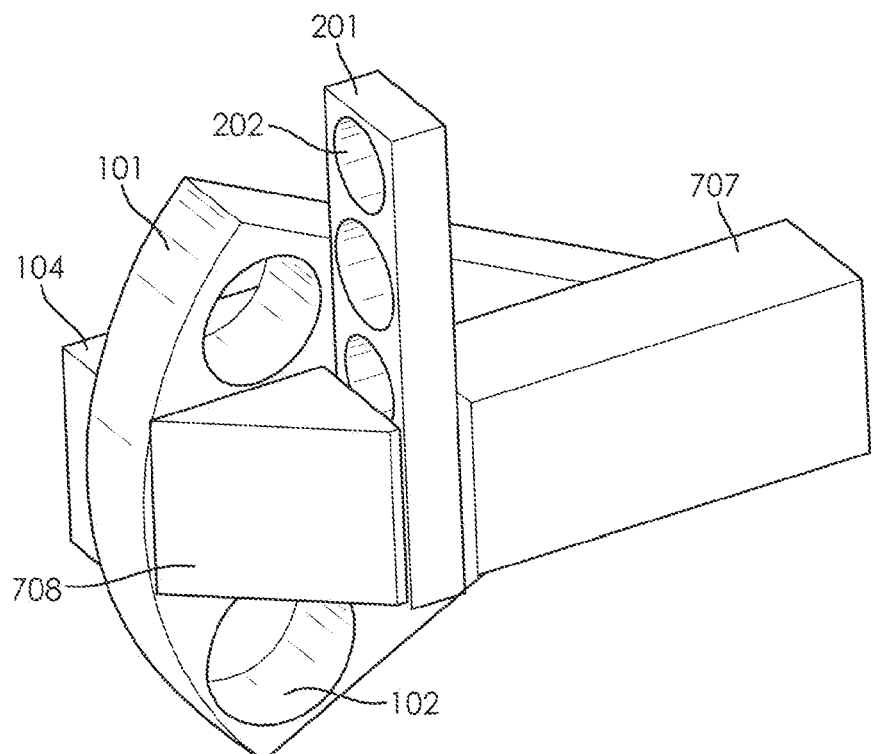
FIG. 7c illustrates a combination of a sector-shaped optical element tray, a reflector, a rectangular tray on different plane from the sector-shaped optical element tray, and an imaging element according to an embodiment of the present subject matter.

FIG. 7c illustrates how a reflector 708 may be used to combine two optical element trays of different shapes on two different planes relative to each other. The first optical element tray 101 is in the shape of a sector, or a wedge cut out of a circle. Light enters through the lens cover assembly 104, passes through an optical window opening 102 in the first optical element tray, and then enters a reflector 708, which changes the direction of the light to be parallel to the plane of the first optical element tray 101. The second optical element tray 201 is then arranged after the reflector 708 and orthogonal to the first optical element tray 101. Light passes through an optical window opening 202 of the second optical element tray before reaching the imaging unit 707.

Figure 7D:
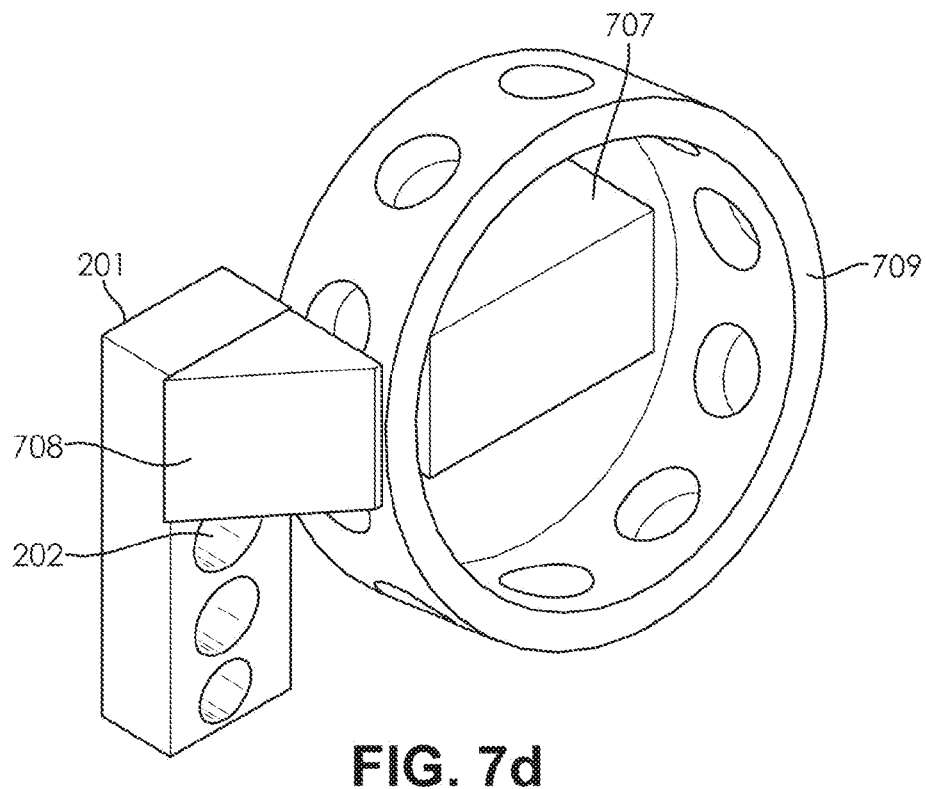
FIG. 7d illustrates a combination of a rectangular optical element tray, a reflector, a barrel shaped optical element tray, and an imaging element according to an embodiment of the present subject matter.

FIG. 7d illustrates a combination of a rectangular optical element tray 201, a reflector 708, and a barrel optical element tray 709 that encircles the imaging unit 707. The barrel optical element tray 709 is different from previously described optical element trays 101, 201 because it is not planar. The barrel optical element tray 709 is a cylindrical ring shape with an outer wall and inner wall. Although FIG. 7d depicts a fully circular ring, the barrel optical element tray 709 may be an arc or sector that is less than the whole cylindrical ring shape. In other words, the ends of the barrel optical element tray need not necessarily meet each other to form a complete circle. This type of optical element tray is similar to the rectangular optical element tray 201 of FIG. 3, except that the planar surface is curved to form an arc along the length of the rectangle. When the rectangle is long enough, the ends of the rectangle can meet each other after the rectangle is curved to form a barrel optical element tray as depicted in FIG. 7d.

On the barrel optical element tray 709, instead of having optical window openings arranged along a plane, they are arranged along the cylindrical wall, and instead of rotating or sliding the optical element tray, the barrel optical element tray 709 is spun on its central axis. The reflector 708 changes the direction of the light that comes out from the rectangular optical element tray 201 and then the light enters the barrel optical element tray 709. This allows the barrel optical element tray 709 to be oriented so that the overall thickness of the optical element tray combination can be minimized.

Figure 7E:
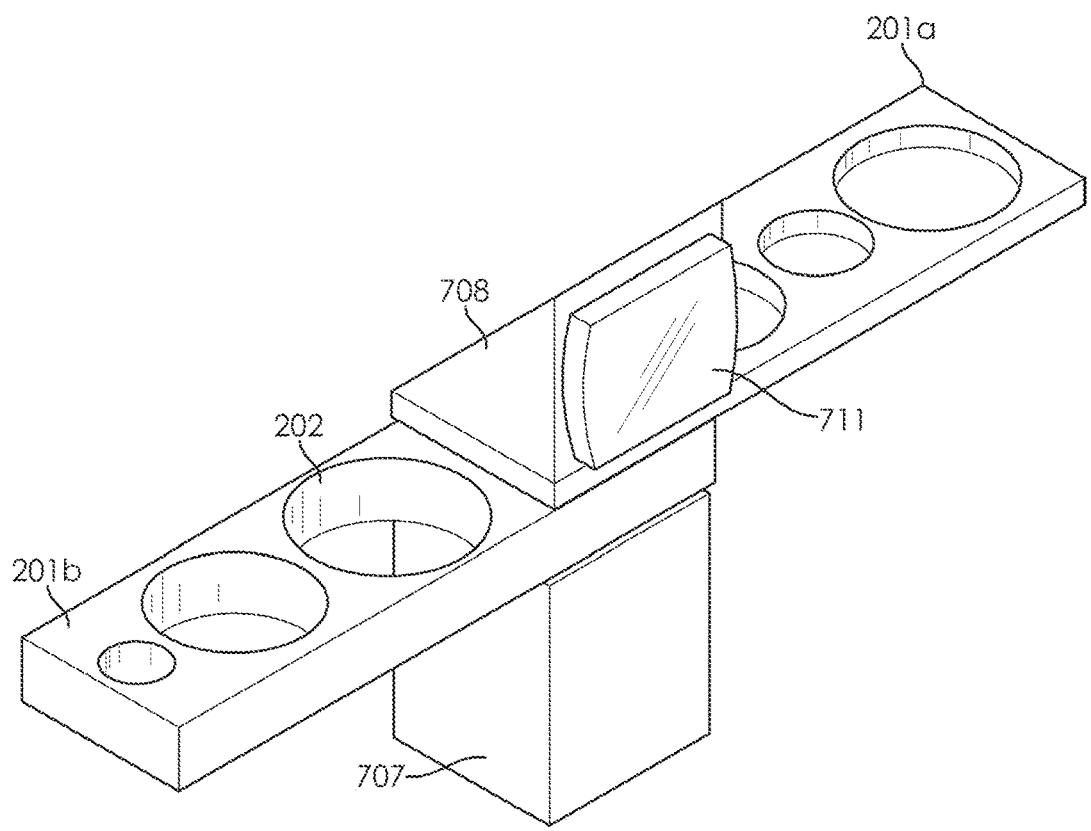
FIG. 7e illustrates a combination of two rectangular optical element trays, a reflector, and an imaging element according to an embodiment of the present subject matter.

FIG. 7e illustrates a combination of a reflector 708 and two rectangular optical element trays 201a, 201b, but in this instance, the two optical element trays lie on parallel planes and light is reflected by the reflector 708 before reaching the optical element trays 201a, 201b. The light entrance of the reflector 708 is covered by an optical cover glass 711 which allows light to pass through, but keeps out moisture and dust. In this example, the imaging unit 707 would lie along the length or width of the mobile phone or camera that incorporates the optical path changing system.

Figure 7F:
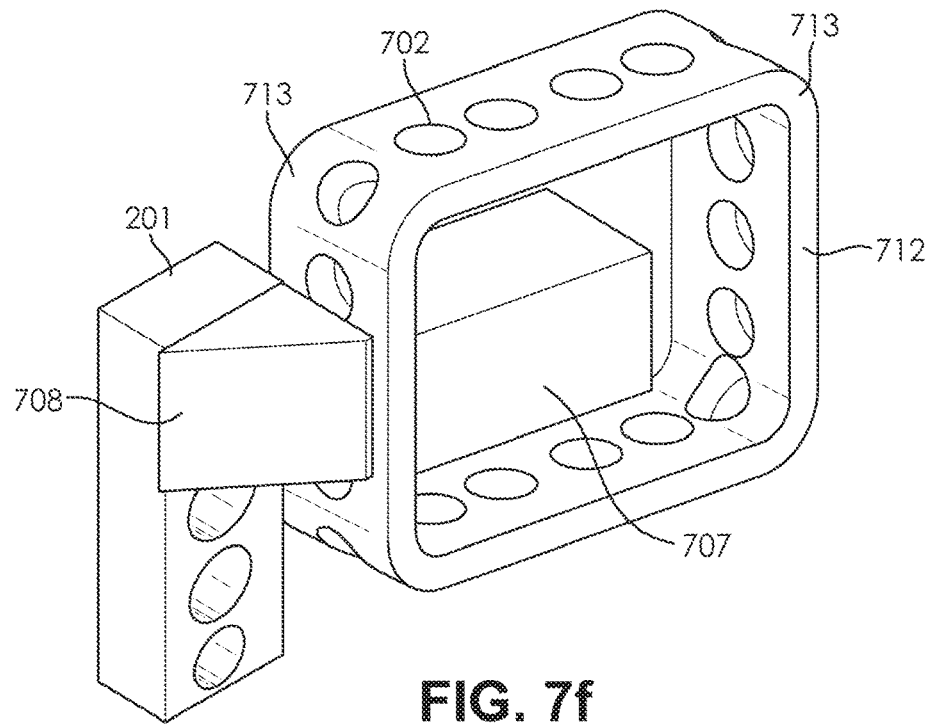
FIG. 7f illustrates a combination of a rectangular optical element tray, a reflector, an imaging element and a flexible band optical element tray according to an embodiment of the present subject matter.

FIG. 7f is similar to FIG. 7d, but the barrel optical element tray 709 is a flexible band barrel optical element tray 712 made of rubber, silicone, fiber, a chain loop of hinged rigid segments, or the like. The optical window openings 702 hold the optical elements such as lenses or filters. As the optical element tray 712 is rotated to select a suitable lens, the flexible band 712 bends around the rounded corners 713, reducing the amount of space required to hold the optical path changing system. The rounded corners 713 are designed to have a large enough radius of curvature so that rigid lenses can traverse the rounded corners 713 without jamming or binding the flexible band barrel optical element tray 712.

The barrel optical element trays of FIG. 7d and FIG. 7f, whether made of flexible material or rigid material, may alternatively have material cut out of the barrel between the optical window openings, forming triangular, rectangular or rounded teeth on one or both sides of the barrel. This makes the optical element tray lighter, and/or more flexible. One of ordinary skill in the art would recognize that adding or removing excess material from any optical element tray described herein may be done without departing from the spirit and scope of the present invention.

Figure 7G:
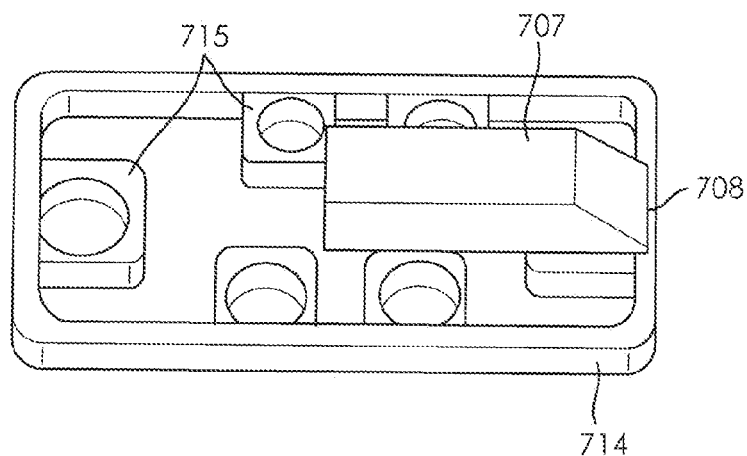
FIG. 7g illustrates a combination of a series of optical window openings arranged on the inside surface of a flexible band as an optical element tray, a reflector and an imaging element according to an embodiment of the present subject matter.

FIG. 7g depicts a different type of flexible optical element tray, where the flexible band 714 is installed with several optical window opening fixers 715. In an embodiment, as illustrated in FIG. 7g, an optical window opening fixer 715 is made of a tab of material separated from the rest of the optical element tray, but connected to the optical element tray on a side. An optical element tray can be flexible or rigid, can be planar or some other shape, and may contain multiple optical window opening fixers 715. The optical window opening fixers 715 may be installed in the optical element tray, or may be made of the same material as the optical element tray and separated from each other by gaps. Alternatively, the optical window opening fixer may be a section of the optical element tray that contains two or more optical window openings of the optical element tray. An optical window opening fixer may be blank, or contain no optical window opening. The material forming the optical window opening fixers 715 may be flexible or rigid.

As shown in FIG. 7g, each optical window opening fixer 715 is formed from a tab of material extending from the inner surface of the flexible band. The flexible band can be made of rubber, silicone, fiber, or a chain loop of rigid segments connected by hinges. Each optical window opening fixer can remain empty, or hold an optical element such as a lens, a stack of lenses or a filter. Alternatively, the function of an empty window opening can be achieved simply by having a sufficiently large gap on the flexible band 714 where there is no optical window opening fixer 715. The flexible band 714 allows a large number of optical elements to be placed within available space constraints. One of ordinary skill in the art would recognize that optical window opening fixer 715 may also be formed from a tab of material extending from the inner surface, outer surface, or both the inner and outer surface of the flexible band without departing from the spirit and scope of the present invention.

FIGS. 7a-7g depict various combinations of optical element trays 101, reflectors 708, and imaging units 707 in a variety of arrangements suitable for achieving suitable focal lengths and optical effects while fitting the optical path changing system within the space constraints typical of modern mobile devices. One of ordinary skill in the art would recognize that the various elements of FIGS. 7a-7p can be mixed and matched to produce more additional combinations without departing from the spirit and scope of the present invention.

Figure 8:
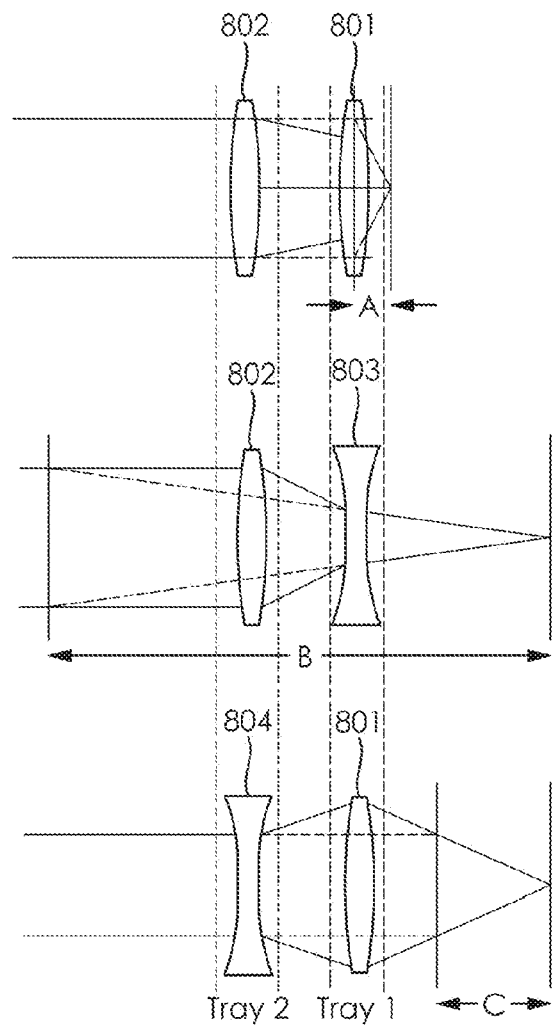
FIG. 8 is a diagram of two lenses in separate optical element trays being aligned to produce a desired focal distance according to an embodiment of the present subject matter.

FIG. 8 illustrates how lenses in two different optical element trays can be combined to produce a variety of effects. The lens combination at the top is labeled a macro lens combination. The combination of lens D 801 in tray 1 and lens E 802 in tray 2 produces a short focal length A, which has a high magnifying effect on objects close to the camera lens.

The middle lens combination of FIG. 8 is labeled as telephoto lens. The combination of lens F 803 in tray 1 and lens E 802 in tray 2 produces a relatively long focal length B which effectively enlarges objects that are far away from the lens. Note that the lens E 802 used in tray 2 for the telephoto lens combination may be the same lens E 802 used in tray 2 for the macro combination. However, FIG. 8 is used for illustration purposes only, and is not intended to be limiting. One of ordinary skill in the art would understand that one lens, either in tray 1 or tray 2, may be used in a variety of lens combinations to achieve a variety of different focal lengths for a variety of photographic purposes.

The bottom lens combination of FIG. 8 is labeled as wide angle lens. The wide angle lens combination uses the same lens D in tray 1 as the macro combination, but the lens in tray 2 is switched to lens G 804. This lens combination produces a relatively short focal length C that has a wide angle effect on objects that are far from the lens. One of ordinary skill in the art would recognize that any combination of lenses, lens stack, filters, optical components, or even empty optical window openings could be used to achieve suitable focal length or other optical effect.

Figure 9:
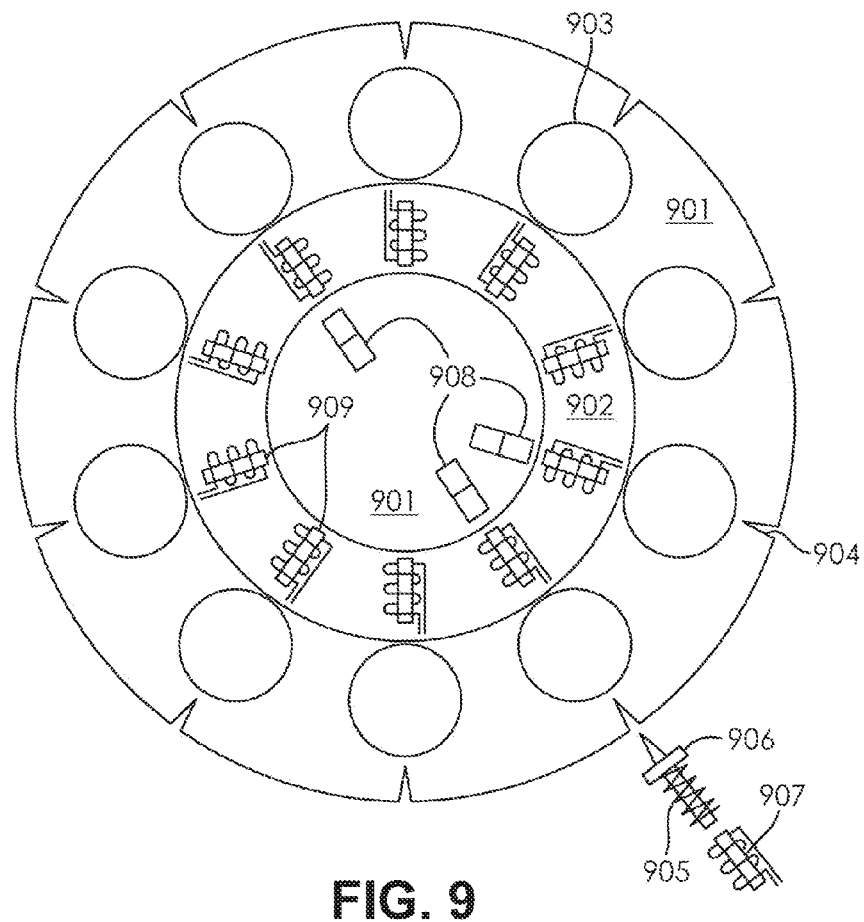
FIG. 9 is a diagram of a circular optical element tray installed with a magnetic motor and a locking mechanism according to an embodiment of the present subject matter.

FIG. 9 illustrates a schematic diagram illustrating an embodiment of a motor for rotating a circular optical element tray and a mechanism for locking an optical element tray in place. In one embodiment, a motor and gears need to be used to rotate, or slide the optical element tray into a suitable position. Alternatively, a motor as shown in FIG. 9 may be used to move the optical element tray without the need for a system of gears. The optical element tray makes up the rotor 901 of the motor similar to a brushless electric motor. The central portion of the optical element tray rotor 901 has permanent magnets 908 attached to it and a stator 902 has electromagnets 909 attached. For each lens, there is a corresponding electromagnet 909 and locking notch 904. The locking notch 904 corresponding to each lens 903 is positioned around the outside edge of the optical element tray rotor 901.

A magnetic locking pin 906 is loaded by a spring 905 and interfaces with the locking notches 904 to hold the optical element tray rotor at the position corresponding to a selected lens. The magnetic locking pin 906 is controlled by a locking electromagnet 907. When the locking electromagnet 907 is turned on, it pulls the magnetic locking pin 906 toward it, compressing the spring 905, disengaging the pin from the locking notch 904 and allowing the optical element tray rotor 901 to rotate freely. When the electromagnets 907, 909 are turned off, they apply no force on the permanent magnets 908 and the magnetic locking pin 906, and the spring 905 pushes back and inserts the locking pin 906 into the locking notch 904 to hold the rotor 901 securely in position.

The selected lens 903 can be selected by the following steps. In step 1, the locking electromagnet 907 is turned on. Turning on the locking electromagnet 907 causes the magnetic locking pin 906 to move toward the locking electromagnet 907, compressing the spring 905, and disengaging the magnetic locking pin 906 from the locking notch 904. In step 2, turning on and off the electromagnets 909 in the correct sequence causes the optical element tray rotor 901 to rotate clockwise or counterclockwise. In step 3, a hall-effect sensor, a light sensor, or another sensing device (not shown), detects whether the chosen lens 903 has approached the correct position. When the rotor reaches the suitable position, the electromagnets 909 corresponding to the selected lens remain powered on in the correct polarity to stop the rotor in the suitable position. In step 4, the electromagnets 907, 909 are turned off and the spring 905 pushes the magnetic locking pin 906 to engage with the locking notch 904 corresponding to the selected lens 903. The locking pin 906 then holds the optical element tray rotor in place without requiring the electromagnets to be powered on.

Although the above rotation and locking mechanism is applied to a circular optical element tray with a magnetic locking pin, many variations can be made. The permanent magnets 908 may be replaced with electromagnets. The relative positions of the stator and rotor may be swapped. The positions or orientations of the permanent magnets 908 and the electromagnets 909 can be changed, for example, placed on the outer edge of the tray, or being orthogonal, rather than parallel to the plane of the tray. A different locking pin design may be used. The locking pin may be placed on the rotating optical element tray. The position of rotor brushes can be changed. The system may also be adapted for linear movement rather than rotation. One of ordinary skill in the art would recognize that many changes to the system could be made without departing from the spirit and scope of the present invention.

Figure 10:
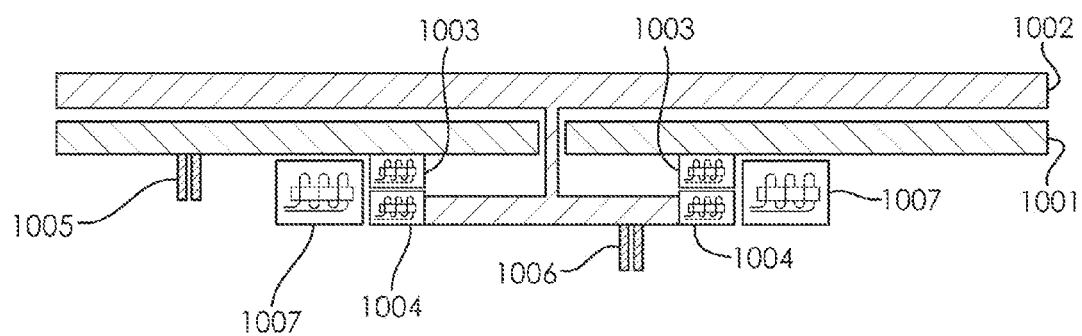
FIG. 10 is a cutaway side view of a magnetic motor capable of moving two circular optical element trays simultaneously according to an embodiment of the present subject matter.

FIG. 10 illustrates a side cutaway view of an electromagnetic motor designed for an optical path changing system with two optical element trays. The first tray 1001 is shown with two first rotor electromagnets 1003 attached to it. Although two first rotor electromagnets 1003 are shown, it is for illustration purposes only, and more electromagnets may be used without departing from the spirit and scope of the present invention. The first rotor electromagnets 1003 are powered through first rotor brushes 1005 which can maintain electrical contact. Two second rotor electromagnets 1004 are attached to an extension of the second tray 1002 whose axis passes through the center of the first tray 1001. The second rotor electromagnets 1004 are powered by second rotor brushes 1006 which can maintain contact. The stator electromagnets 1007 are positioned such that they will interact with both the first rotor electromagnets 1003 and the second rotor electromagnets 1004. As in the system described in FIG. 9, the electromagnets are turned on and off in the proper sequence to produce the desired movement.

The rotor electromagnets may be replaced with permanent magnets, but in this particular situation, it is desirable that the rotor magnets be electromagnets. Unless sufficient magnetic shielding is used or the rotor magnets are placed so that they don't interfere with each other, electromagnets are a preferable option here because they can be turned on and off selectively, thus making the task of moving one tray at a time simpler.

The above described electromagnetic motor may be adapted or expanded to move three or more layers of optical element trays such that each magnet on the stator interfaces with all of the rotors. A single tray to be rotated can be rotated by energizing the electromagnets on the tray. Alternatively a piezoelectric motor can be used for both moving and locking the optical element tray. One of ordinary skill in the art would recognize that any kind of motor could be used without departing from the spirit and scope of the present invention.

Figure 11:
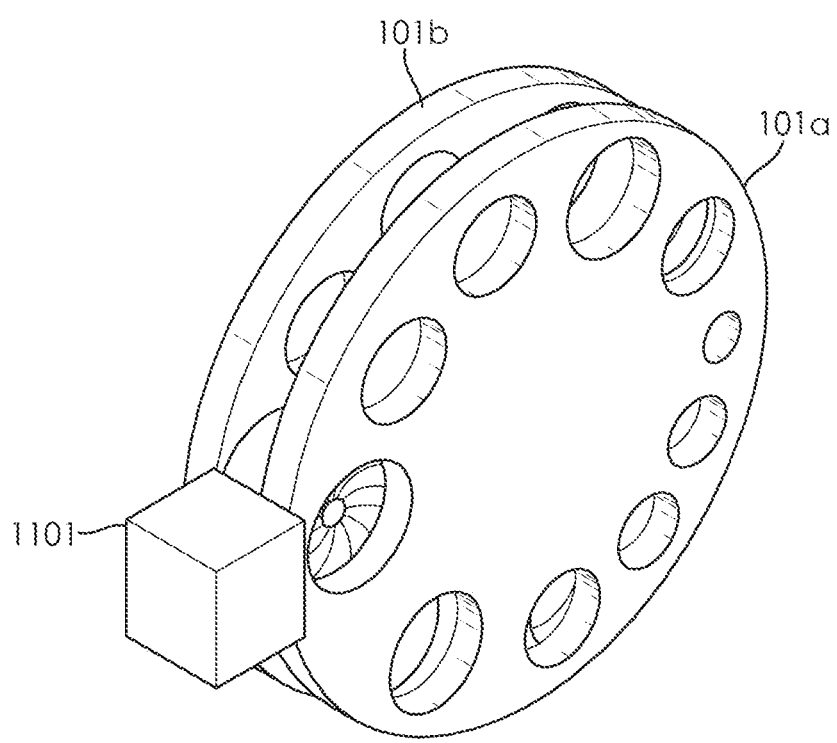
FIG. 11 illustrates an iris aperture arranged between two circular optical element trays according to an embodiment of the present subject matter.

FIG. 11 is an illustration showing how an iris aperture may be incorporated into the optical path changing system. The iris aperture 1101 in FIG. 11 is shown placed between first optical element tray 101a and second optical element tray 101b. One of ordinary skill in the art would recognize that the iris aperture 1101 could be place at any functional position in FIG. 11 or combined with any number of arrangements depicted by FIGS. 7a-7g without departing from the spirit and scope of the present invention.

Figure 12:
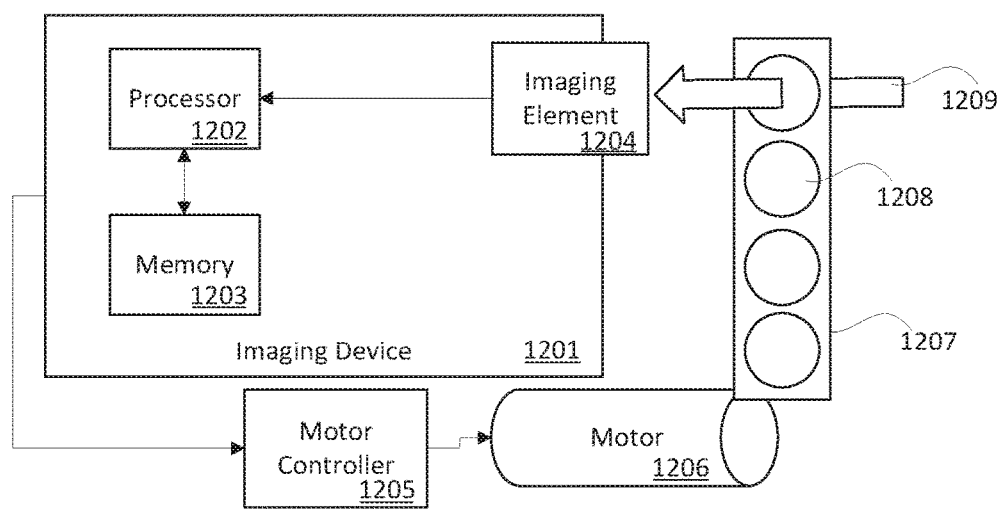
FIG. 12 is block diagram illustrating a mobile imaging device integrated with an optical path changing system according to an embodiment of the present subject matter.

The present disclosure also provides an imaging device, which can comprise an imaging controller, an imaging element, a motor controller and any optical path changing system described in the above or in the following, wherein the imaging controller can issue an instruction to the motor controller according to a user's input to change imaging effect; the motor controller can drive a corresponding motor in the optical path changing system according to the instruction from the imaging controller to move a corresponding optical element tray in the optical path changing system to select a suitable optical path; and the imaging element can receive imaging light input from the selected optical path of the optical path changing system to form an image with desired imaging effect. As an example, FIG. 12 schematically shows a block diagram of the imaging device 1201 integrated with an optical path changing system such as a mobile phone, camera, or camcorder. The imaging device 1201 includes a programmable apparatus comprising a processor 1202 and a memory 1203. The memory is a medium that can be accessed by a computer for storing program instructions to be executed by the processor 1202. The memory may also be used to store images taken by the imaging element 1204. The above imaging controller can be constructed by the processor 1202 here. The imaging device 1201 (for example by an imaging controller) sends commands to the motor controller 1205, which can move the optical element tray 1207 to align one of the optical elements 1208 with the imaging element 1204. An optical element 1208 may be a lens, filter, or some other type of optical element. Light 1209 passes through the optical element 1208 to the imaging element 1204.

The imaging device 1201, such as a mobile phone, camera, or camcorder, may have software and/or drivers installed which enable the user to control the optical path changing system through a graphical user interface, or allow automatic control through system software. The user need not be aware of which optical element is used or when it is necessary to change the optical element. Taking a mobile phone as an example, the camera software would receive input from the user to apply a filter, zoom in, zoom out, switch to macro mode, adjust the aperture size, or the like. The device driver, which may be part of the camera software, or other software module on the phone, would determine how to move the optical element tray to achieve the desired results for the user.

Figure 13:
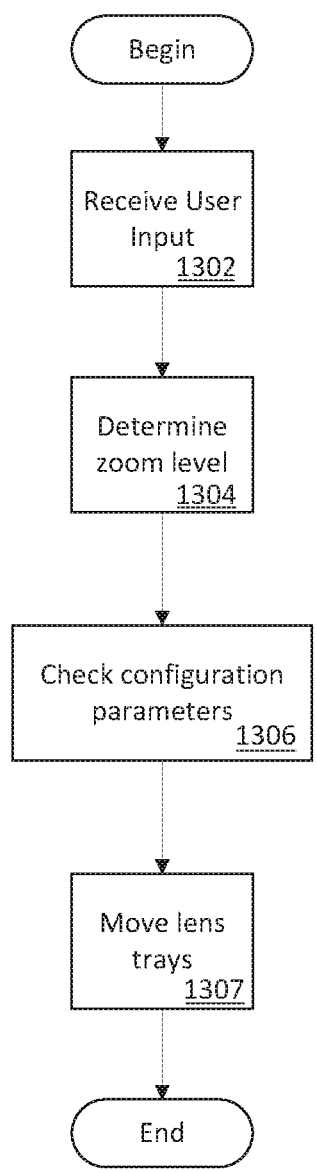
FIG. 13 is a flowchart illustrating that an optical path changing system integrated with camera software interprets a user's input instruction and moves a corresponding lens according to an embodiment of the present subject matter.

FIG. 13 is a flowchart illustrating the software method for interpreting user inputs, selecting the appropriate optical elements and moving the optical element tray to the appropriate position. At step 1302, the software receives user inputs. User inputs are typically received through a Graphical User Interface (GUI) where icons, buttons, menus and/or the like allow the user to choose commands. As an example, the user may zoom using an on-screen slider, a touch screen slicing trace, or a software or hardware dial, wheel, or button. One of ordinary skill in the art would recognize that any method of zooming may be used without departing from the spirit and scope of the present invention.

In basic camera software, the user often needs to achieve a suitable picturing scope by zooming without needing to know or care what specific camera parameters or lens combination are used to achieve such a result. The user can stop the zooming operation when the viewfinder or camera display screen shows a suitable zoom level. Whatever zoom level the user chooses, the software will determine what lenses and what level of digital zoom should be used in order to achieve the user-selected zoom level. The primary feature of the software is its ability to choose the appropriate lens combination given user inputs. Although this particular example uses zoom to describe the software function and features, other camera parameters, such as shutter speed, aperture size, filters, film speed, etc. can also be determined by the software based on the user's instructions.

At step 1304, the camera software interprets the user's instruction. The user's instruction may include a variety of changes to camera parameters in addition to zooming. Therefore, the camera software determines what zoom level is required from the user's instruction.

At step 1306, the camera software checks configuration parameters to determine the position where the optical element tray is required to be moved to achieve the user selected zoom level or focal length. The software can determine optical element tray position by referring to configuration parameters. The configuration parameters list each available zoom level or focal length with the optical element tray positions required to achieve that zoom level or focal length. The available zoom levels or focal lengths may be stored in a file, array, table, or simply coded into the software. Because the available zoom levels are discrete, when the user chooses a zoom level that is not exactly the same as one of the available discrete zoom levels, the software needs to find the closest available discrete zoom level that is no higher than the user selected zoom level. Then digital zoom is combined to achieve the user's desired zoom level. The optical element tray positions are stored in the configuration parameters, and it is possible to know which lenses to be selected to achieve the user's desired zoom level and focal length based on the current readings of a position sensor. The tray position may be sensed using hall-effect sensors, light sensors, barcode readers, motor position sensors or the like, or be determined from the relative position from a currently known lens. One of ordinary skill in the art would recognize that there are a variety of ways to sense or determine the position of the optical element trays without departing from the spirit and scope of the present invention.

Once the optical element tray positions are determined from the configuration parameters, the camera software sends a signal to move the optical element tray to the correct position. The camera software can monitor the optical element tray position with sensors, and continues sending movement commands until the desired optical element tray position is reached. Alternatively, the camera can know the position of the optical element trays and send a well-set movement command to move the optical element tray to the suitable position.

The camera software may also automatically control an iris aperture incorporated into the optical path changing system. If the user wants to capture fast movement photo or take a photo in low light conditions, the user can set the camera to high speed mode, or a sensor can detect that the low light mode is needed to take a photo. In either case, the software responds by sending a signal to the iris aperture to increase the aperture size and select a general purpose lens. If the user sends a zoom-in instruction using the software, the software will control the motor to move the optical element tray to the telephoto position.

The camera software can also provide a "professional" mode for more advanced users to allow users to directly select the lenses and the aperture size to be used. Depending on the optical element options available in the optical element tray, the camera software may present to the user the available optical software and combinations as options. If an optical element tray includes filters, the camera software may include the filters as an option. If all the optical element trays contain lenses, the camera software can know available lens combinations, calculate each combination's Effective Focal Length (EFL), and present to the user the available options or a spectrum of options without the user needing to select each lens on each tray. When a large number of effective focal lengths are available through combination of lenses, the software may only allow the user to issue zoom-in and zoom-out instructions, and the software automatically determines and selects the appropriate combination of lenses, and then uses digital zoom smoothing to cover the gaps between each discrete level of optical zoom.

Digital zoom merely enlarges the photo that was captured by the imaging element without changing the resolution. This means that digital zoom incurs an image quality penalty and, in extreme cases, causes visible pixilation, blurriness, and distortion. In reality, there is no "enhance" command that magically brings out minute details of a photo that has been digitally enlarged. Therefore, if a savvy user may be concerned about preserving the native resolution of photographs, the software will allow the user to do away with digital zoom smoothing, and only use the discrete options of optical zoom through the various lens combinations in the optical element trays.

FIGS. 14-32 illustrate embodiments of optical path changing system comprising optical channels. In particular, the optical path changing system comprises a first optical element tray which forms multiple optical paths comprising a first optical path, wherein the first optical path comprises: an optical entrance from which a light enters the first optical element tray; an optical exit from which the light exits the first optical element tray; and a first optical channel arranged in the optical element tray between the optical entrance and the optical exit. The first optical channel is configured such that the geometric length of the first optical channel between the optical entrance and the optical exit is larger than the thickness of the first optical element tray, and the first optical element tray is configured to be movable for selecting a desired optical path. Here, the optical path represents any pathway the light travels through in the optical element tray from any optical entry to a corresponding optical exit, which can be the above optical window openings in the form of through-openings, or can be the described first optical channel comprising optical channels whose geometric lengths are larger than the thickness of the tray. In the embodiment, at least one of the multiple paths is the first optical path containing an optical channel whose geometric length is larger than the thickness of the tray, while the other optical paths can be any form, e.g., the through-hole form or the first optical path form described here. Optionally, the first optical element tray is a planar plate tray, for example, circular or rectangular. Such a planar plate tray is specially suitable for imaging devices with small thickness such as a smart phone. In particular, the first optical channel is substantially parallel to the planar plate tray, and the optical window opening is substantially perpendicular to the planner plate tray.

Optionally, the optical path changing system can further comprise: a first motor configured to be able to move the first optical element tray to select the desired optical path. It is possible to move the optical element tray without manual operation by setting the motor, allowing automation of optical path changing. Optionally, optical element(s) is/are installed in the first optical path to form an optical system with a first focal length. Since the geometric length of the first optical path is larger the thickness of the optical element tray, the optical system (for example, an imaging lens) formed by the first optical path can realize a relatively long focal length, realizing long focal length photo-taking in a miniaturized imaging device such as a smart phone.

Optionally, the first optical element tray also has an optical window opening formed by a through opening through the first optical element tray as a second optical path, optical element(s) is/are installed in the optical window opening to form an optical system with a second focal length, and the second focal length is smaller than the first focal length. By setting both the second optical path formed by a through-opening (whose geometric length is substantially equal to or smaller than the thickness of the tray) and the first optical path formed by an optical channel (whose geometric length is larger than the thickness of the tray), it is possible to make the optical element tray produce both optical systems with short focal lengths and optical systems with long focal lengths, meeting the zoom requirement of the imaging device on different focal lengths.

Figure 14:
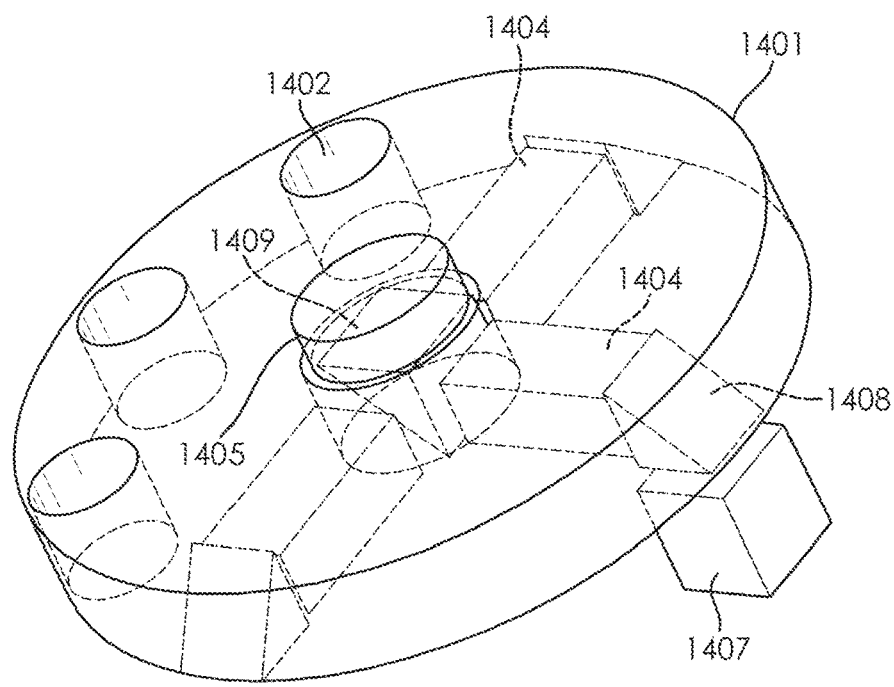
FIG. 14 illustrates a reflector centrally located in an optical element tray for combining lenses to produce long focal lengths according to an embodiment of the present subject matter.

FIG. 14 illustrates an embodiment of the optical element tray including an optical element tray 1401 to accommodate lens combinations with long focal lengths. In addition to the optical window openings 1402 included in other embodiments, there are also optical channels 1404 built into the optical element tray parallel to the plane of the optical element tray. An optical channel is a pathway for light created by wall(s) of specific material surrounding, enclosing, separating, or otherwise defining a pathway for light to travel through. An optical channel may hold one or more optical elements within it to manipulate the light as it passes through the optical channel. Alternatively, an optical channel may also be defined by a set of optical elements defining a pathway for light to travel through. One of ordinary skill in the art will recognize that the optical channel need not be cuboid or rectangular in shape it can also be cylindrical, oblong, oval, or any geometric shape. Rectangular optical channels are shown only for illustration purposes. One of ordinary skill in the art would recognize that the optical channel need not run strictly parallel to the plane of the optical element tray. The term parallel is used for simplicity and illustration purposes only and is not intended to be limiting. One or more lenses, filters, or other optical elements are placed within the optical channels 1404 to produce the desired focal length. One of ordinary skill in the art would understand how lenses, filters, and other optical elements could be arranged within the optical channel 1404 to achieve a desired focal length.

In each optical element tray, there is at least one optical entrance and at least one optical exit. The optical entrance is where light enters the optical element tray and the optical exit is where light exits the optical element tray. When an optical element tray includes only optical window openings, the optical entrance and optical exit are at the two ends of the optical window opening respectively. When optical channels and reflectors are included, the light does not merely pass straight through the optical element tray from face to back, but is reflected into a light path within the optical element tray before finally exiting toward an imaging element. In this case, the optical exit is not necessarily located exactly opposite the optical entrance.

In one embodiment, a central lens 1405 is placed in front of a central reflector 1409. A central lens 1405 is used in common by all of the optical channels 1404 and allows the limited dimensions of the optical element tray 1401 to be used more effectively to achieve long focal lengths. The central lens 1405 is optional and one of ordinary skill in the art would be able to determine when the central lens 1405 of appropriate focal length should be used to be combined with the optical channels 1404 to achieve the desired focal lengths.

The optical element tray in FIG. 14 is a circular tray 1401 with a hole in the center. A central reflector 1409 is fixed in the hole in the center of the optical element tray, and the optical element tray can rotate around the central reflector 1409 to line up any of the optical channels between the central reflector 1409 and the imaging unit 1407. Each optical channel 1404 has an optical entrance at the inside wall created by the hole in the center of the optical element tray 1401. The central reflector 1409 reflects incoming light into the optical entrance of one of the optical channels 1404. An outgoing reflector 1408 is placed at the other end of each optical channel 1404 to reflect the light into the imaging unit 1407.

The imaging device incorporating the optical element tray 1401 of FIG. 14 requires an entry for light, such as a camera window, aligned with the imaging unit 1407 near the perimeter of the optical element tray 1401 and an additional entry for light at the center of the optical element tray. According to one embodiment of the disclosure, the imaging device incorporating the optical element tray 1401 of FIG. 14 would have two camera windows. One camera window would be aligned with the optical window openings 1402 for short focal lengths, and the other camera window would be aligned with the central reflector 1409 for long focal lengths. The same imaging unit 1407 is used for both optical window openings 1402 and optical channels 1404 because the outgoing reflectors of the optical channels can also be aligned with the imaging unit 1407.

Figure 15:
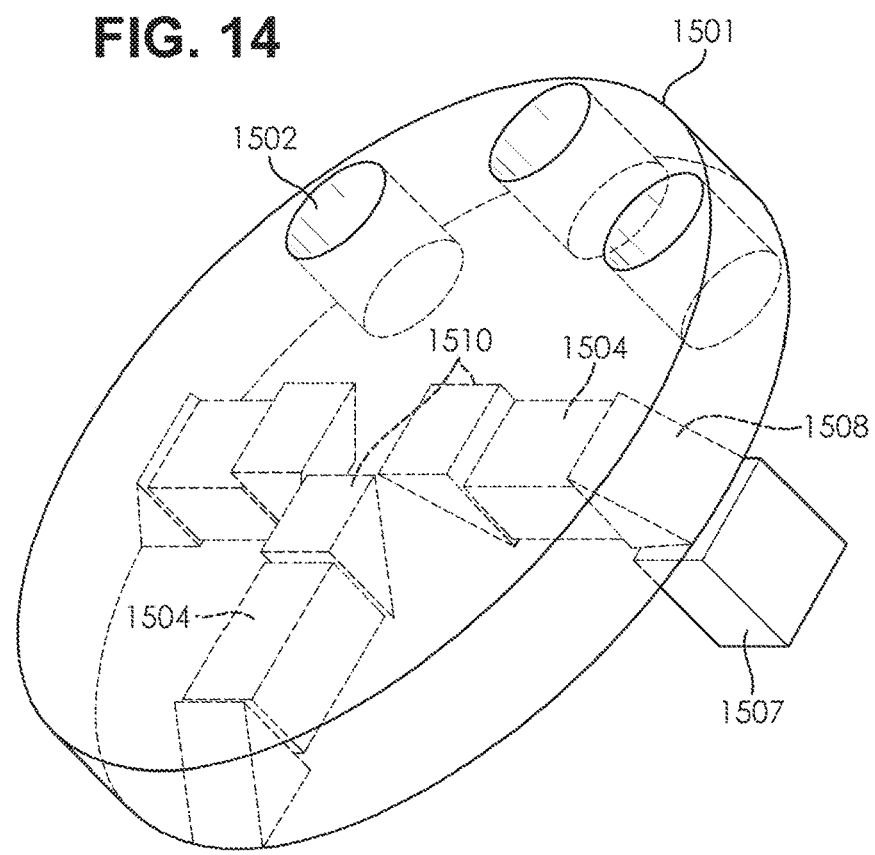
FIG. 15 illustrates lens combination with long focal lengths being placed in an optical element tray according to an embodiment of the present subject matter.

FIG. 15 illustrates another embodiment of the optical element tray including an optical element tray 1501 designed to accommodate lens combinations with long focal lengths. The optical element tray of FIG. 15 differs from the optical element tray of FIG. 14 in that its optical element tray does not have a central reflector, but instead has an incoming reflector 1510 for each optical channel 1504. According to one embodiment the present disclosure, the imaging device incorporating the optical element tray 1501 of FIG. 15 needs two camera windows. One camera window lines up with the outer perimeter of the optical element tray, and is used for the optical window openings 1502. The second camera window aligns with the incoming reflectors 1510, and is used for the optical channels 1504. When using optical channels 1504 to take long focal length pictures, light enters the incoming reflector 1510, is reflected into the optical channel 1504, is refracted by lenses or subject to other optical elements, and then reaches the outgoing reflector 1508. The outgoing reflector 1508 reflects the light to the imaging unit 1507 placed under the optical element tray. For the optical element trays in FIG. 14 and FIG. 15, light may not enter through the same light entry or camera window, but light always be projected into the same imaging unit 1407 or 1507.

Figure 16:
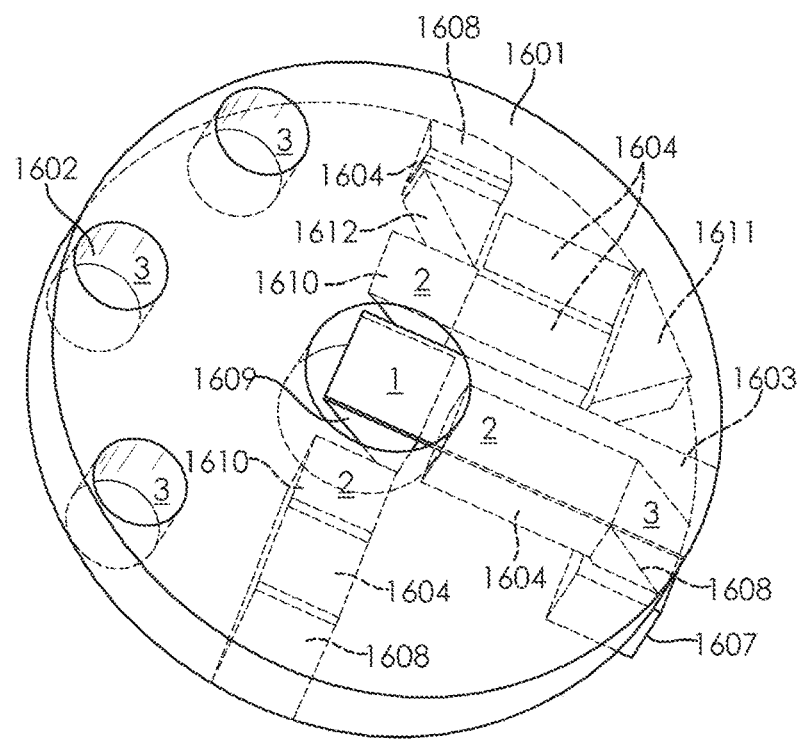
FIG. 16 illustrates an optical element tray with an elongated camera window opening for meeting the requirement of different long focal length lens combinations needing different light entry openings according to an embodiment of the present subject matter.

FIG. 16 illustrates another embodiment of the optical element tray including an optical element tray 1601 with an elongated camera window 1603 for accommodating multiple light entries to produce a variety of different long focal lengths. There are three light entries on the elongated camera window 1603. The first entry marked 1 is in the center of the optical element tray. Light enters at point 1 and is reflected through a central reflector 1609 and then enters an optical channel 1604. At the end of the optical channel 1604, an outgoing reflector reflects the light toward the imaging unit 1607. Once the light passes through the outgoing reflector 1608, it is in the same location and orientation as if it had passed through an ordinary optical window opening 1602.

The second light entry is marked 2. There are two reflector and optical channel combinations that align with light entry 2, and they are marked with 2 accordingly. One of these is identical to the reflector and optical channel combination shown in FIG. 15. The other reflector and optical channel combination comprises two optical channels 1604 and a double reflector 1611 joining the two optical channels 1604. When this combination is aligned with the imaging unit 1607, light enters the camera window 1603 at point 2 and is reflected by an incoming reflector 1610 to enter the first optical channel 1604. The double reflector causes the light to be redirected 180 degrees into a second optical channel 1604. At the exit of the second optical channel 1604, an intermediate reflector 1612 reflects the light toward the outer perimeter of the optical element tray 1601. After this point, the light passes through a final optical channel 1604 before being reflected by the outgoing reflector 1608 toward the imaging unit 1607.

In another embodiment, the second optical channel 1604 extends to the edge of the optical element tray where an outgoing reflector 1608 reflects light toward the imaging unit 1607. Depending on different arrangements, the light may or may not pass through an intermediate reflector 1612 and/or a third optical channel 1604 before reaching the outgoing reflector 1608 which reflects the light toward the imaging unit 1607. One of ordinary skill in the would recognize that any arrangement of one or more reflectors and one or more optical channels can be used to achieve the desired focal length and arrange the optical exit at the desired location without departing from the spirit and scope of the present invention.

The third optical entry is marked 3. Each of the ordinary optical window openings 1602 lines up with entry 3, and light can pass directly through the optical window openings 1602 to enter the imaging unit 1607. In another embodiment, a separate camera window is placed at each of positions 1, 2, and 3. One of ordinary skill in the art would recognize that the arrangement of reflectors and optical channels could utilize more or fewer entries at various positions that line up with optical entrances of the optical element tray 1601 without departing from the spirit and scope of the present invention.

Figure 17:
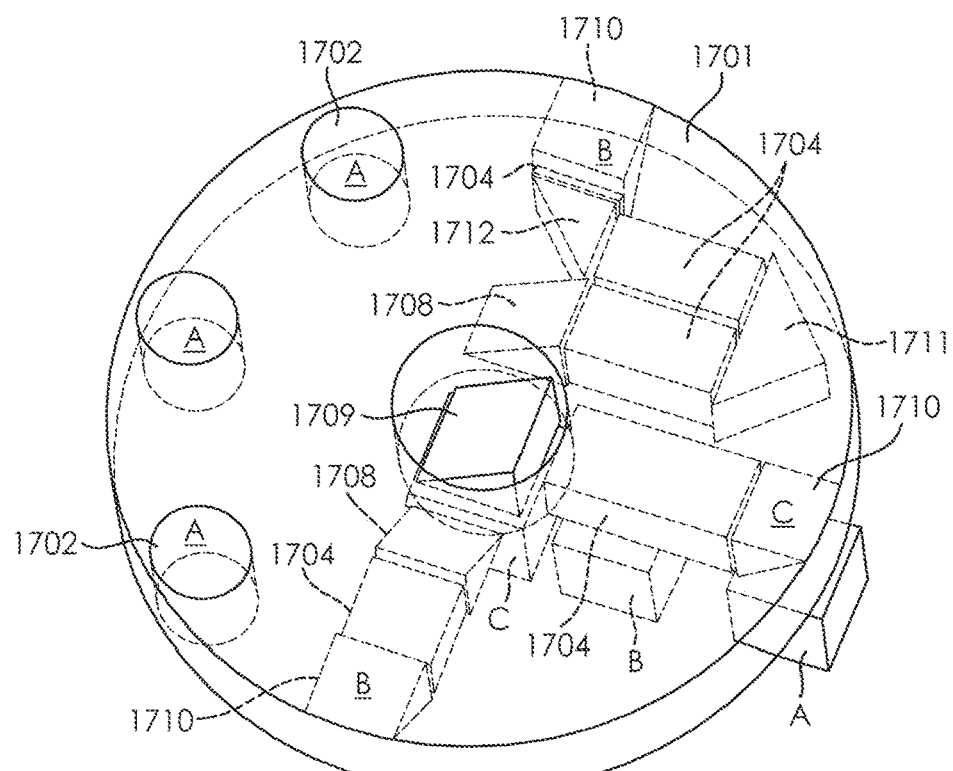
FIG. 17 illustrates an optical element tray with multiple imaging elements for meeting the requirement of different focal lengths sharing the same light entry opening according to an embodiment of the present subject matter.

FIG. 17 illustrates another embodiment of the optical element tray including an optical element tray 1701 that uses only a single entry or camera window, but includes three imaging units in order to accommodate various focal lengths with the optical element tray 1701. According the an embodiment shown in FIG. 17, there are three imaging units marked A, B, and C. Imaging unit A aligns with the optical window openings 1702 of the optical element tray just as in the previously described optical element trays.

Imaging unit B aligns with two of the reflector and optical channel arrangements where the incoming reflectors 1710 which are also marked with B. The first arrangement is identical to the reflector and optical channel arrangements described in FIG. 15, except that the orientation is reversed. The light enters at the incoming reflector 1710 through an optical window opening at the outer perimeter of the optical element tray. The incoming reflector 1710 then reflects the light into the optical channel 1704 and the outgoing reflector 1708 reflects the light into imaging unit B.

The second arrangement is similar to the second arrangement shown in FIG. 16, but again, the direction is reversed. Light enters the incoming reflector 1710, and depending on the arrangement, may pass through a short optical channel 1704 before entering an intermediate reflector 1712. The intermediate reflector reflects the light into a first optical channel 1704. A double reflector 1711 redirects the light 180 degrees and into a second optical channel 1704. Finally, an outgoing reflector 1708 reflects the light again into the imaging unit B.

The third reflector and optical channel arrangement is similar to the arrangement in FIG. 16, but the orientation is reversed. Light enters the incoming reflector 1710 positioned at the outer perimeter of the optical element tray 1701. The incoming reflector 1710 reflects the light into the optical channel 1704. Finally, the center reflector 1709 reflects the light into the imaging unit C. Alternatively, imaging unit C could be moved to take the place of the center reflector 1709 such that the light exiting through the optical exit of the optical channel 1704 enters directly into imaging unit C. One of ordinary skill in the art would recognize that the arrangement of reflectors and optical channels could utilize more or fewer imaging units at various positions without departing from the spirit and scope of the present invention.

In another embodiment, an imaging unit may be arranged directly at the optical exit of the optical path to receive an image without being redirected by a reflector such as a prism, lens, lenses system or the like. For example, in FIGS. 14-16, an imaging unit may be placed at the outer perimeter of the optical element tray facing the side of the optical element tray so that the optical exit is on the outer edge of the optical element tray. In the embodiment of FIG. 17, an imaging unit may be placed in the center of the optical element tray and the light would exit the inner wall of the optical element tray to reach the imaging unit. Optical channels may pass through the center of the optical element tray, or extend from one side to the opposite side and be combined with any number of reflectors to accomplish the purpose of directing the light toward an imaging element. These and other embodiments are described with more detail below with reference to FIGS. 18-21.

Figure 18:
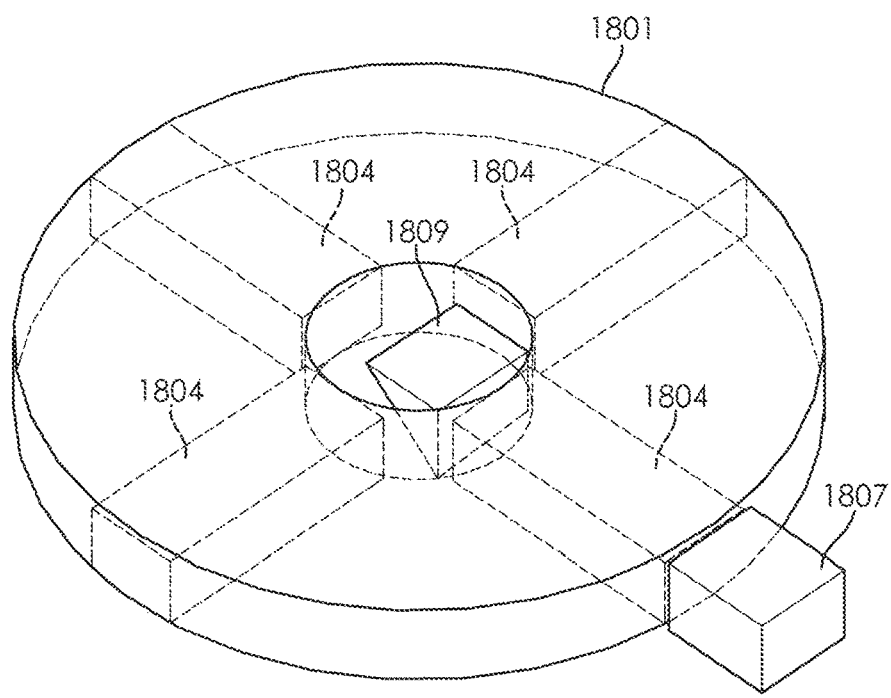
FIG. 18 illustrates an optical element tray with multiple movable optical channels, a reflector and an imaging element placed outside the moving optical element tray according to an embodiment of the present subject matter.

FIG. 18 illustrates another embodiment of the optical element tray including an optical element tray 1801 which contains only optical channels 1804. Light enters an incoming central reflector 1809 and is then reflected into one of the optical channels 1804. Which optical channel the light enters depends on which one is aligned between the central reflector 1809 and the imaging unit 1807. This design may also be reversed, where the incoming reflector is arranged on the outer perimeter of the optical element tray 1801, and the imaging unit 1807 is positioned within the hole in the center of the optical element tray 1801.

Figure 19:
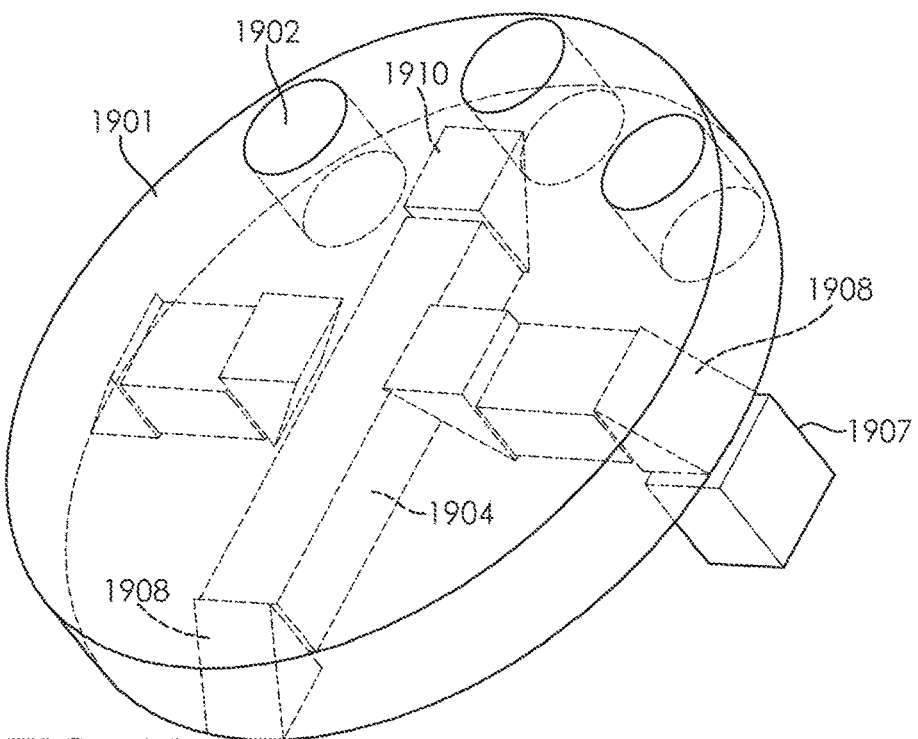
FIG. 19 illustrates an optical element tray with an extended optical channel passing through the geometric center of the optical element tray according to an embodiment of the present subject matter.

FIG. 19 illustrates another embodiment of the optical element tray including an optical element tray 1901 where one of the optical channels 1904 passes through the geometric center of the circular optical element tray 1901. This allows for an optical channel 1904 to be longer than the radius of the circular optical element tray. Light enters the incoming reflector 1910 and is then reflected into the optical channel 1904. As light exits from the exit of the optical channel 1904, it is reflected again into the imaging unit by an outgoing reflector 1908.

In the example of FIG. 19, there are two options for the different camera window locations that can accommodate different reflector and optical channel arrangements. The first option is to have an additional or extended camera window positioned at or extended to the location of the incoming reflector of the longest optical channel 1904 when the longest optical channel 1904 is lined up with the imaging unit 1907. If the longest optical channel 1904 extends to the opposite end of the optical element tray 1901, a second option can be used such that the optical channel 1904 and the optical window openings 1902 share the same camera window. In this case, if an additional imaging unit 1907 is located at the opposite side of the optical element tray 1901, then the ordinary optical window openings 1902 on the optical element tray 1901 can also line up with another camera window.

Figure 20:
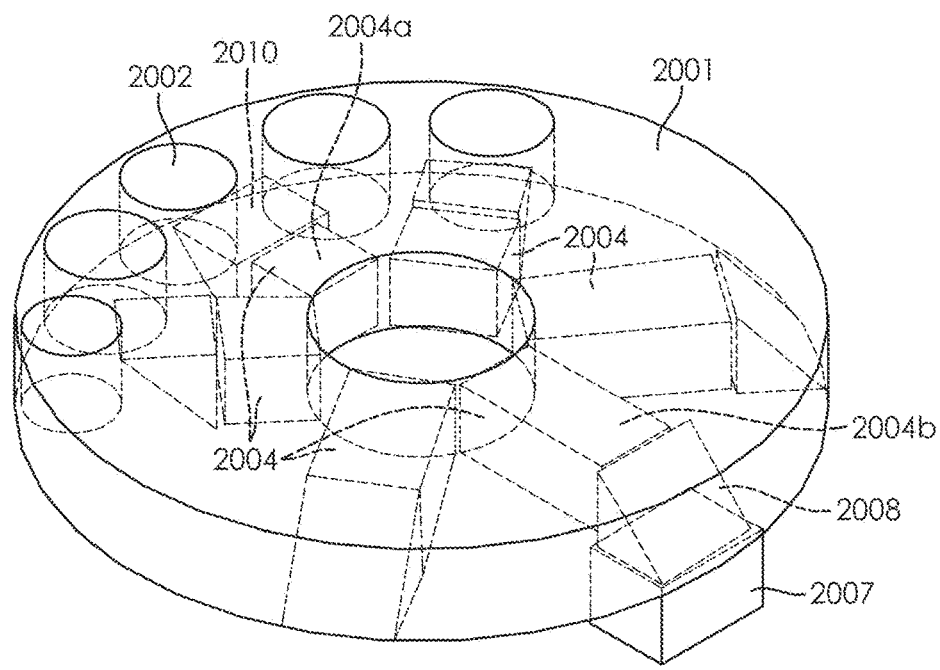
FIG. 20 illustrates an optical element tray with multiple pairs of optical channels arranged around the geometric center of the optical element tray according to an embodiment of the present subject matter.

FIG. 20 illustrates another embodiment of the optical element tray in which several optical channels 2004 are arranged around a hole in the center of an annular optical element tray 2001. Each optical channel 2004 is paired with another optical channel across the central hole. Light enters the incoming reflector 2010 and is then reflected into the first optical channel 2004*a*. As the light exits the first optical channel 2004*a*, it enters the central hole of the optical element tray and crosses to the other side to enter the second optical channel 2004*b*. At the other end of the second optical channel 2004*b*, the outgoing reflector 2008 reflects the light into the imaging unit 2007. The tray rotates to line up one set of reflectors 2008, 2010 and one pair of optical channels 2004 with the imaging unit 2007. When an optical window opening 2002 is used, light passes directly through the optical window opening 2002 into the imaging unit 2007.

Figure 21:
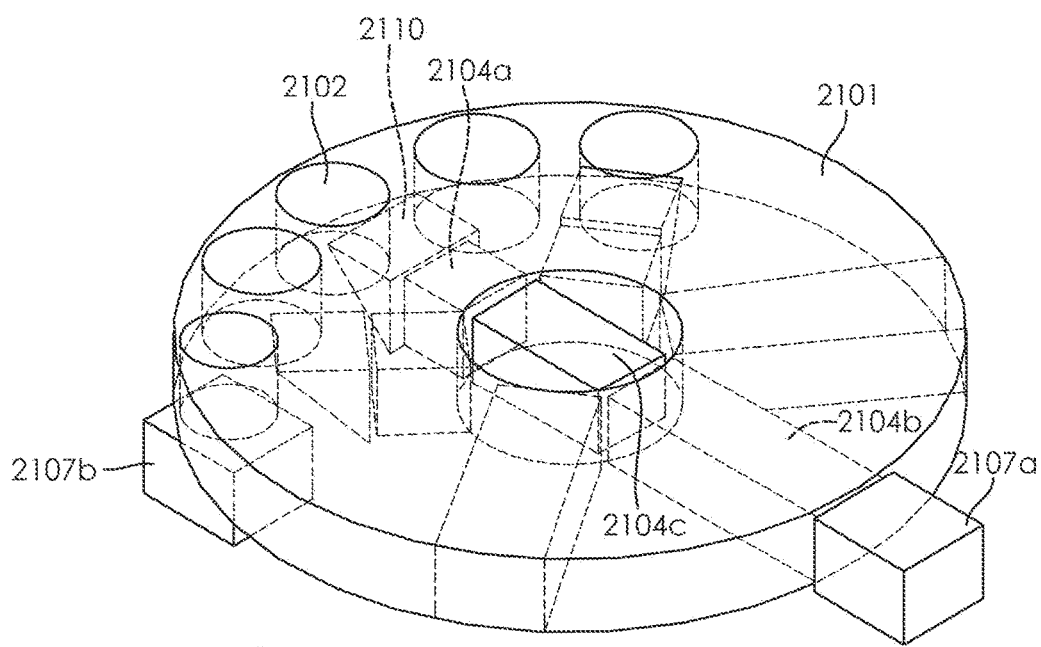
FIG. 21 illustrates an optical element tray with multiple pairs of optical channels arranged around the geometric center of the optical element tray in which one optical channel is arranged in geometric center of the optical element tray according to an embodiment of the present subject matter.

FIG. 21 illustrates another embodiment of the optical element tray in which several optical channels are arranged around a central optical channel 2104*c* placed in the center of an annular or circular optical element tray 2101. The central optical channel 2104*c* is fixed in the center of the annular optical element tray 2101, and the annular optical element tray 2101 rotates around the central optical channel 2104*c* to line up one pair of optical channels with the central optical channel 2104*c*. When optical channels 2104*a*, 2104*b* are aligned with the central optical channel 2104*c*, light enters at the incoming reflector 2110 and is reflected into the first optical channel 2104*a*. The light exits from the first optical channel 2104*a* and then passes through the central optical channel 2104*c* to enter the second optical channel 2104*b*. In this embodiment, the optical channels do not end with an outgoing reflector, but instead, the light exits from the optical channel and then enters the imaging unit 2107*a* positioned at the outer perimeter of the optical element tray.

In another embodiment, the central optical channel 2104*c* contains a lens or lens stack that is common to all the optical channels. This allows the same lens or lens stack to be shared among all optical channel combinations, reducing size, weight, and cost. Alternatively, the central optical channel 2104*c* may contain other optical elements or have no optical elements at all.

A second imaging unit 2107*b* is placed under the optical element tray. This imaging unit 2107*b* operates in combination with the optical window openings 2102. In another embodiment, the incoming reflector 2110 is placed at the outer edge of the optical element tray 2101 where the optical window opening 2102 is. This allows the pathway of light to extend across the entire diameter of the annular or circular optical element tray 2101, allowing for long focal length lens combinations. With this type of arrangement, optical window openings 2102, incoming reflectors 2110, and optical channels can be alternated around the perimeter of the optical element tray 2101. Only a single camera window can be used if the imaging units 2107*a*, 2107*b* are positioned appropriately at opposite ends of the optical element tray.

Figure 22:
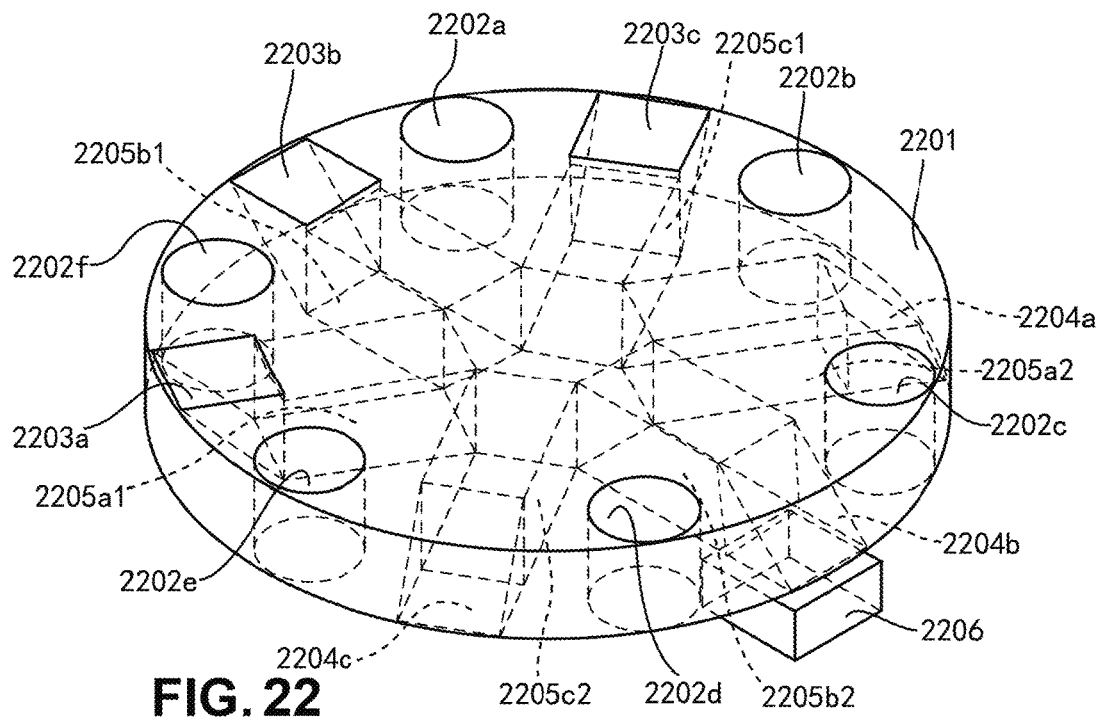
FIG. 22 illustrates an optical element tray with multiple pairs of optical channels arranged around the geometric center of the optical element tray according to an embodiment of the present subject matter.

FIG. 22 illustrates another embodiment of the optical element tray which is similar to the embodiment in FIG. 20. The difference is that the incoming reflector 2203*a*, 2203*b* and 2203*c* are placed at the outer perimeter of the circular optical element tray such that each group of optical channels (2205*a*1/2205*a*2, 2205*b*1/2205*b*2 and 2205*c*1/2205*c*2) can make most of the diameter of the optical element tray to obtain longer focal lengths. The ordinary optical window openings 2202*a*-2202*f* are also placed at the outer perimeter of the circular optical element tray alternately with the optical channels. By rotating the circular optical element tray, it's able to align one of the outgoing reflector 2204*a*, 2204*b*, 2204*c*, or one of the optical window opening 2202*a*-2202*f* with the imaging unit 2206. The optical element tray needs two camera window and only one imaging unit 2206.

Figure 23:
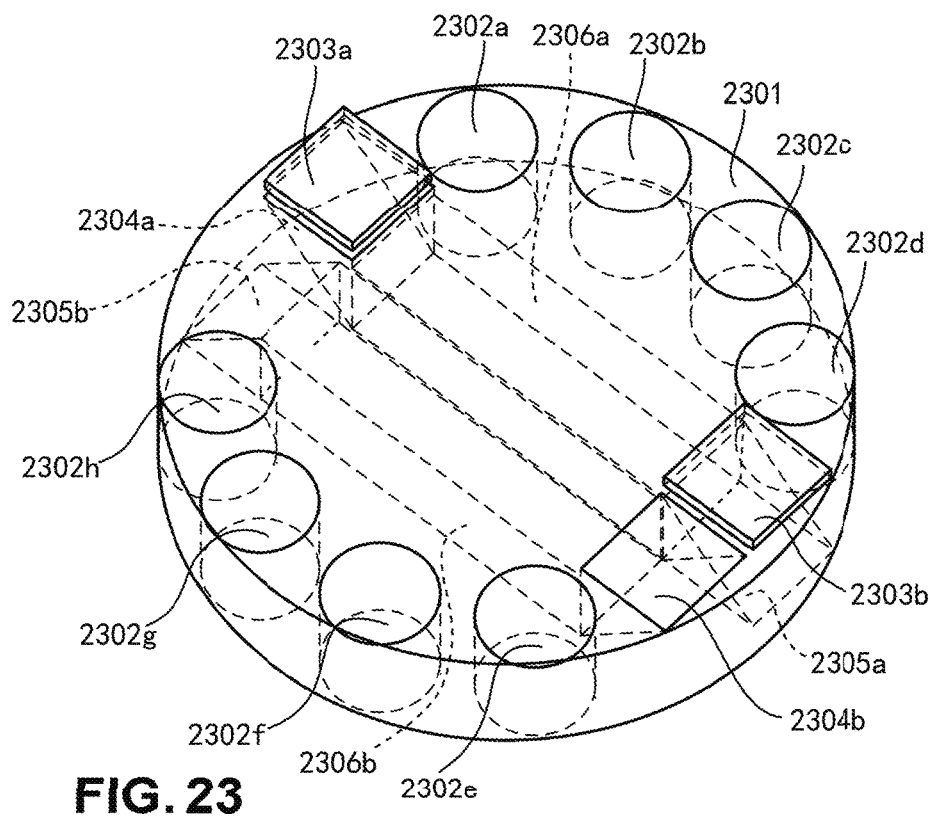
FIG. 23 illustrates an optical element tray with multiple optical channels which do not passing through the geometric center of the optical element tray according to an embodiment of the present subject matter.
Figure 24:
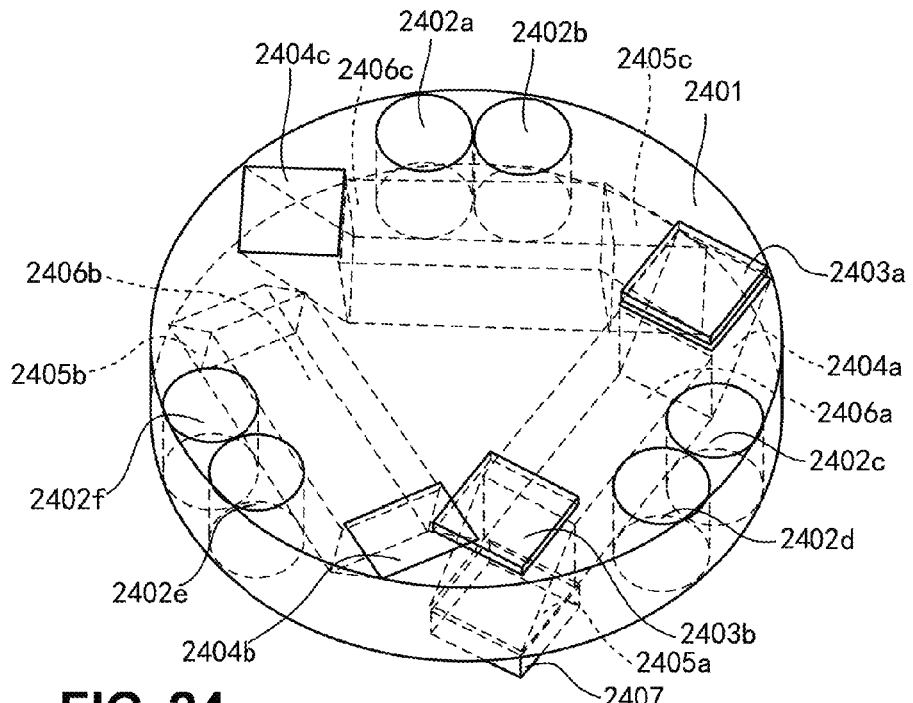
FIG. 24 illustrates an optical element tray with multiple optical channels which do not passing through the geometric center of the optical element tray wherein the optical channels approximately form a triangle according to an embodiment of the present subject matter.
Figure 25:
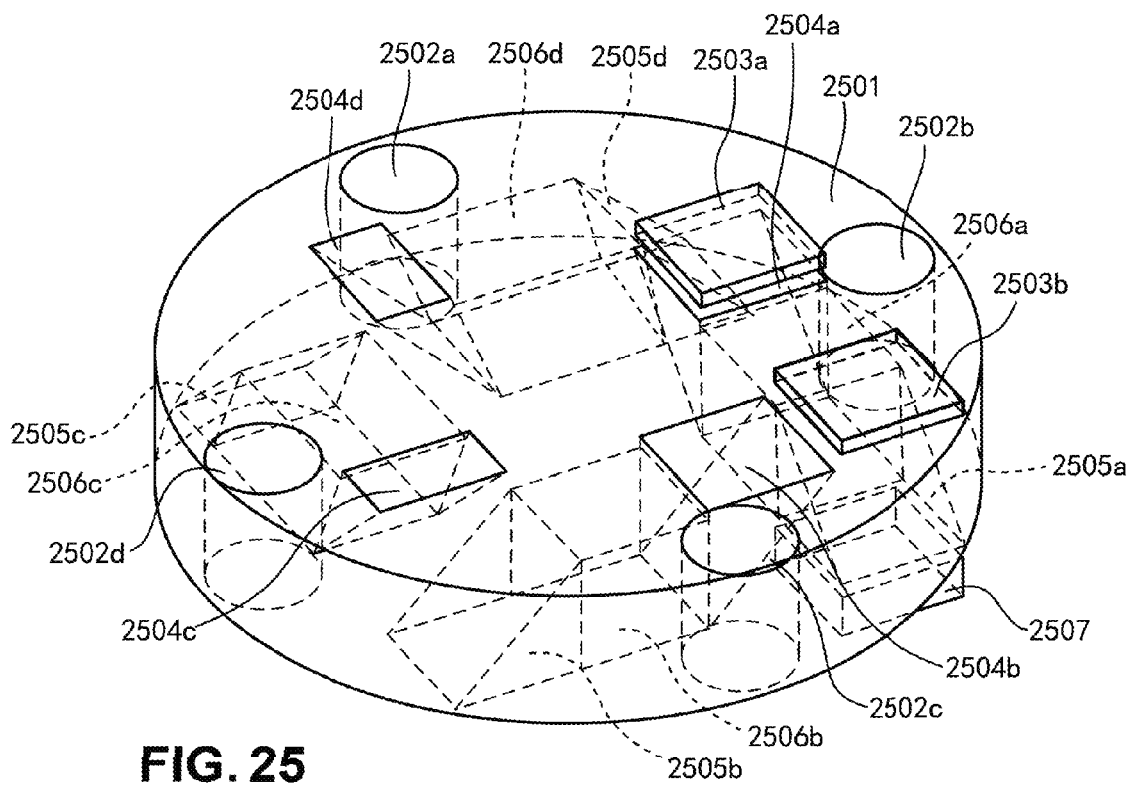
FIG. 25 illustrates an optical element tray with multiple optical channels which do not passing through the geometric center of the optical element tray wherein the optical channels approximately form a quadrangle according to an embodiment of the present subject matter.

FIGS. 23-25 illustrate several other embodiments of the optical element tray. In these embodiments, the optical paths do not pass through the center (e.g., geometric center, or central axis) of the optical element tray, and each optical channel is completely independent (i.e., does not intersect with another optical channel). The incoming reflectors are placed in the optical element tray adjacent to the perimeter of the optical element tray. An incoming reflector can be placed at any position that ensures the optical channels do not interfere with each other. Depending on the position of each incoming reflector, the optical element tray may need two or more camera windows. If the outgoing reflector and the optical window openings are positioned at the outer perimeter of the optical element tray. By rotating the circular optical element tray, the outgoing reflector or the optical window opening can be aligned with the imaging unit. Such an optical element tray uses only one imaging unit.

FIG. 23 illustrates another embodiment of the optical element tray including an optical element tray 2301 designed to accommodate optical element combinations with different focal lengths and/or optical effects. In one embodiment, two optical components, optical component 2303*a* and optical component 2303*b*, are placed on the optical element tray 2301. The optical component 2303*a* and the optical component 2303*b* can each include a camera window, a glass cover, a lens, a stack of lenses, a filter, and/or a stack of filters. When the optical element tray 2301 rotates, the optical component 2303*a* and the optical component 2303*b* stay in fixed positions relative to each other and do not rotate with the optical element tray 2301. In one embodiment, the device incorporating the optical element tray 2301 has two light entries. A first light entry is the optical component 2303*b*. When the optical element tray 2301 is rotated to a desired position, one of the optical window openings 2302*a*, 2302*b*, 2302*c*, 2302*d*, 2302*e*, 2302*f*, 2302*g*, and 2306*h* is aligned with the optical component 2303*b*. Light travels through the optical component 2303*b* and one of the optical window openings 2302*a*-2302*h*, and then projects on an imaging element placed under the optical element tray 2301. A second light entry is the optical component 2303*a*. When the optical element tray 2301 is rotated to a desired position, the incoming reflector 2304*a* is aligned with the optical component 2303*a*, and the optical channel 2306*a* is used as part of the optical path. Light travels through the optical component 2303*a* and the incoming reflector 2304*a*, and is then redirected to the optical channel 2306*a* and travels through the optical channel 2306*a* including lens(es) and/or other optical device(s) (if any) that may be in the optical channel 2306*a* before reaching the outgoing reflector 2305*a*. The outgoing reflector 2305*a* redirects the light to the imaging element placed under the optical element tray 2301. When the optical element tray 2301 is rotated to align the incoming reflector 2304*b* with the optical component 2303*a*, the optical channel 2306*b* and outgoing reflector 2305*b* are used as part of the optical path. In addition to or in place of providing various focal lengths, the optical window openings 2302*a*-2302*h* and the optical channels 2306*a* and 2306*b* may also provide various types of optical effects. Neither of the optical channels 2306*a* and 2306*b* passes through the center (e.g., the geometric center or the central axis of rotation) of the optical element tray 2301. Depending on the design of an optical system, the optical component 2303*a* and the optical component 2303*b* are optional. One of ordinary skill in the art would recognize that an optical element tray can be designed without the optical component 2303*a* and/or the optical component 2303*b*.

FIG. 24 illustrates another embodiment of the optical element tray including an optical element tray 2401 designed to accommodate optical element combinations with different focal lengths and/or optical effects. In one embodiment, an optical component 2403*a* and an optical component 2403*b* are placed on the optical element tray 2401. The optical component 2403*a* and the optical component 2403*b* can each include a camera window, a glass cover, a lens, a stack of lenses, a filter, and/or a stack of filters. When the optical element tray 2401 rotates, the optical component 2403*a*, the optical component 2403*b*, and the imaging element 2407 stay in fixed positions relative to each other and do not rotate with the optical element tray 2401, in one embodiment, the device incorporating the optical element tray 2401 has two light entries. A first light entry is the optical component 2403*b*. When the optical element tray 2401 is rotated to a desired position, one of the optical window openings 2402*a*, 2402*b*, 2402*c*, 2402*d*, 2402*e*, and 2402*f* is aligned with the optical component 2403*b*. Light travels through the optical component 2403*b* and one of the optical window openings 2402*a*-2402*f*, and then projects on an imaging element 2407 placed under the optical element tray 2401. A second light entry is the optical component 2403*a*. When the optical element tray 2401 is rotated to a desired position, the incoming reflector 2404*a* is aligned with the optical component 2403*a*, and the optical channel 2406*a* is used as part of the optical path. Light travels through the optical component 2403*a* and the incoming reflector 2404*a*, and is then redirected to the optical channel 2406*a* and travels through the optical channel 2406*a* including lens(es) and/or other optical device(s) (if any) that may be in the optical channel 2406*a* before reaching the outgoing reflector 2405*a*. The outgoing reflector 2405*a* redirects the light to the imaging element 2407 placed under the optical element tray 2401. When the optical element tray 2401 is rotated to align the incoming reflector 404*b* with the optical component 2403*a*, the optical channel 2406*b* and outgoing reflector 2405*b* are used as part of the optical path. Likewise, when the optical element tray 2401 is rotated to align the incoming reflector 2404*c* with the optical component 2403*a*, the optical channel 2406*c* and outgoing reflector 2405*c* are used as part of the optical path. In addition to or in place of providing various focal lengths, the optical window openings 2402*a*-2402*f* and the optical channels 2406*a*-2406*c* may also provide various optical effects. None of the optical channels 2406*a*-2406*c* passes through the center (e.g., the geometric center or the central axis of rotation) of the optical element tray 2401. Depending on the design of an optical system, the optical component 2403*a* and the optical component 2403*b* are optional. One of ordinary skill in the art would recognize that an optical element tray can be designed without the optical component 2403*a* and/or the optical component 2403*b*.

FIG. 25 illustrates another embodiment of the optical element tray including an optical element tray 2501 designed to accommodate optical element combinations with different focal lengths and/or optical effects. In one embodiment, an optical component 2503*a* and an optical component 2503*b* are placed on the optical element tray 2501. The optical component 2503*a* and the optical component 2503*b* can each include a camera window, a glass cover, a lens, a stack of lenses, or a filter. When the optical element tray 2501 rotates, the optical component 2503*a*, the optical component 2503*b*, and the imaging element 2507 stay in fixed positions relative to each other and do not rotate with the optical element tray 2501. In one embodiment, the device incorporating the optical element tray 2501 has two light entries. A first light entry is the optical component 2503*b*. When the optical element tray 2501 is rotated to a desired position, one of the optical window openings 2502*a*, 2502*b*, 2502*c* or 2502*d* will be aligned with the optical component 2503*b*. Light travels through the optical component 2503*b* and one of the optical window openings 2502*a*-2502*d*, and then projects on an imaging element 2507 placed under the optical element tray 2501. A second light entry is the optical component 2503*a*. When the optical element tray 2501 is rotated to a desired position, the incoming reflector 2504*a* is aligned with the optical component 2503*a*, and the optical channel 2506*a* is used as part of the optical path. Light travels through the optical component 2503*a* and the incoming reflector 2504*a*, and is then redirected along the optical channel 2506*a* and travels through the optical channel 2506*a* including lens(es) and/or other optical device(s) (if any) that may be in the optical channel 2506*a* before reaching the outgoing reflector 2505*a*. The outgoing reflector 2505*a* redirects the light to the imaging element 2507 placed under the optical element tray 2501. When the optical element tray 2501 is rotated to align the incoming reflector 2504*b* with the optical component 2503*a*, the optical channel 2506*b* and outgoing reflector 2505*b* are used as part of the optical path. When the optical element tray 2501 is rotated to align the incoming reflector 2504*c* with the optical component 2503*a*, the optical channel 2506*c* and outgoing reflector 2505*c* are used as part of the optical path. Likewise, when the optical element tray 2501 is rotated to align the incoming reflector 2504*d* with the optical component 2503*a*, the optical channel 2506*d* and outgoing reflector 2505*d* are used as part of the optical path. In addition to or in place of providing different focal lengths, the optical window openings 2502*a*-2502*d* and the optical channels 2506*a*-2506*d* may also provide various optical effects. None of the optical channels 2506*a*-2506*d* passes through the center (e.g., the geometric center or the central axis of rotation) of the optical element tray 2501. Depending on the design of an optical system, the optical component 2503a and the optical component 2503b are optional. One of ordinary skill in the art would recognize that an optical element tray can be designed without the optical component 2503a and/or the optical component 2503b.

Figure 26:
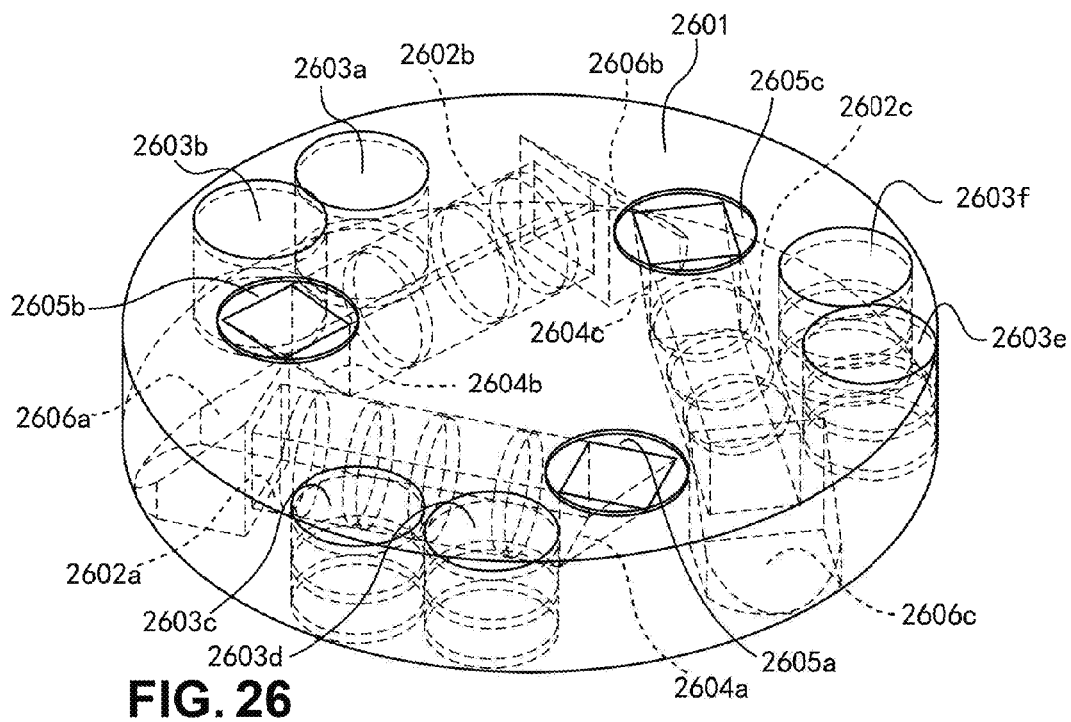
FIG. 26 illustrates a specific implementation of an optical element tray with multiple optical channels which do not passing through the geometric center of the optical element tray according to an embodiment of the present subject matter.

FIG. 26 illustrates another embodiment of the optical element tray including an optical element tray 2601, which is a planar plate tray, and preferably a circular tray. The optical element tray 2601 includes three optical channels 2602a, 2602b, and 2602c that do not pass through the center (e.g., the geometric center or the central axis of rotation) of the tray, and includes six optical window openings 2603a, 2603b, 2603c, 2603d, 2603e, and 2603f formed by though-holes. Each of these optical window openings can hold one or more optical elements (e.g., one or more lenses and/or one or more filters) to produce desirable optical effects (e.g., various focal lengths and/or filtering effects). In one embodiment, one or more of the optical window openings do not hold any optical element. Similarly, each of the optical channels 2602a-2602c can include one or more optical elements (e.g., one or more lenses and/or one or more filters) to produce desirable optical effects (e.g., various focal lengths and/or various filtering effects). Reflectors are placed at the entrance and exit of each optical channels to change the direction of the optical paths. Using the optical channel 2602a as an example, an incoming reflector 2604a (e.g., a mirror or a right angle prism) is arranged at the entrance of the optical channel 2602a (at the light entry of the tray where light enters the tray such that the light traveling towards the tray 2601 can be reflected by the incoming reflector 2604a into the optical channel 2602a. As illustrated, the incoming reflector 2604a can reflect the light to redirect its direction of travel from being perpendicular to the tray surface (i.e., parallel to the central axis of rotation) to being parallel to the tray surface (i.e., perpendicular to the central axis of rotation). In one embodiment, one or more optical elements 2605a, 2605b, and 2605c can be arranged in front of the incoming reflectors 2604a, 2604b, and 2604c, respectively, in the optical path. FIG. 26 schematically shows a lens 2605a is arranged before the incoming reflector 2604a. At the exit of the optical path 2602a (where the light exit the tray), an outgoing reflector 2606a is arranged to change the direction of the optical path at the optical exit. The outgoing reflector 2606a is a right angle prism with parts being cut, whose function is the same as a right angle prism. The outgoing reflector 2606a can reflect the light to redirect its direction of travel from being parallel to the tray surface to being perpendicular to the tray surface and exit the tray 2601. When the optical element tray 2601 shown in FIG. 26 is applied to the imaging device such as a camera, different optical paths formed by optical channels 2602a-2062c and optical window openings 2603a-2603f respectively can share the same imaging element. Since the optical exits of the multiple optical paths are substantially the same distance from the geometric center of the optical element tray 2601, when some optical path needs to be selected, it only needs to rotate the optical exit of said optical path to be aligned with the imaging element. However, an imaging device using the optical element tray 2601 needs two camera windows for the incoming of the light. One is used for the optical paths formed by the optical window openings 2603a-2603f, and the other is used for the optical paths formed by the optical channels 2602a-2602c. If the optical entrances of all the optical paths are arranged to have substantially the same distance from the geometric center of the optical element tray 2601, it is possible to only use one camera window and two imaging elements.

Figure 27:
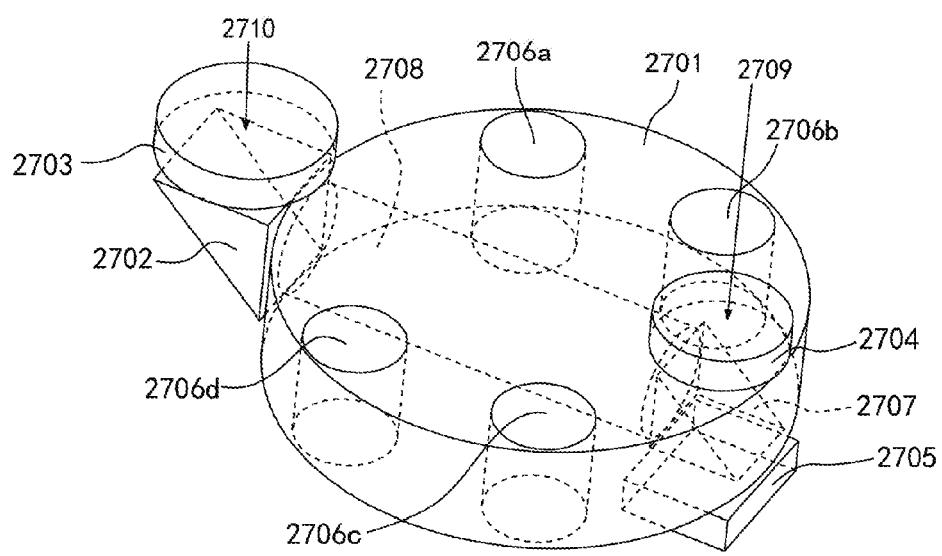
FIG. 27 illustrates an optical element tray with a fixed incoming reflector positioned adjacent an outer perimeter of the optical element tray, and an optical channel passing through the geometric center of the optical element tray according to an embodiment of the present subject matter.

FIG. 27 illustrates another embodiment of the optical e element tray including an optical element tray 2701 designed to accommodate optical element combinations with various focal lengths and/or optical effects. The optical element tray 2701 has an incoming reflector 2702 at the outer perimeter of the optical element tray 2701. An optical component 2703 is placed on the incoming reflector 2702. The optical component 2703 can include a camera window, a glass cover, a lens, a stack of lenses, a filter, and/or a stack of filters. Another optical component 2704 is placed on the optical element tray 2701. The optical component 2704 is aligned with an imaging element 2705. The optical component 2704 can include a camera window, a glass cover, a lens, a stack of lenses, a filter, and/or a stack of filters. When the optical element tray 2701 rotates, the incoming reflector 2702, the optical component 2703, the optical component 2704, and the imaging element 2705 stay in fixed positions relative to each other and do not rotate with the optical element tray 2701. The device incorporating the optical element tray 2701 has two light entries. A first light entry 2709 lines up with the imaging element 2705. When the optical element tray 2701 is rotated to a desired position, one of the optical window openings 2706a, 2706b, 2706c, and 2706d is aligned with the light entry 2709. Light travels through the optical component 2704 and one of the optical window openings 2706a, 2706b, 2706c, and 2706d, and then projects on the imaging element 2705. A second light 2710 entry aligns with the incoming reflectors 2702. When the optical element tray 2701 is rotated to a desired position, the outgoing reflector 2707 is aligned with the imaging element 2705, and the optical channel 2708 is used as part of the optical path. Light travels through the optical component 2703 and the incoming reflector 2702, and is redirected to the optical channel 2708 and travels through the optical channel 2708 including lens(es) and/or other optical device (s) (if any) that may be in the optical channel 2708 before reaching the outgoing reflector 2707. The outgoing reflector 2707 redirects the light to the imaging element 2705 placed under the optical element tray 2701. In addition to or in place of providing various focal lengths, the optical window openings 2706a-2706d and the optical channel 2708 may also provide various optical effects. The optical channel 2708 passes through the center (e.g., the geometric center or the central axis of rotation) of the optical element tray 2701. Depending on the design of an optical system, the optical component 2703 and the optical component 2704 are optional. One of ordinary skill in the art would recognize that an optical element tray can be designed without the optical component 2703 and/or the optical component 2704.

Figure 28:
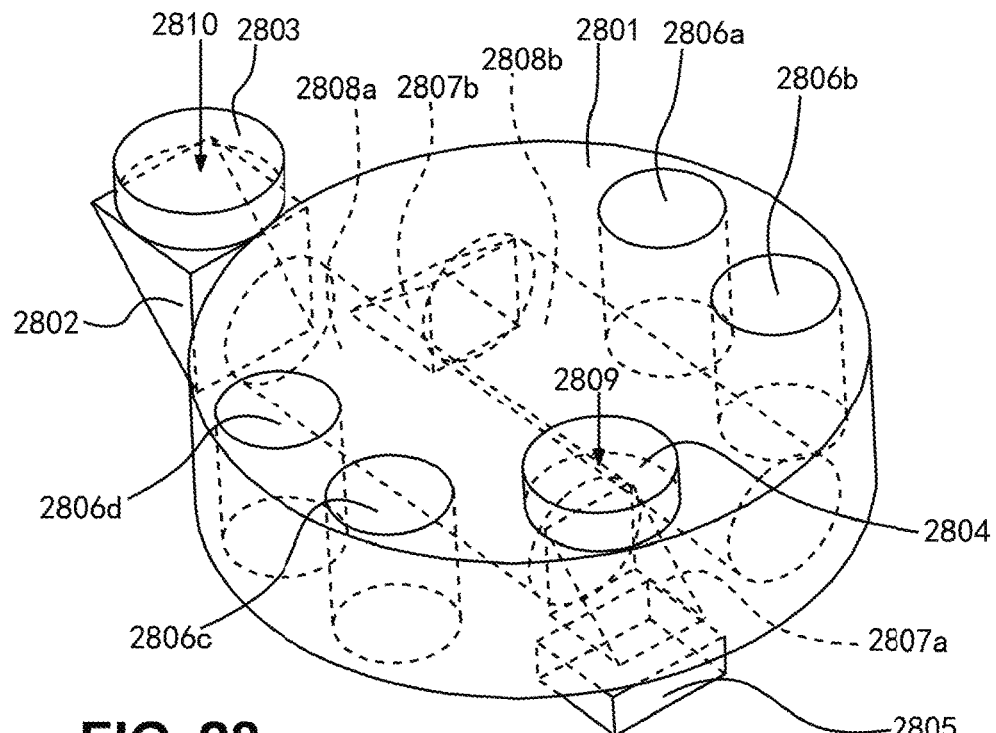
FIG. 28 illustrates an optical element tray with a fixed incoming reflector positioned adjacent an outer perimeter of the optical element tray, and two optical channels embedded in the optical element tray according to an embodiment of the present subject matter.

FIG. 28 illustrates another embodiment of the optical element tray including an optical element tray 2801 designed to accommodate optical element combinations with various focal lengths and/or optical effects. The optical element tray 2801 has an incoming reflector 2802 at the outer perimeter of the optical element tray 2801. An optical component 2803 is placed on the incoming reflector 2802. The optical component 2803 can include a camera window, a glass cover, a lens, a stack of lenses, a filter, and/or a stack of filters. Another optical component 2804 is placed on the optical element tray 2801. The optical component 2804 is aligned with an imaging element 2805. The optical component 2804 can include a camera window, a glass cover, lens, a stack of lenses, a filter, and/or a stack of filters. When the optical element tray 2801 rotates, the incoming reflector 2802, the optical component 2803 and 2804 and the imaging element 2805 stay in fixed positions relative to each other and do not rotate with the optical element tray 2801. In one embodiment, the device incorporating the optical element tray 2801 has two light entries. The first light entry 2809 lines up with the imaging element 2805. When the optical element tray 2801 is rotated to a desired position, one of the optical window openings 2806a, 2806b, 2806c or 2806d is aligned with the light entry 2809. Light travels through the optical component 2804 and one of the optical window openings 2806a-2806d, and then projects on the imaging element 2805. A second light entry 2810 aligns with the incoming reflectors 2802. When the optical element tray 2801 is rotated to a desired position, the outgoing reflector 2807a is aligned with the imaging element 2805, and the optical channel 2808a is used as part of the optical path. Light travels through the optical component 2803 and the incoming reflector 2802, and is then redirected to the optical channel 2808a and travels through the optical channel 2808a including lens(es) and/or other optical device(s) (if any) that may be in the optical channel 2808a before reaching the outgoing reflector 2807a. The outgoing reflector 2807a redirects the light to the imaging element 2805 placed under the optical element tray 2801. Likewise, if the optical element tray 2801 is rotated to align an outgoing reflector 2807b with the imaging element 2805, the optical channel 2808b is aligned with the incoming reflector 2802, and the light travels through the optical channel 2808b to reach the outgoing reflector 2807b. Then the outgoing reflector 2807b redirects the light to the imaging element 2805. In addition to or in place of providing various focal lengths, the optical window openings 2806a-2806d and the optical channels 2808a and 2808b may provide various optical effects. Neither of the optical channels 2808a and 2808b passes through the center (e.g., the geometric center or the central axis of rotation) of the optical element tray 2801. Depending on the design of an optical system, the optical component 2803 and the optical component 2804 are optional. One of ordinary skill in the art would recognize that an optical element tray can be designed without the optical component 2803 and/or the optical component 2804.

Figure 29:
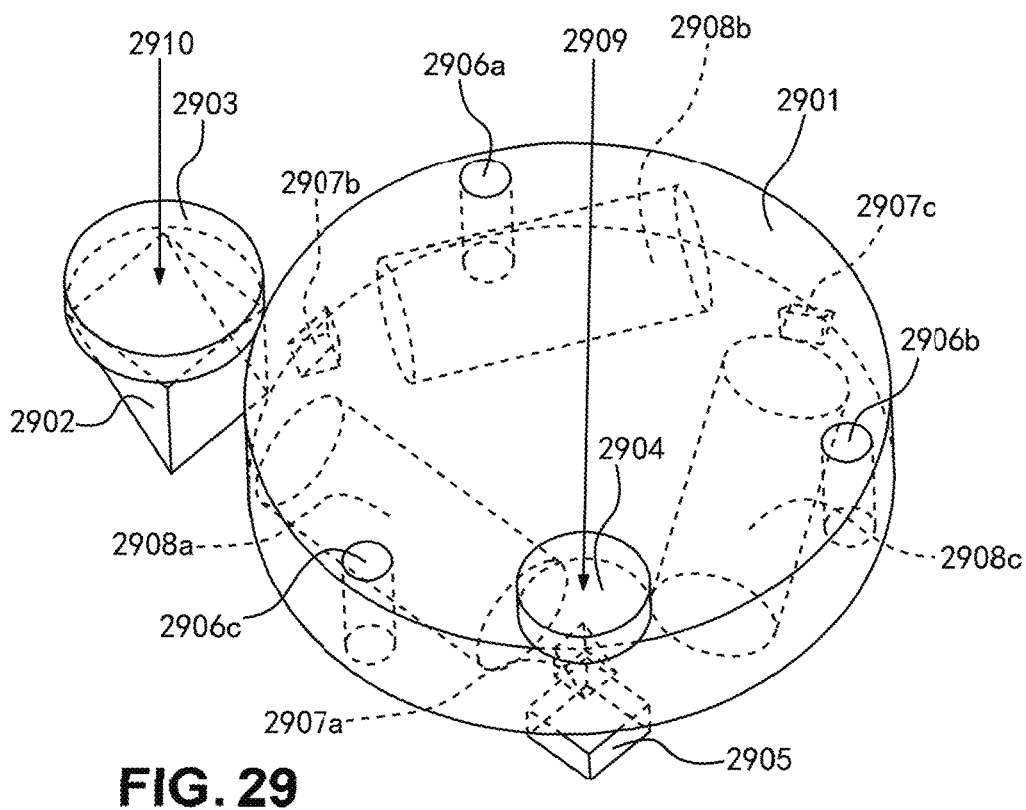
FIG. 29 illustrates an optical element tray with a fixed incoming reflector positioned adjacent an outer perimeter of the optical element tray, and three optical channels embedded in the optical element tray according to an embodiment of the present subject matter.

When the incoming reflector is external to the optical element tray (e.g., adjacent to the optical element tray), there can be multiple optical channels embedded in the optical element tray, as long as each of these optical channels can be aligned with the incoming reflector. FIG. 29 illustrates the example of an optical element tray has three optical channels.

FIG. 29 illustrates another embodiment of the optical element tray including an optical element tray 2901 designed to accommodate optical element combinations with various focal lengths and/or optical effects. The optical element tray of FIG. 29 has an incoming reflector 2902 at the outer perimeter of the optical element tray 2901. An optical component 2903 is placed on the incoming reflector 2902. The optical component 2903 can include a camera window, a glass cover, a lens, a stack of lenses, a filter, and/or a stack of filters. Another optical component 2904 is placed on the optical element tray 2901. The optical component 2904 is aligned with the imaging element 2905. The optical component 2904 can include a camera window, a glass cover, a lens, a stack of lenses, a filter, and/or a stack of filters. When the optical element tray 2901 rotates, the incoming reflector 2902, the optical component 2903, the optical component 2904, and the imaging element 2905 stay in fixed positions relative to each other and do not rotate with the optical element tray 2901. In one embodiment, the device incorporating the optical element tray 2901 has two light entries. A first light entry 2909 lines up with the imaging element 2905. When the optical element tray 2901 is rotated to a desired position, one of the optical window openings 2906a, 2906b, and 2906c is aligned with the light entry 2909. Light travels through the optical component 2904 and one of the optical window openings 2906a-2906c, and then projects on the imaging element 2905. A second light entry 2910 aligns with the incoming reflectors 2902. When the optical element tray 2901 is rotated to a desired position, an outgoing reflector 2907a is aligned with the imaging element 2905, and the optical channel 2908a is used as part of the optical path. Light travels through the optical component 2903 and the incoming reflector 2902, and is then redirected to the optical channel 2908a and travels through the optical channel 2908a including lens(es) and/or other optical device(s) (if any) that may be in the optical channel 2908a before reaching the outgoing reflector 2907a. The outgoing reflector 2907a redirects the light to the imaging element 2905 placed under the optical element tray 2901. Likewise, when the outgoing reflector 2907b is aligned with the imaging element 2905, the optical channel 2908b is aligned with the incoming reflector 2902, and light travels through the optical channel 2908b. Or when the outgoing reflector 2907c is aligned with the imaging element 2905, the optical channel 2908c is aligned with the incoming reflector 2902, and light travels through the optical channel 2908c. In addition to providing various focal lengths, the optical window openings 2906a-2906c and the optical channels 2908a-2908c may also provide various optical effects. None of the optical channels 2908a-2908c passes through the center (e.g., the geometric center or the central axis of rotation) of the optical element tray 2901. Depending on the design of an optical system, the optical component 2903 and the optical component 2904 are optional. One of ordinary skill in the art would recognize that an optical element tray can be designed without the optical component 2903 and/or the optical component 2904.

Figure 30:
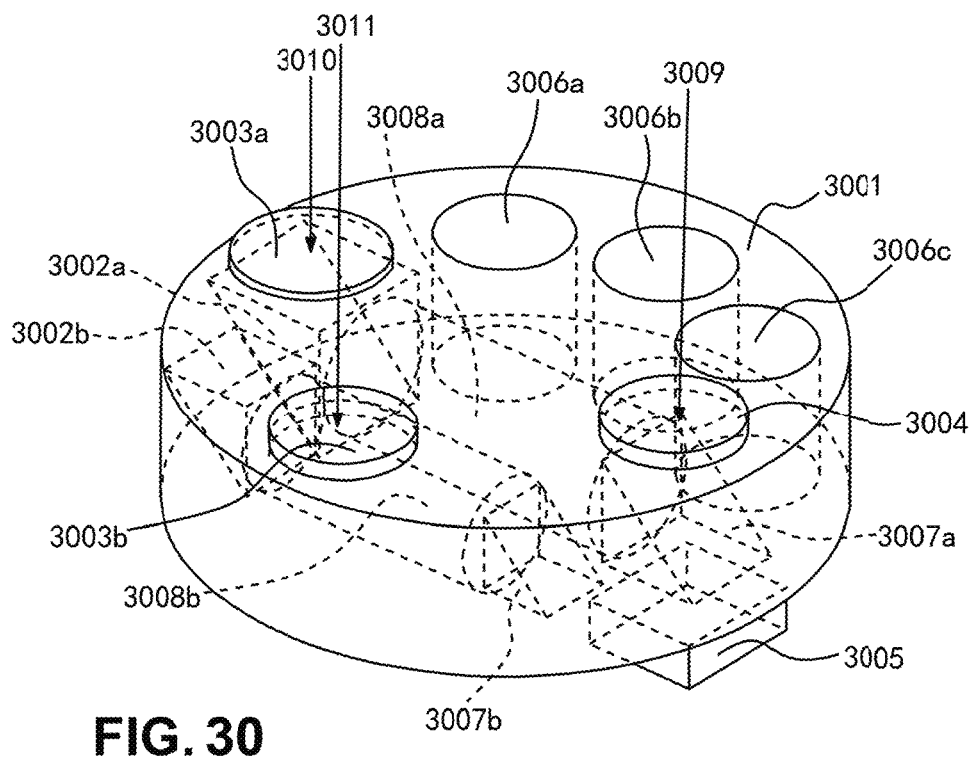
FIG. 30 illustrates an optical element tray with two optical channels embedded in the optical element tray according to an embodiment of the present subject matter.

FIG. 30 illustrates another embodiment of the optical element tray including an optical element tray 3001 designed to accommodate optical element combinations various focal lengths and/or optical effects. The optical element tray 3001 has two incoming reflectors 3002a and 3002b embedded in the optical element tray 3001. Optical component 3003a, optical component 3003b, and optical component 3004 are placed on the optical element tray 3001. The optical component 3004 is aligned with the imaging element 3005. The optical components 3003a, 3003b, and 3004 can each include a camera window, a glass cover, a lens, a stack of lenses, a filter, and/or a stack of filters. When the optical element tray 3001 rotates, the optical components 3003a, 3003b, and 3004 and the imaging element 3005 stay in fixed positions relative to each other and do not rotate with the optical element tray 3001. In one embodiment, the device incorporating the optical element tray 3001 has three light entries. A first light entry 3009 lines up with the imaging element 3005. When the optical element tray 3001 is rotated to a desired position, one of the optical window openings 3006a, 3006b, and 3006c is aligned with the light entry 3009. Light travels through the optical component 3004 and one of the optical window openings 3006a-3006c, and then projects on the imaging element 3005. When the optical element tray 3001 is rotated to a desired position, the incoming reflectors 3002a is aligned with the second light entry 3010, the outgoing reflector 3007a is aligned with the imaging element 3005, and the optical channel 3008a is used as part of the optical path. Light travels through the optical component 3003a and the incoming reflector 3002a, and is then redirected to the optical channel 3008a and travels through the optical channel 3008a including lens(es) and/or optical device(s) (if any) that may be in the optical channel 3008a before reaching an outgoing reflector 3007a. The outgoing reflector 3007a redirects the light to the imaging element 3005 placed under the optical element tray 3001. When the optical element tray 3001 is rotated to another desired position, the incoming reflectors 3002b is aligned with the second light entry 3011, the outgoing reflector 3007b is aligned with the imaging element 3005, and the optical channel 3008b is used as part of the optical path. Light travels through the optical component 3003b and the incoming reflector 3002b, and is then redirected to the optical channel 3008b and travels through the optical channel 3008b including lens(es) and/or optical device(s) (if any) that may be in the optical channel 3008b before reaching the outgoing reflector 3007b. The outgoing reflector 3007b redirects the light to the imaging element 3005. In addition to or in place of providing various focal lengths, the optical window openings 3006a-3006c and the optical channels 3008a and 3008b may provide various optical effects. The optical channel 3008a and 3008b are not necessary in parallel. The placements of optical channels can be determined to better utilize the space inside the optical element tray 3001 to obtain desired optical effects and/or focal lengths. In one embodiment, the optical channel 3008a passes through the center (e.g., the geometric center or the central axis of rotation) of the optical element tray 3001, while the optical channel 3008b does not pass through this center of the optical element tray 3001. Depending on the design of an optical system, the optical component 3003a, 3003b, and 3004 are optional. One of ordinary skill in the art would recognize that an optical element tray can be designed without the optical component 3003a, 3003b, and/or 3004.

Figure 31:
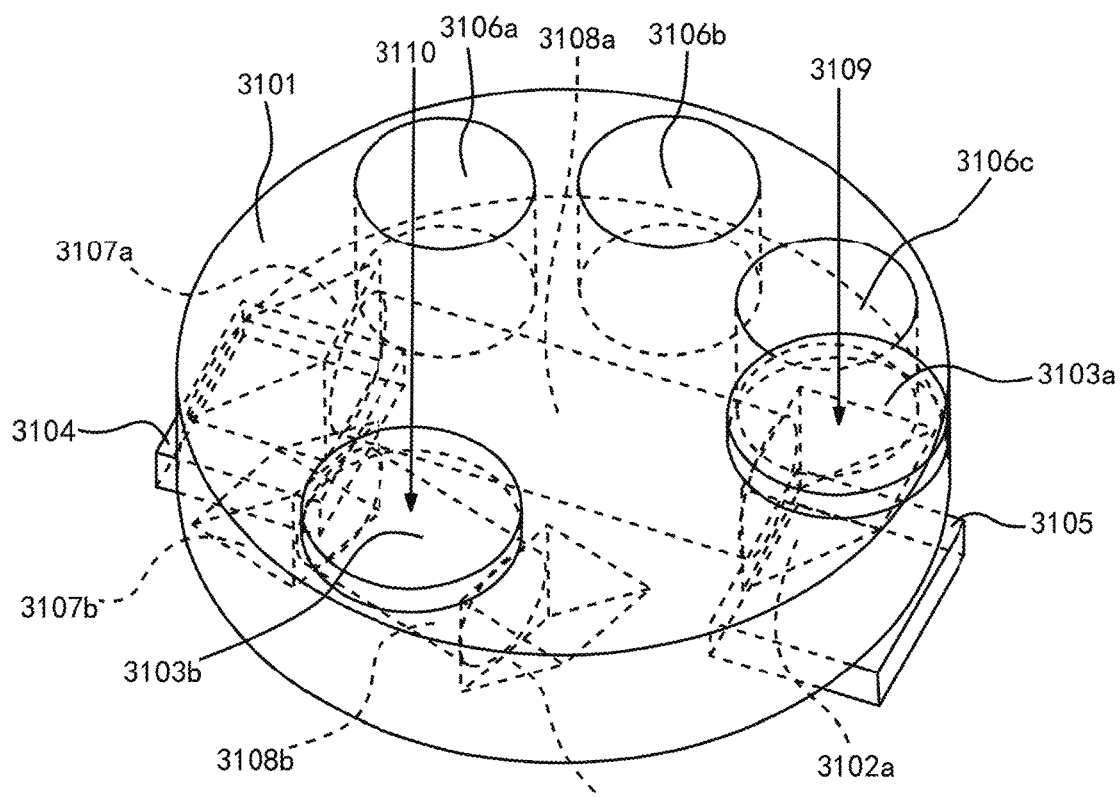
FIG. 31 illustrates an optical element tray using imaging elements with two optical channels embedded in the optical element tray according to an embodiment of the present subject matter.

FIG. 31 illustrates another embodiment of the optical element tray including an optical element tray 3101 designed to accommodate optical element combinations with various focal lengths and/or optical effects. Two incoming reflectors 3102a and 3102b are embedded in the optical element tray 3101. An optical component 3103a and an optical component 3103b are placed on the optical element tray 3101. The optical component 3103a is aligned with the imaging element 3105. The optical components 3103a and 3103b can each include a camera window, a glass cover, a lens, a stack of lenses, a filter, and/or a stack of filters. When the optical element tray 3101 rotates, the optical components 3103a and 3103b and the imaging elements 3104 and 3105 stay in fixed positions relative to each other and do not rotate with optical element tray 3101. In one embodiment, the device incorporating the optical element tray 3101 has two light entries. A first light entry 3109 lines up with the imaging element 3105. When the optical element tray 3101 is rotated to a desired position, one of the optical window openings 3106a, 3106b or 3106c is aligned with the light entry 3109. Light travels through the optical component 3103a, and one of the optical window openings 3106a-3106c, and then projects on the imaging element 3105. When the optical element tray 3101 is rotated to a desired position, the incoming reflectors 3102a is aligned with the light entry 3109, the outgoing reflector 3107a is aligned with the imaging element 3104, and the optical channel 3108a is used as part of the optical path. Light travels through the optical component 3103a and the incoming reflector 3102a, and is then redirected to the optical channel 3108a and travels through the optical channel 3108a including lens(es) and/or other optical device(s) (if any) that may be in the optical channel 3108a before reaching the outgoing reflector 3107a. The outgoing reflector 3107a redirects the light to the imaging element 3104 placed under the optical element tray 3101. When the optical element tray 3101 is rotated to another desired position, the incoming reflectors 3102b is aligned with the light entry 3110 as well as the optical component 3103b, the outgoing reflector 3107b is aligned with the imaging element 3104, and the optical channel 3108b is used as part of the optical path. Light travels through the optical component 3103b and the incoming reflector 3102b, and is then redirected to the optical channel 3108b and travels through the optical channel 3108b including lens(es) and/or other optical device(s) (if any) that may be in the optical channel 3108b before reaching the outgoing reflector 3107b. The outgoing reflector 3107b redirects the light to the imaging element 3104. In addition to or in place of providing various focal lengths, the optical window openings 3106a-3106c and the optical channels 3108a and 3108b may provide various optical effects. In one embodiment, the optical channel 3108a passes through the center (e.g., the geometric center or the central axis of rotation) of the optical element tray 3001, while the optical channel 3108b does not pass through this center of the optical element tray 3001. Depending on the design of an optical system, the optical component 3103a and 3103b are optional. One of ordinary skill in the art would recognize that an optical element tray can be designed without the optical component 3103a and/or 3103b.

Figure 32:
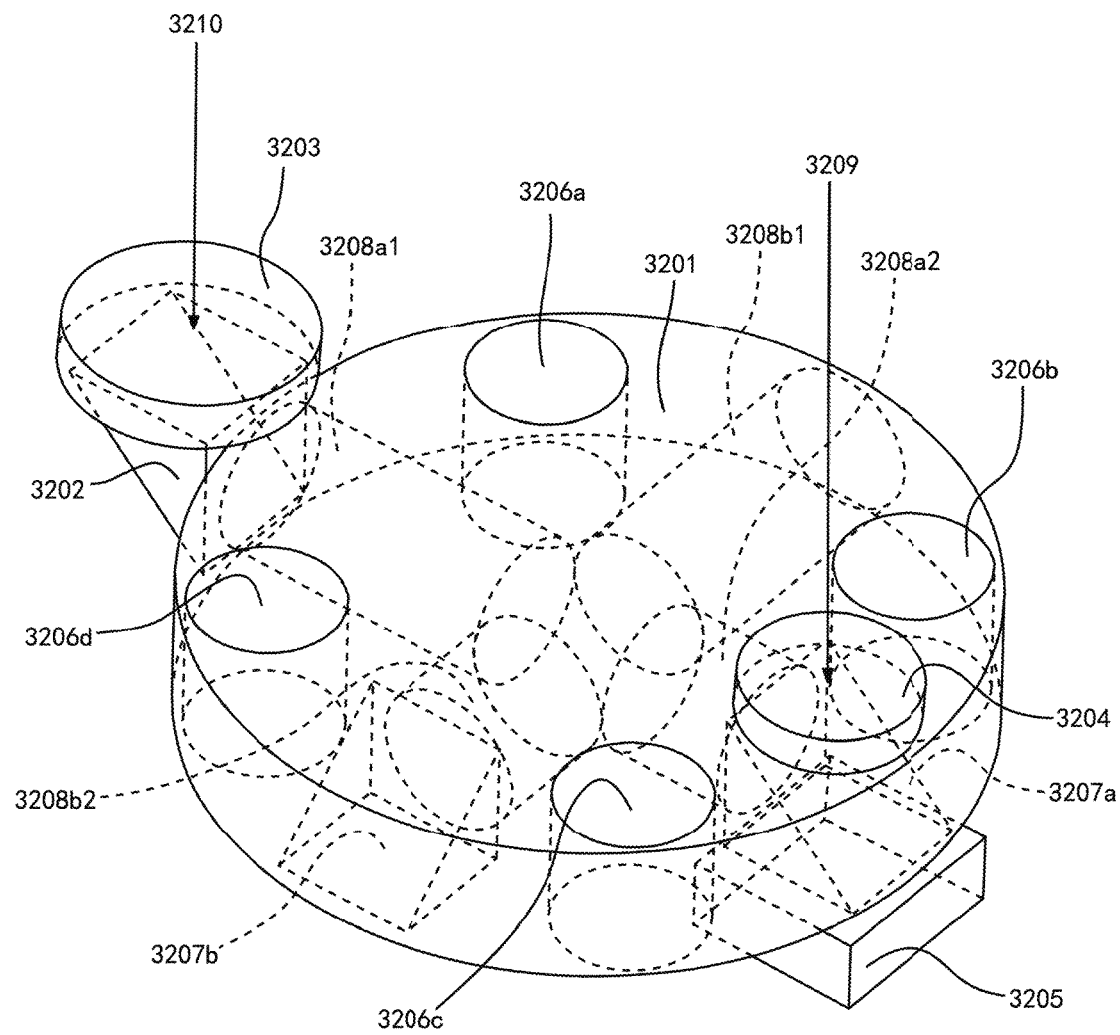
FIG. 32 illustrates an optical element tray with a fixed incoming reflector positioned adjacent an outer perimeter of the optical element tray, and multiple pairs of optical channels arranged around the geometric center of the optical element tray according to an embodiment of the present subject matter.

FIG. 32 illustrates another embodiment of the optical element tray including an optical element tray 3201 designed to accommodate optical element combinations with various focal lengths and/or optical effects. An incoming reflector 3202 is placed at the outer perimeter of the optical element tray 3201. An optical component 3203 is placed on the incoming reflector 3202. The optical component 3203 can include a camera window, a glass cover, a lens, a stack of lenses, a filter, and/or a stack of filters. Another optical component 3204 is placed on the optical element tray 3201. The optical component 3204 is aligned with an imaging element 3205. The optical component 3204 can include a camera window, a glass cover, a lens, a stack of lenses, a filter, and/or a stack of filters. When the optical element tray 3201 rotates, the incoming reflector 3202, the optical component 3203, the optical component 3204, and the imaging element 3205 stay in fixed positions relative to each other and do not rotate with the optical element tray 3201. In one embodiment, the device incorporating the optical element tray 3201 has two light entries. A first light entry 3209 lines up with the imaging element 3205. When the optical element tray 3201 is rotated to a desired position, one of the optical window openings 3206a, 3206b, 3206c, and 3206d is aligned with the light entry 3209. Light travels through the optical component 3204 and one of the optical window openings 3206a-3206d, and then projects on the imaging element 3205. A second light entry 3210 aligns with the incoming reflectors 3202. When the optical element tray 3201 is rotated to a desired position, the outgoing reflector 3207a is aligned with the imaging element 3205, and the group of optical channels 3208a1 and 3208a2 are used as part of the optical path. The optical channel 3208a1 and optical channel 3208a2 are aligned. Light travels through the optical component 3203 and the incoming reflector 3202, and is redirected to the optical channels 3208a1 and 3208a2 and travels through the optical channels 3208a1 and 3208a2 including lens(es) and/or other optical device(s) (if any) that may be in the optical channels 3208a1 and 3208a2 before reaching the outgoing reflector 3207a. The outgoing reflector 3207a redirects the light to the imaging element 3205 placed under the optical element tray 3201. Likewise, if the optical element tray 3201 is rotated to align the outgoing reflector 3207b with the imaging element 3205, the optical channels 3208b1 and 3208b2 are aligned with the incoming reflector 3202, and light travels through the optical channels 3208b1 and 3208b2 including lens(es) and/or other optical device(s) (if any) that may be in the optical channels 3208a1 and 3208a2 before reaching the outgoing reflector 3207b. Then the outgoing reflector 3207b redirects the light to the imaging element 3205. In addition to or in place of providing different focal lengths, the optical window openings 3206a-3206d, the optical channels 3208a1-3208a2, and the optical channels 3208b1-3208b2 may provide various optical effects. Depending on whether the incoming reflector 3202 is aligned with the center (e.g., the geometric center or the central axis of rotation) of the optical element tray 3201, the optical path including the optical channels 3208a1-3208a2 can either pass through the center of the optical element tray 3201 or do not pass the center of the optical element tray 3201, and likewise, the optical path including the optical channels 3208b1-3208b2 can either pass through the center of the optical element tray 3201 or do not pass the center of the optical element tray 3201. Depending on the design of an optical system, the optical components 3203 and 3204 are optional. One of ordinary skill in the art would recognize that an optical element tray can be designed without the optical components 3203 and/or 3204.

Figure 33:
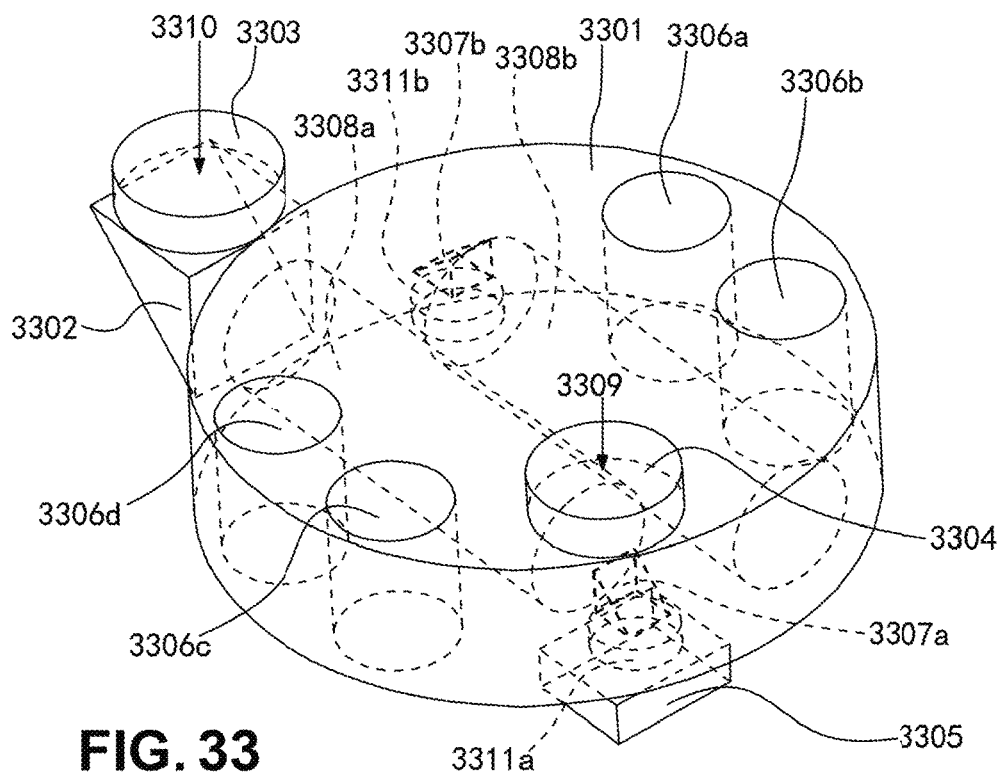
FIG. 33 illustrates an optical element tray with a fixed incoming reflector positioned adjacent an outer perimeter of the optical element tray, and two optical channels embedded in the optical element tray according to an embodiment of the present subject matter.

FIG. 33 illustrates another embodiment of the optical element tray including an optical element tray 3301 designed to accommodate optical element combinations with various focal lengths and/or optical effects. The optical element tray 3301 is similar to the optical element tray 2801, but includes an optical element 3311a placed under an outgoing reflector 3307a and an optical element 3311b placed under an outgoing reflector 3307b. The optical component 3311a and the optical component 3311b can each include a glass cover, a lens, a stack of lenses, a filter, and/or a stack of filters. The optical element tray 3301 has an incoming reflector 3302 at the outer perimeter of the optical element tray 3301. An optical component 3303 is placed on the incoming reflector 3302. The optical component 3303 can include a camera window, a glass cover, a lens, a stack of lenses, a filter, and/or a stack of filters. Another optical component 3304 is placed on the optical element tray 3301. The optical component 3304 is aligned with an imaging element 3305. The optical component 3304 can include a camera window, a glass cover, lens, a stack of lenses, a filter, and/or a stack of filters. When the optical element tray 3301 rotates, the incoming reflector 3302, the optical component 3303 and 3304 and the imaging element 3305 stay in fixed positions relative to each other and do not rotate with the optical element tray 3301. In one embodiment, the device incorporating the optical element tray 3301 has two light entries. The first light entry 3309 lines up with the imaging element 3305. When the optical element tray 3301 is rotated to a desired position, one of the optical window openings 3306a, 3306b, 3306c or 3306d is aligned with the light entry 3309. Light travels through the optical component 3304 and one of the optical window openings 3306a-3306d, and then projects on the imaging element 3305. A second light entry 3310 aligns with the incoming reflectors 3302. When the optical element tray 3301 is rotated to a desired position, the outgoing reflector 3307a is aligned with the imaging element 3305, and the optical channel 3308a is used as part of the optical path. Light travels through the optical component 3303 and the incoming reflector 3302, and is then redirected to the optical channel 3308a and travels through the optical channel 3308a including lens(es) and/or other optical device(s) (if any) that may be in the optical channel 3308a before reaching the outgoing reflector 3307a. The outgoing reflector 3307a redirects the light to the optical element 3311a. After travelling through the optical element 3311a, the light reaches the imaging element 3305 placed under the optical element tray 3301. Likewise, if the optical element tray 3301 is rotated to align an outgoing reflector 3307b with the imaging element 3305, the optical channel 3308b is aligned with the incoming reflector 3302, and the light travels through the optical channel 3308b to reach the outgoing reflector 3307b. Then the outgoing reflector 3307b redirects the light to the optical element 3311b. After travelling through the optical element 3407b, the light reaches the imaging element 3305. In addition to or in place of providing various focal lengths, the optical window openings 3306a-3306d and the optical channels 3308a and 3308b may provide various optical effects. Neither of the optical channels 3308a and 3308b passes through the center (e.g., the geometric center or the central axis of rotation) of the optical element tray 3301. Depending on the design of an optical system, the optical component 3303, the optical component 3304, the optical component 3311a, and the optical component 3311b are optional. One of ordinary skill in the art would recognize that an optical element tray can be designed without the optical component 3303 and/or the optical component 3304.

Figure 34:
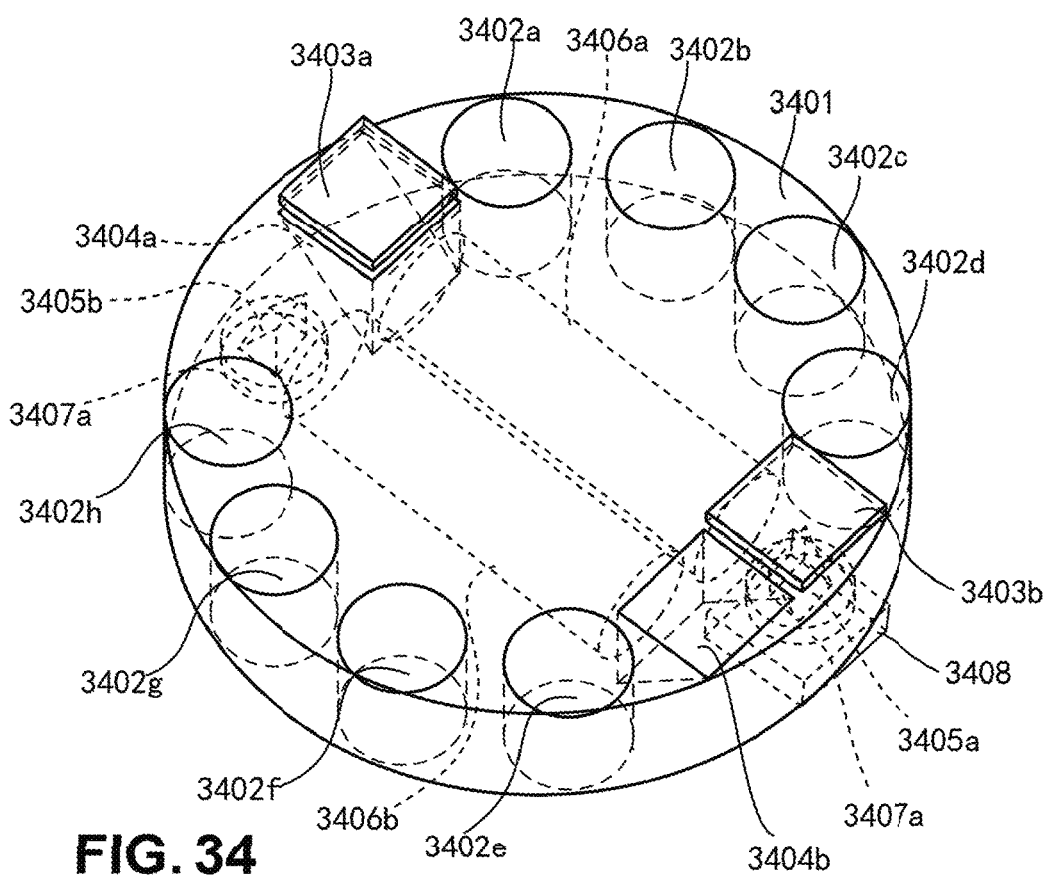
FIG. 34 illustrates an optical element tray with multiple optical channels which do not passing through the geometric center of the optical element tray according to an embodiment of the present subject matter.

FIG. 34 illustrates another embodiment of the optical element tray including an optical element tray 3401 designed to accommodate optical element combinations with different focal lengths and/or optical effects. The optical element tray 3401 is similar to the optical element tray 2301, but includes an optical element 3407a placed under an outgoing reflector 3405a and an optical element 3407b placed an outgoing reflector 3405b. The optical component 3407a and the optical component 3407b can each include a glass cover, a lens, a stack of lenses, a filter, and/or a stack of filters. In one embodiment, two optical components, optical component 3403a and optical component 3403b, are placed on the optical element tray 3401. The optical component 3403a and the optical component 3403b can each include a camera window, a glass cover, a lens, a stack of lenses, a filter, and/or a stack of filters. When the optical element tray 3401 rotates, the optical component 3403a and the optical component 3403b stay in fixed positions relative to each other and do not rotate with the optical element tray 3401. In one embodiment, the device incorporating the optical element tray 3401 has two light entries. A first light entry is the optical component 3403b. When the optical element tray 3401 is rotated to a desired position, one of the optical window openings 3402a, 3402b, 3402c, 3402d, 3402e, 3402f, 3402g, and 3406h is aligned with the optical component 3403b. Light travels through the optical component 3403b and one of the optical window openings 3402a-3402h, and then projects on an imaging element placed under the optical element tray 3401. A second light entry is the optical component 3403a. When the optical element tray 3401 is rotated to a desired position, the incoming reflector 3404a is aligned with the optical component 3403a, and the optical channel 3406a is used as part of the optical path. Light travels through the optical component 3403a and the incoming reflector 3404a, and is then redirected to the optical channel 3406a and travels through the optical channel 3406a including lens(es) and/or other optical device(s) (if any) that may be in the optical channel 3406a before reaching the outgoing reflector 3405a. The outgoing reflector 3405a redirects the light to the optical element 3407a.

After travelling through the optical element 3407a, the light reaches the imaging element 3408 placed under the optical element tray 3401. When the optical element tray 3401 is rotated to align the incoming reflector 3404b with the optical component 3403a, the optical channel 3406b, outgoing reflector 3405b and optical element 3407b are used as part of the optical path. In addition to or in place of providing various focal lengths, the optical window openings 3402a-3402h and the optical channels 3406a and 3406b may also provide various types of optical effects. Neither of the optical channels 3406a and 3406b passes through the center (e.g., the geometric center or the central axis of rotation) of the optical element tray 3401. Depending on the design of an optical system, the optical component 3403a, the optical component 3403b, the optical component 3407a, and the optical component 3407b are optional. One of ordinary skill in the art would recognize that an optical element tray can be designed without the optical component 3403a and/or the optical component 3403b.

Figure 35:
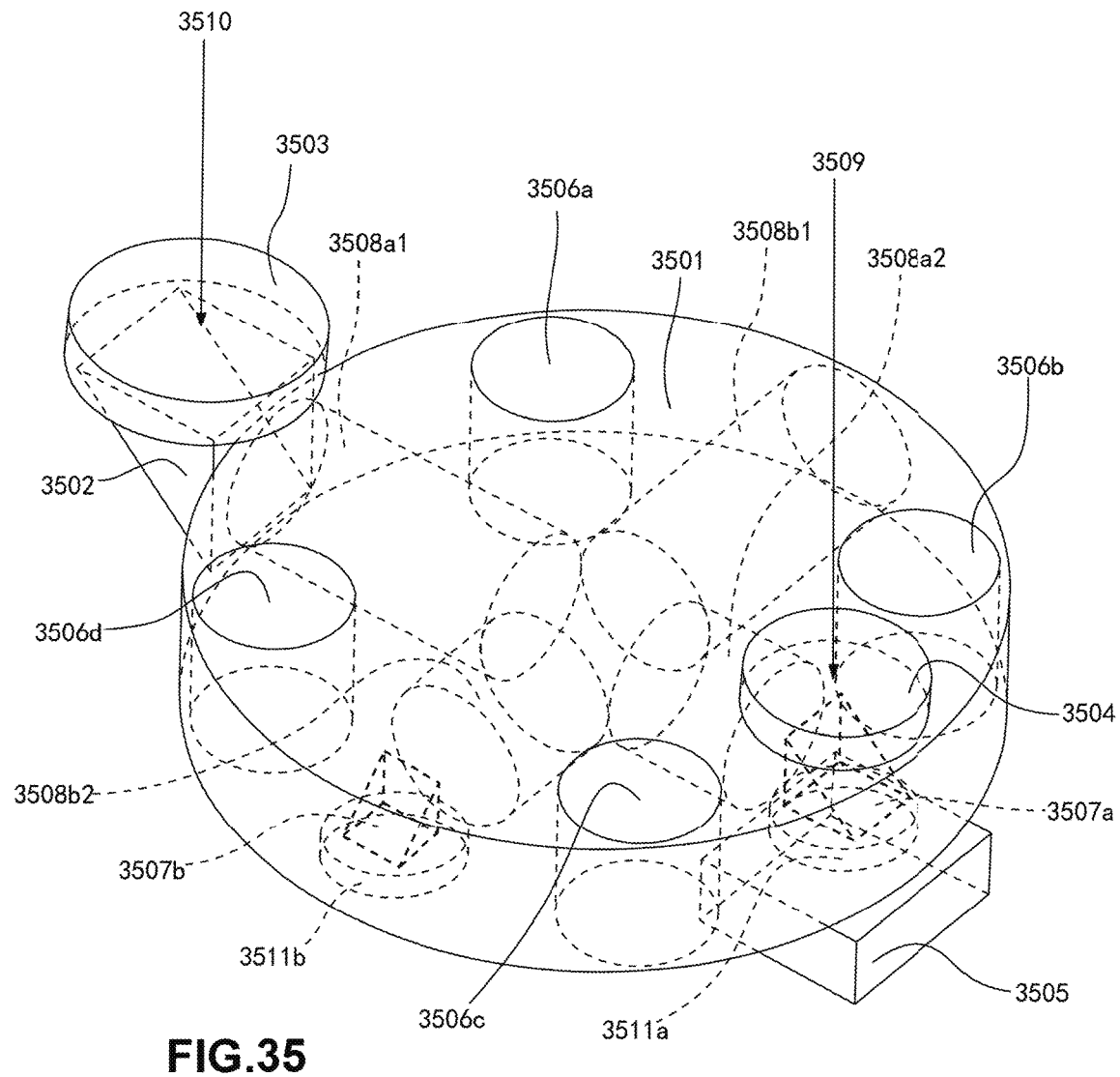
FIG. 35 illustrates an optical element tray with a fixed incoming reflector positioned adjacent an outer perimeter of the optical element tray, and multiple pairs of optical channels arranged around the geometric center of the optical element tray according to an embodiment of the present subject matter.

FIG. 35 illustrates another embodiment of the optical element tray including an optical element tray 3501 designed to accommodate optical element combinations with various focal lengths and/or optical effects. The optical element tray 3501 is similar to the optical element tray 3201, but includes an optical element 3511a placed under an outgoing reflector 3507a and an optical element 3511b placed under an outgoing reflector 3507b. The optical component 3511a and the optical component 3511b can each include a glass cover, a lens, a stack of lenses, a filter, and/or a stack of filters. An incoming reflector 3502 is placed at the outer perimeter of the optical element tray 3501. An optical component 3503 is placed on the incoming reflector 3502. The optical component 3503 can include a camera window, a glass cover, a lens, a stack of lenses, a filter, and/or a stack of filters. Another optical component 3504 is placed on the optical element tray 3501. The optical component 3504 is aligned with an imaging element 3505. The optical component 3504 can include a camera window, a glass cover, a lens, a stack of lenses, a filter, and/or a stack of filters. When the optical element tray 3501 rotates, the incoming reflector 3502, the optical component 3503, the optical component 3504, and the imaging element 3505 stay in fixed positions relative to each other and do not rotate with the optical element tray 3501. In one embodiment, the device incorporating the optical element tray 3501 has two light entries. A first light entry 3509 lines up with the imaging element 3505. When the optical element tray 3501 is rotated to a desired position, one of the optical window openings 3506a, 3506b, 3506c, and 3506d is aligned with the light entry 3509. Light travels through the optical component 3504 and one of the optical window openings 3506a-3506d, and then projects on the imaging element 3505. A second light entry 3510 aligns with the incoming reflectors 3502. When the optical element tray 3501 is rotated to a desired position, the outgoing reflector 3507a is aligned with the imaging element 3505, and the group of optical channels 3508a1 and 3508a2 are used as part of the optical path. The optical channel 3508a1 and optical channel 3508a2 are aligned. Light travels through the optical component 3503 and the incoming reflector 3502, and is redirected to the optical channels 3508a1 and 3508a2 and travels through the optical channels 3508a1 and 3508a2 including lens(es) and/or other optical device(s) (if any) that may be in the optical channels 3508a1 and 3508a2 before reaching the outgoing reflector 3507a. The outgoing reflector 3507a redirects the light to the optical element 3511a. After travelling through the optical element 3511a, the light reaches the imaging element 3505 placed under the optical element tray 3501. Likewise, if the optical element tray 3501 is rotated to align the outgoing reflector 3507b with the imaging element 3505, the optical channels 3508b1 and 3508b2 are aligned with the incoming reflector 3502, and light travels through the optical channels 3508b1 and 3508b2 including lens(es) and/or other optical device(s) (if any) that may be in the optical channels 3508a1 and 3508a2 before reaching the outgoing reflector 3507b. Then the outgoing reflector 3507b redirects the light to the optical element 3511b. After travelling through the optical element 3511b, the light reaches the imaging element 3505. In addition to or in place of providing different focal lengths, the optical window openings 3506a-3506d, the optical channels 3508a1-3508a2, and the optical channels 3508b1-3508b2 may provide various optical effects. Depending on whether the incoming reflector 3502 is aligned with the center (e.g., the geometric center or the central axis of rotation) of the optical element tray 3501, the optical path including the optical channels 3508a-3508a2 can either pass through the center of the optical element tray 3501 or do not pass the center of the optical element tray 3501, and likewise, the optical path including the optical channels 3508b1-3508b2 can either pass through the center of the optical element tray 3501 or do not pass the center of the optical element tray 3501. Depending on the design of an optical system, the optical components 3503, the optical components 3504, the optical component 3511a, and the optical component 3511b are optional. One of ordinary skill in the art would recognize that an optical element tray can be designed without the optical components 3503 and/or 3504.

In various embodiments, when an outgoing reflector is used in front of an imaging element, the distance between the last optical element in an optical channel and the imaging element can be greater than the size of the outgoing reflector. Such circumstances may require the placement of an optical element in front of the imaging element (i.e., between the outgoing reflector and the imaging element when the outgoing reflector and the imaging element are aligned for capturing an image). The optical component 3311a, 3311b, 3407a, 3407b, 3511a, and 3511b as discussed above with reference to FIGS. 33-35 are examples rather than restrictions) for such an optical element. In various embodiments, such as in the various embodiments illustrated in each of FIGS. 14-17, 19, 20, and 22-32, such an optical element can be placed in front of an imaging element (e.g., between the outgoing reflector and the imaging element when the outgoing reflector and the imaging element are aligned for capturing an image) whenever necessary or appropriate under applicable design considerations.

Figure 36:
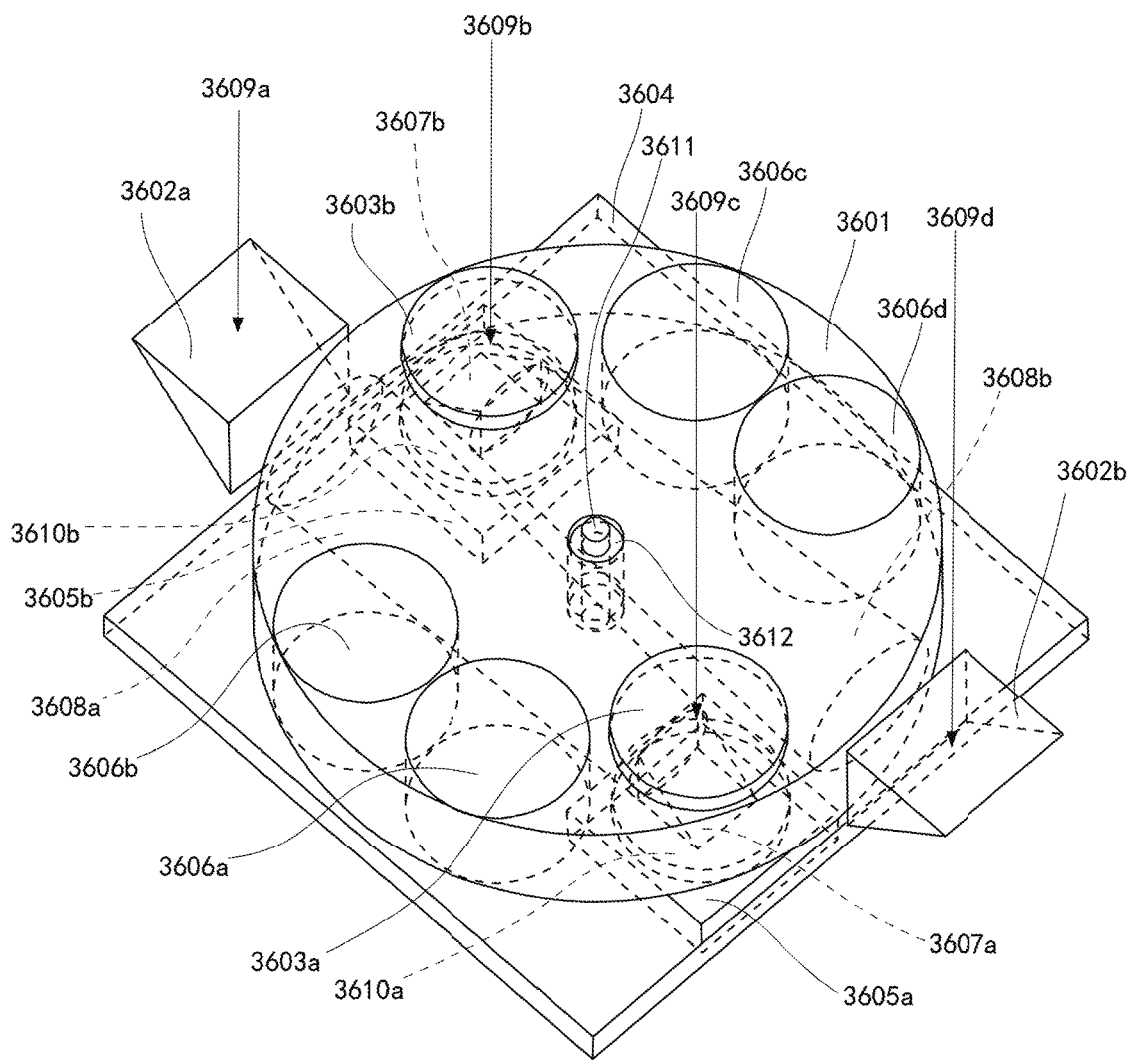
FIG. 36 illustrates an optical element tray that accommodates various optical element combinations and variable focal lengths for multiple imaging elements according to an embodiment of the present subject matter.

FIG. 36 illustrates another embodiment of the optical element tray including an optical element tray 3601 designed to accommodate optical element combinations providing for various focal lengths and/or optical effects and to accommodate two imaging elements 3605a and 3605b. The illustrated embodiment includes four light entries 3609a, 3609b, 3609c, and 3609d. The light entry 3609a is aligned with an incoming reflector 3602a. The light entry 3609d is aligned with an incoming reflector 3602b. The light entry 3609b is aligned with an optical component 3603b. The light entry 3609c is aligned with an optical component 3603a. The optical component 3603a and the optical component 3603b can each include a camera window, a glass cover, a lens, a stack of lenses, a filter, and/or a stack of filters. The incoming reflectors 3602a and 3602b are external to the optical element tray 3601, such as placed adjacent to the outer perimeter of the optical element tray 3601. When the optical element tray 3601 rotates, the optical component 3610*a* and the optical component 3610*b* rotate with the optical element tray 3601, while the incoming reflector 3602*a*, the incoming reflector 3602*b*, the optical component 3603*a*, the optical component 3603*b*, a base 3604, the imaging element 3605*a*, and the imaging element 3605*b* stay in fixed positions relative to each other and do not rotate with the optical element tray 3601.

As the optical element tray 3601 is rotated to various positions for taking images, a pair of optical window openings or a pair of optical channels can be aligned with the imaging element 3605*a* and the imaging element 3605*b*. When optical channel 3608*a* is aligned with one of the imaging elements 3605*a* and 3605*b*, an optical channel 3608*b* is aligned with the other of the imaging elements 3605*a* and 3605*b*, such that optical channel 3608*a* and optical channel 3608*b* are called a pair of optical channels. Likewise, the optical window openings 3606*a* and the window opening 3606*c* are called a pair of optical window opening, and the window opening 3606*b* and the window opening 3606*d* are called a pair of optical window openings. When the optical element tray 3601 is rotated to a desired position, one pair of the optical window openings 3606*a* and 3606*c*, or 3606*b* and 3606*d*, is aligned with the light entries 3609*b* and 3609*c*. Light travels separately through the optical components 3603*a* and 3603*b* and a pair of the optical window openings 3606*a* and 3606*c* (or 3606*b* and 3606*d*), and then projects separately on the imaging element 3605*a* and the imaging element 3605*b*. When the optical element tray 3601 is rotated to another desired position, the pair of optical channels 3608*a* and 3608*b* is aligned with the incoming reflectors 3602*a* and 3602*b*, while the outgoing reflectors 3607*a* and 3607*b* are aligned with the imaging elements 3605*a* and 3605*b*, respectively. Light travels through the incoming reflector 3602*a*, and is redirected to the optical channel 3608*a* and travels through the optical channel 3608*a* including one or more lenses and/or one or more other optical devices (if any) that may be in the optical channel 3608*a* before reaching the outgoing reflector 3607*a*. The outgoing reflector 3607*a* redirects the light to the optical element 3610*a*. After travelling through the optical element 3610*a*, the light reaches the imaging element 3605*a* placed under the optical element tray 3601. Likewise, light travels through the incoming reflector 3602*b*, and is redirected to the optical channel 3608*b* and travels through the optical channel 3608*b* including one or more lenses and/or one or more other optical devices (if any) that may be in the optical channel 3608*b* before reaching the outgoing reflector 3607*b*. The outgoing reflector 3607*b* redirects the light to the optical element 3610*b*. After travelling through the optical element 3610*b*, the light reaches the imaging element 3605*b* placed under the optical element tray 3601. The optical element 3610*b* and the optical element 3610*b* can each be a glass cover, a lens, a stack of lenses, a filter, and/or a stack of filters. In addition to or in place of providing different focal lengths, the optical window openings 3606*a*-3606*d*, the optical channels 3608*a* and 3608*b* may provide same or various optical effects. Depending on the design of an optical system, the optical components 3603*a*, the optical components 3603*b*, the optical component 3610*a*, and the optical component 3610*b* are optional. One of ordinary skill in the art would recognize that an optical element tray can be designed without the optical components 3603*a*, 3603*b*, 3610*a*, and/or 3610*b*.

As illustrated in FIG. 36 and discussed by way of example, but not by way of restriction, an optical window opening is paired with another window opening, an optical channel is paired with another optical channel, and the imaging elements 3605*a* and 3605*b* are symmetrical about the central axis of rotation of the optical element tray 3601. Such an arrangement is not to be understood as limiting in various embodiments. In various embodiments, depending on various design considerations, the relative positions of the optical window openings, the optical channels, and/or the imaging elements may vary, each optical window opening can be paired with either another optical window opening or an optical channel, each optical channel can be paired with either another optical channel or an optical window opening, and the imaging elements can be symmetric or asymmetric about the central axis of rotation of the optical element tray.

As illustrated in FIG. 36 and discussed by way of example, but not by way of restriction, the optical element tray 3601 accommodates the two imaging elements 3605*a* and 3605*b*. In various embodiments, an optical element tray with optical elements arranged as in various embodiments as discussed in this document, or in various combinations of these various embodiments, can accommodate any two or more imaging elements. Using two or more imaging elements in an imaging system such as a camera allow for 3-dimensional (3D) imaging, low light imaging, and computation of high depth of focus, among other things. Using two or more imaging elements can also allow for reduction of the required range of rotation of the optical element tray and hence faster switching between optical paths. While two or more imaging elements are used for these various purposes, each image can be captured by any one or any combination of the two or more imaging elements, depending on the type of the image intended to capture.

In one embodiment, as illustrated in FIG. 36, a guide pole 3611 is provided, with its longitudinal axis parallel to the axis of rotation of the optical element tray 3601 (e.g., with its longitudinal axis aligned to the axis of rotation of the optical element tray 3601 such that the longitudinal axis of the guide pole 3611 and the axis of rotation of the optical element tray 3601 are a common axis). Examples for the guide pole 3611 include a linear piezo motor pole or a guide screw. A slider 3612 is placed around the guide pole 3611, and can slide along the guide pole 3611 back and forth (i.e., displaceable along the axis of rotation of the optical element tray 3601). The optical element tray 3601 rotates about the slider 3612. When the slider 3612 slides along the guide pole 3611, the optical element tray 3601 and the slider 3612 stay in fixed positions relative to each other, such that the optical element tray 3601 slides with the slider 3612. By displacing the slider 3612 along the guide pole 3611, the distance between optical element tray 3601 and the imaging elements 3605*a* and 3605*b* are adjusted, such that the optical element tray 3601 can allow the imaging elements 3605*a* and/or 3605*b* to capture images by focusing on objects at different distances. In various embodiments, the guide pole 3611 can be affixed to the base 3604 or the optical element tray 3601. In one embodiment, the guide pole 3611 is affixed to the optical element tray 3601, such that it rotates with the optical element tray 3601. In such an embodiment, multiple guide poles can be affixed to the optical element tray 3601 at various locations, with their longitudinal axes in parallel, and a slider is placed around each guide pole of the multiple guide poles. The optical element tray 3601 can include a first portion to which the guide pole 3611 is affixed, and a second portion including the slider 3612, the optical window openings, and the optical channels. Alternatively, the optical element tray 3601 can include a first portion including the guide pole 3611, the optical window openings, and the optical channels, and a second portion to which the slider 3612 is affixed. In either way, the slider 3612 can slide along the guide pole 3611 to adjust the distance between optical channels (and/or optical window openings) and the imaging elements. In some embodiments, multiple pair of guide poles and sliders can be distributed in different location of the optical element tray 3601 such that the distance between optical channels (and/or optical window openings) and the imaging elements can be adjusted by coordinating the displacements of the sliders along their corresponding guide poles. While the optical element tray 3601 is illustrated and discussed as an example, the focusing technique as discussed with reference to FIG. 36 can be applied to optical imaging systems with other optical element trays discussed in this document, such as in the various embodiments discussed with reference to FIGS. 14-17, 19, 20, and 22-35.

In one embodiment, the optical element tray 3601 is rotated using permanent magnets and electromagnets (not shown in FIG. 36). For example, permanent magnets can be embedded in the optical element tray 3601, while electromagnets can be placed adjacent to the outer perimeter of the optical element tray 3601. Alternatively, electromagnets can be embedded in the optical element tray 3601, while permanent magnets can be placed adjacent to the outer perimeter of the optical element tray 3601. In either way, the rotation of the optical element tray 3601 can be controlled by adjusting electrical currents flowing through the electromagnets. In other embodiments, the optical element tray 3601 can be rotated using a stepper motor or a piezo motor. While the optical element tray 3601 is illustrated and discussed as an example, the rotation technique as discussed with reference to FIG. 36 can be applied to optical imaging systems with other optical element trays discussed in this document, such as in the various embodiments discussed with reference to FIGS. 14-17, 19, 20, and 22-35.

In various embodiments, the rotation of optical element tray 3601 can be utilized to compensate for shaking, thereby simplifying the design for image stabilization. By rotating the optical element tray 3601 in opposite directions alternately, shaking of the imaging system in the direction tangent to rotation of the optical element tray 3601 can be compensated. To provide for or enhance image stabilization in such manner, instead of mounting the imaging element on a two-directional stabilization platform to implement image stabilization (as implemented in some existing imaging systems), the imaging element is mounted on a one-directional stabilization platform to compensate for the shakes in the direction orthogonal to directions of rotation of the optical element tray 3601.

Figure 37:
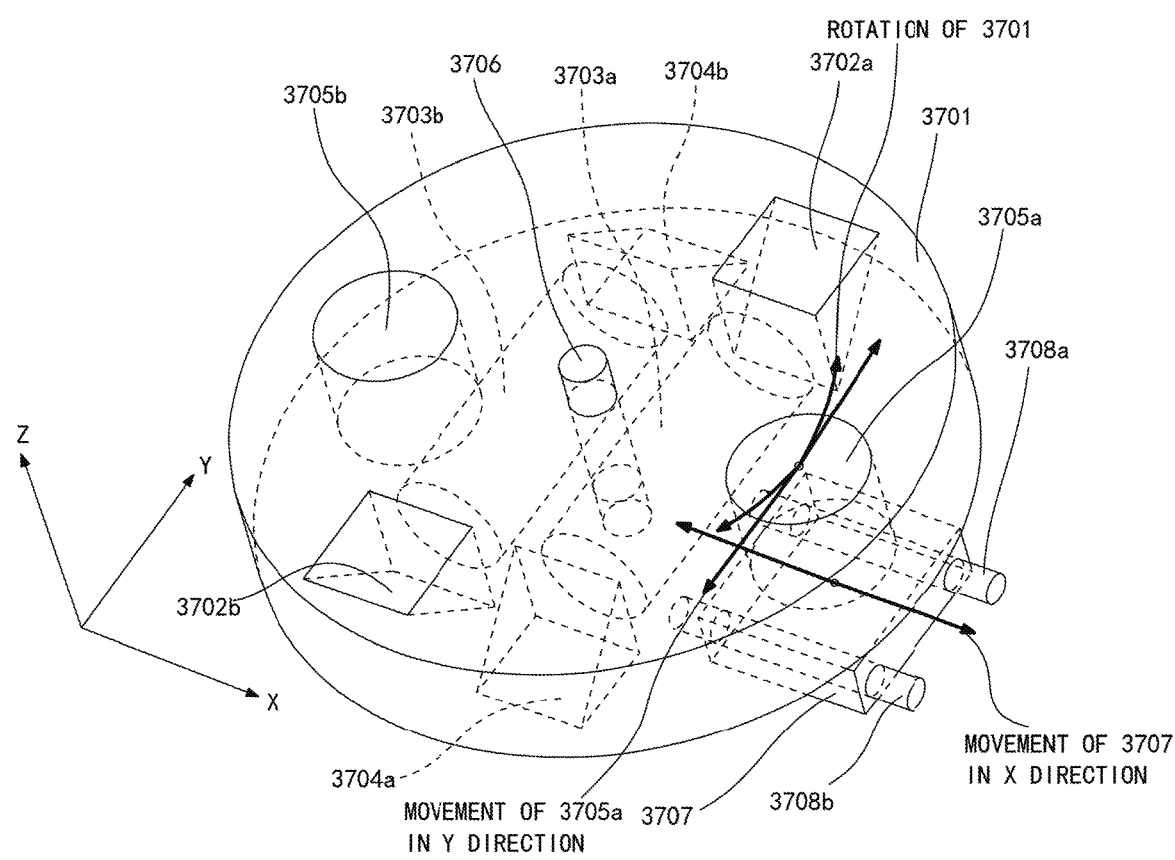
FIG. 37 illustrates an optical element tray including a mechanism that provides for image stabilization according to an embodiment of the present subject matter.

FIG. 37 illustrates another embodiment of the optical element tray including an optical element tray 3701 designed to utilize the rotational mechanism of the optical element tray 3701 for image stabilization. An imaging element 3707 can be driven by a piezo motor (or electromagnets, not shown in FIG. 37) to slide on rails 3708a and 3700. An imaging system such as a camera or other imaging device includes the optical element tray 3701 and a movement sensor (not shown in FIG. 37) to detect the movements of the system. The optical element tray 3701 can rotate about an axial pole 3706 (whose longitudinal axis aligns with the axis of rotation of the optical element tray) to align an optical window opening 3705a or 3705b, or an outgoing reflector 3704a or 3704b, with the imaging element 3707. When a movement of the system is sensed by the movement sensor as movement components in X direction and Y direction (in a Cartesian coordinate system as illustrated in FIG. 37, with Z direction parallel to the axis of rotation of the optical element tray 3701). In response, the imaging element 3707 slides on the rails 3708a and 3708b to compensate the movement in X direction, and the optical element tray 3701 rotates about the pole 3706 to compensate the movement in Y direction, so as to substantially stabilize the image projected on the imaging element 3707. In various embodiments, the displacement of the imaging element 3707 on the rails 3708a and 3708b and/or the rotation of the optical element tray 3701 are driven by one or more motors (such as the motor 1206) and controlled by a motor controller (such as the motor controller 1205).

While a system with the optical element tray 3701, with optical window openings 3705a and 3705B, optical channels 3703a and 3703b, incoming reflectors 3702a and 3702b, and outgoing reflectors 3704a and 3704b, is illustrated in FIG. 37 as an example, the technique of using the rotation of the optical element tray for image stabilization as discussed with reference to FIG. 37 can be used in an imaging system including any optical element tray discussed in this document, including but not limited to each of the optical element trays 101, 1401, 1501, 1601, 1701, 1801, 1901, 2001, 2101, 2201, 2301, 2401, 2501, 2601, 2701, 2801, 2901, 3001, 3101, 3201, 3301, 3401, 3501, and 3601.

While optical elements of circular shape are illustrated in FIGS. 14, 26-33, 35, and 36 as examples, they can have other suitable shapes. In various embodiments, the optical elements (such as the camera window, the glass cover, the lens, the stack of lenses, the filter, and/or the stack of filters as discussed in this document) can each have a circular (round) shape, a square shape, a rectangular shape, an oval shape, a D-shape, an H-shape, or any other suitable shape.

In various embodiments as discussed in this document, a "reflector" can include any optical device capable of redirecting a light (i.e., changing the direction of traveling of the light). Examples of the reflector can include a mirror, a prism, a set of mirrors, a set of prisms, and any combination of one or more mirrors and one or more prisms. In this document, "light" includes an optical signal that is in the form of light and carries information that can be captured by an imaging device. The image device may capture the information in the form of, for example, static and/or dynamic visual images such as photographs and video recordings.

In each of optical element trays 2001, 2101, 2201, 3201 and 3501, optical channels designed are aligned in groups of 2004a-2004b, 2104a-2104b-2104c, 2205a1-2205a2, 2205b1-2205b2, 2205c1-2205c2, 3208a1-3208a2, 3208b1-3208b2, 3508a1-3508a2, and 3508b1-3508b2. Optical channels in different groups in the same optical element tray may intersect with each other. In each of these groups of optical channels, it is not necessary that all optical channels contain optical elements such as lens, lens stack, aperture, and/or optical filter. For example, in the optical channel group 3208a1-3208a2, the optical channel 3208a1 can contain certain optical elements, and the optical channel 3208a2 can be empty (with no optical element). Or, the optical channel 3208a1 can be empty while the optical channel 3208a2 can contain certain optical elements. Alternatively, the optical channels 3208a1 and 3208a2 can both contain certain optical elements. Such possibilities also apply to optical channel groups of 2004a-2004b, 2104a-2104b-2104c, 2205a1-2205a2, 2205b1-2205b2, 2205c1-2205c2, 3208b1-3208b2, and 3508b1-3508b2. When an optical channel is empty, light can travel through it without being altered.

In various embodiments, focusing on an imaging element with an entire optical element tray may be accomplished by using a liquid lens, moving the imaging element, moving a focusing lens, moving an individual lens or a single stack of lenses, or moving the entire optical element tray. One of ordinary skill in the art would recognize that when an optical channel is aligned to the imaging element, focusing on the imaging element may be accomplished by using a liquid lens, moving the optical channel in the optical element tray parallel or perpendicularly to the optic axis of such optical channel, or just moving a focusing lens contained in such optical channel and such movements can be accomplished by using voice coil motor, a guide screw, etc.

While as discussed in this document as examples, the movements or the rotations of the optical element tray can be accomplished by using motor, one of ordinary skill in the art would recognize the movements or the rotations of the optical element tray can also be accomplished manually, which even simplifies the design of the device incorporating the optical element tray. When the optical element tray is moved by motor, such optical element tray can have gear teeth integrated, such that the motor can drive the optical element tray with gears. The optical element tray can also be driven by a motor that is integrated into the optical element tray.

While as discussed in this document as examples, the optical channels are parallel to the planar surface of the optical element tray or perpendicular to the central axis of rotation of the optical element tray, one of ordinary skill in the art would recognize that the optical channels can be arranged to be in any suitable directions relative to the planar surface or central axis of rotation of the optical element tray. In various embodiments, the angle between the optical channel and the planar surface of the optical element tray may be greater than zero degree, or the angle between the optical channel and the central axis of rotation of the optical element tray may not equal to 90 degrees. In various embodiments, the optical channels are substantially parallel to the planar surface of the optical element tray or substantially perpendicular to the central axis of rotation of the optical element tray. For example, the angle between the optical channel and the planar surface of the optical element tray may be greater than zero degree but less than 20 degrees, or the angle between the optical channel and the central axis of rotation of the optical element tray may not equal to 90 degrees but within 70 and 110 degrees. Any geometric arrangement of the optical channels in the optical element tray can be made without departing from the spirit and scope of the present invention, as long as the light travels through the optical channel can be ultimately projected on the imaging element.

In various embodiments as discussed in this document, multiple optical paths can share the same imaging element and the same camera window, can also share the same imaging element but use multiple camera windows, or share the same camera window but use multiple imaging elements. Alternatively, the multiple optical paths can use multiple imaging elements and multiple camera windows to realize simultaneous imaging of the multiple optical paths. In other words, more than one optical paths can perform imaging by their respective camera windows and imaging elements to realize functions such as 3D imaging.

Although all the implementations using optical channels in the figures are circular or annular trays, such shapes are not to be understood as limiting. Similar to optical window openings, the optical channels can also be applied to (but not limited to) rectangle, cylindrical ring shape, polygon, or non-regular shapes. When the optical element tray rotates about an axis that is perpendicular to its plane, it is functionally equivalent to a circular tray, as one of ordinary skill in the art would recognize. When the optical element tray is in the cylindrical ring shape, the thickness of the tray refers to the thickness of the ring wall of the cylindrical ring shape, and the optical channels can be located in the ring wall, for example, parallel to the axis of the ring.

In various embodiments as discussed in this document, the optical entrance can be located at the outer wall of the tray, and an incoming reflector can be arranged at the outside of the outer wall of the tray such that the light can be directed into the optical entrance. When the incoming reflector is arranged at the outside of the outer wall of the tray, the incoming reflector is not necessary to face the center of the round tray but can be arranged depending on the optical channels. When the optical channel is not aligned with the circle center, the incoming reflector or the outgoing reflector is not necessary to face the circle center.

In various embodiments as discussed in this document, if there are multiple optical channels inside the optical element tray, the placement of those optical element tray may vary. The optical axes of the optical channels can intersect with each other, extend in parallel (with lights traveling in the same or opposite directions, or symmetric about the axis of rotation of the optical element tray. The placement of the optical channels can be determined to optimally utilize the space inside the optical element tray to obtain desired optical effects and/or focal lengths.

In another embodiment, two or more optical element trays as described above can be combined together so that light passes through the first and second optical element trays before entering the imaging unit. The first and second optical element trays can be combined to achieve longer focal lengths by using two optical element trays with optical channels embedded in them and an intermediate reflector to couple the optical exit of the first optical element tray to the optical entrance of the second optical element tray.

Alternatively, the outgoing reflector of the first optical element tray can be aligned with the incoming reflector of the second optical element tray. One advantage of combining optical element trays containing optical channels in this way is that a single light entry and a single imaging unit can be shared for both long and short focal length combinations. For example, the first optical element tray reflects the light away from the camera window which is aligned with the imaging unit. After the light exits the first optical element tray, it enters the second optical element tray and then is reflected to the position of the image element. The optical exit of the second optical element tray lines up with the imagine element. Whether long focal lengths (through optical channels) or short focal lengths (through optical window openings) are used, the method of align the imaging unit with a single camera window can be employed for both situations.

As illustrated in FIG. 2, FIG. 5, and FIG. 7a-7f, multiple optical element trays can be combined together to achieve a variety of optical effects using optical elements such as filters, lenses, lens stacks, reflectors, optical channels, and empty windows. One of ordinary skill in the art would recognize that any combination of optical element tray shapes, layouts, optical window openings, reflectors, optical channels, or imaging units could be used without departing from the spirit and scope of the present invention. As with the optical element trays described above, the optical channels may house one or more lenses, filters or optical elements arranged to produce the desired focal length. One of ordinary skill in the art would recognize that a variety of combinations of the features described herein is possible and any of the features of any of the optical element trays described herein may be combined with any of the other features without departing from the spirit and scope of the present disclosure.

Traditionally, a computer program consists of a finite sequence of computational instructions or program instructions. It will be appreciated that a programmable apparatus (i.e., computing device can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It is to be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, cloud computing, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present invention are contemplated for use with any language.

In addition to the examples discussed under the SUMMARY section, some non-limiting examples of the present system are provided as follows:

Example 1 includes a system for directing optical signals to an imaging element. The system may include a first optical entrance configured to receive a first optical signal, a second optical entrance configured to receive a second optical signal, and an optical element tray. The optical element tray may include a plurality of optical elements having optical characteristics different from each other. The optical element tray may be configured to be moveable to form an optical path allowing one of the first optical signal and the second optical signal to travel to the imaging element through one or more optical elements of the plurality of optical elements.

In Example 2, the subject matter of Example 1 may optionally be configured such that the optical element tray includes a circular tray having a central axis and configured to be rotated about the central axis. The circular tray includes one or more optical openings each allowing passage of light in a direction substantially parallel to the central axis and one or more optical channels each allowing passage of light in a direction substantially perpendicular to the central axis. The plurality of optical elements includes optical elements each placed in an optical opening of the one or more optical openings or an optical channel of the one or more optical channels.

In Example 3, the subject matter of Example 2 may optionally be configured such that the first optical entrance is positioned to allow alignment with an optical opening of the one or more optical openings to form the optical path being a linear path.

In Example 4, the subject matter of Example 3 may optionally be configured to further include a first reflector and a second reflector. The first reflector is configured and positioned to receive the second optical signal from the second optical entrance and redirect the second optical signal to a selected optical channel of the one or more optical channels. The second reflector is configured and positioned to receive the second optical signal from the selected optical channel and redirect the second optical signal to the imaging element.

In Example 5, the subject matter of Example 4 may optionally be configured such that the first reflector is positioned external to the optical element tray.

In Example 6, the subject matter of Example 4 may optionally be configured such that the first reflector is incorporated into the optical element tray.

In Example 7, the subject matter of any one or any combination of Examples 1 to 6 may optionally be configured such that the first optical entrance, the second optical entrance, and the imaging element are positioned at locations that are fixed relative to each other.

In Example 8, the subject matter of any one or any combination of Examples 2 to 7 may optionally be configured such that the one or more optical channels are positioned to intersect with the central axis.

In Example 9, the subject matter of any one or any combination of Examples 2 to 8 may optionally be configured such that the one or more optical channels include optical channels positioned to intersect with each other.

In Example 10, the subject matter of any one or any combination of Examples 2 to 7 may optionally be configured such that the one or more optical channels include optical channels having optical axes positioned symmetrically about the central axis.

In Example 11, the subject matter of any one or any combination of Examples 1 to 10 may optionally be configured such that the plurality of optical elements includes optical lenses having different focal lengths.

In Example 12, the subject matter of any one or any combination of Examples 1 to 11 may optionally be configured such that the plurality of optical elements includes one or more optical filters.

Example 13 includes an optical imaging system. The optical imaging system may include a first optical entrance configured to receive a first optical signal, a second optical entrance configured to receive a second optical signal, an optical imaging element, a circular optical element tray, and a motor. The optical imaging element may be configured to capture a photographic image. The circular optical element tray may have a central axis and configured to be rotated about the central axis, and may include a plurality of optical elements having optical characteristics different from each other. The optical element tray may be configured to be moveable to form an optical path allowing one of the first optical signal and the second optical signal to travel to the imaging element through one or more optical elements of the plurality of optical elements. The motor may be configured to rotate the optical element tray to a position allowing the optical path to be formed.

In Example 14, the subject matter of Example 13 may optionally be configured to include a camera including the first optical entrance, the second optical entrance, the optical imaging element, the optical element tray, and the motor.

In Example 15, the subject matter of Example 14 may optionally be configured such that the camera includes a digital camera.

In Example 16, the subject matter of Example 15 may optionally be configured to include a cellphone including the digital camera.

In Example 17, the subject matter of any one or any combination of Examples 13 to 16 may optionally be configured such that the optical element tray includes one or more optical openings each allowing passage of light in a direction substantially parallel to the central axis and one or more optical channels each allowing passage of light in a direction substantially perpendicular to the central axis. The plurality of optical elements includes optical elements each placed in an optical opening of the one or more optical openings or an optical channel of the one or more optical channels.

In Example 18, the subject matter of Example 17 may optionally be configured to further include a first reflector and a second reflector. The first reflector is configured and positioned to receive the second optical signal from the second optical entrance and redirect the second optical signal to a selected optical channel of the one or more optical channels. The second reflector is configured and positioned to receive the second optical signal from the selected optical channel and redirect the second optical signal to the imaging element. The motor is configured to rotate the optical element tray to form the optical path selected from one or more linear paths and one or more nonlinear paths. The one or more linear paths are each formed by including the first optical entrance and an optical opening of the one or more optical openings. The one or more nonlinear paths are each formed by including the first reflector, the second reflector, and the selected optical channel.

In Example 19, the subject matter of Example 18 may optionally be configured such that the first optical entrance, the second optical entrance, and the imaging element are positioned at locations that are fixed relative to each other, the first reflector is positioned adjacent to the optical element tray, and the second reflector is incorporated into the optical element tray.

In Example 20, the subject matter of Example 18 may optionally be configured such that the first reflector and the second reflector are incorporated into the optical element tray.

Example 21 includes a system for directing light to an imaging element. The system may include a circular optical element tray, and an outgoing reflector. The circular optical element tray may have a central axis and may be configured to be rotatable about the central axis to a position selected from a plurality of positions each allowing for formation of an optical path directing the light to the imaging element. The optical element tray may include one or more optical openings, one or more optical channels, and a plurality of optical elements. The one or more optical openings may each be positioned to receive the light and allow the light to travel in a direction substantially parallel to the central axis. The one or more optical channels may each be positioned to receive the light and allow the light to travel in a direction substantially perpendicular to the central axis. The optical elements may have optical characteristics different from each other, and may each be placed in an optical opening of the one or more optical openings or an optical channel of the one or more optical channels. The outgoing reflector may be configured to receive the light from an optical opening of the one or more optical openings or an optical channel of the one or more optical channels and to redirect the light towards the imaging element.

In Example 22, the subject matter of Example 21 may optionally be configured to further include a first optical entrance configured to receive the light. An optical opening is selected from the one or more optical openings to receive the light from the first optical entrance, and the optical element tray is configured to be rotatable to a position allowing for formation of an optical path including the first optical entrance and the selected optical opening.

In Example 23, the subject matter of any one or any combination of Examples 21 and 22 may optionally be configured to further include a second optical entrance configured to receive the light and an incoming reflector configured and positioned to receive the light from the second optical entrance and redirect the light to a selected optical channel of the one or more optical channels. The outgoing reflector is configured and positioned to receive the light from the selected optical channel and redirect the light toward the imaging element. The optical element tray is configured to be rotatable to a position allowing for formation of an optical path including the second optical entrance, the incoming reflector, the selected optical channel, and the outgoing reflector.

In Example 24, the subject matter of Example 23 may optionally be configured such that the incoming reflector is external to the optical element tray, and the outgoing reflector is included in the optical element tray.

In Example 25, the subject matter of Example 23 may optionally be configured such that the incoming reflector and the outgoing reflector are included in the optical element tray.

In Example 26, the subject matter of any one or any combination of Examples 23 to 25 may optionally be configured such that the one or more optical channels are each positioned to intersect with the central axis.

In Example 27, the subject matter of any one or any combination of Examples 23 to 26 may optionally be configured such that the one or more optical channels include optical channels positioned to intersect with each other.

In Example 28, the subject matter of any one or any combination of Examples 23 to 25 may optionally be configured such that the one or more optical channels include optical channels having optical axes positioned symmetrically about the central axis.

In Example 9, the subject matter of any one or any combination of Examples 21 to 28 may optionally be configured such that the plurality of optical elements includes optical lenses having different focal lengths.

In Example 30, the subject matter of any one or any combination of Examples 23 to 29 may optionally be configured such that the plurality of optical elements further includes one or more optical filters.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive. The scope of the present subject matter should be determined with reference to the appended claims, along with the full scope of legal equivalents to which such claims are entitled.

What is claimed is:

1. A system for directing optical signals to one or more imaging elements, comprising:
   a first optical entrance configured to receive a first optical signal;
   a second optical entrance configured to receive a second optical signal;
   an optical element tray having a central axis and configured to be rotatable about the central axis to each position selected from a plurality of positions to allow for formation of one or more optical paths each directing an optical signal of the first and second optical signals to an imaging element of the one or more imaging elements, the optical element tray including:

one or more optical window openings each positioned to receive the first optical signal and allow the first optical signal to travel through a selected optical window of the one or more optical windows in a direction substantially parallel to the central axis;

one or more optical channels each positioned to receive the second optical signal and allow the second optical signal to travel in a direction substantially perpendicular to the central axis;

an incoming reflector configured and positioned to receive the second optical signal from the second optical entrance and redirect the second optical signal to a selected optical channel of the one or more optical channels; and an outgoing reflector configured and positioned to receive the second optical signal from the selected optical channel and redirect the second optical signal toward an imaging element of the one or more imaging elements; and a plurality of first optical elements having optical characteristics different from each other, the first optical elements each placed in an optical window opening of the one or more optical window openings or an optical channel of the one or more optical channels, wherein the optical element tray is configured to be rotatable to a position allowing for formation of a first optical path of the one or more optical paths, the first optical path including the first optical entrance and the selected optical window opening, wherein the optical element tray is configured to be rotatable to a position allowing for formation of a second optical path of the one or more optical paths, the second optical path including the second optical entrance, the incoming reflector, the selected optical channel, and the outgoing reflector.

2. The system of claim 1, further comprising one or more second optical elements each placed in front of an imaging element of the one or more imaging elements such that the first optical signal or the second optical signal travels through a second optical element of the one or more second optical elements after travelling through an optical window opening of the one or more optical window openings or an optical channel of the one or more optical channels and before reaching an imaging element of the one or more imaging elements.

3. The system of claim 2, wherein the one or more second optical elements each comprise one or more lenses.

4. The system of claim 2, wherein the one or more second optical elements each comprise one or more filters.

5. The system of claim 1, further comprising:
one or more guide poles each having a longitudinal axis and positioned with the longitudinal axis parallel to the central axis of the optical element tray; and
one or more sliders each placed over a guide pole of the guide poles and configured to displace along that guide pole,
and wherein the optical element tray is affixed to the one or more guide poles or the one or more sliders to allow displacement of the optical element tray along the central axis of rotation of the optical element tray.

6. The system of claim 5, wherein the optical element tray is affixed to the one or more guide poles.

7. The system of claim 5, wherein the optical element tray is affixed to the one or more sliders.

8. The system of claim 1, wherein the one or more imaging elements comprise a plurality of imaging elements.

9. The system of claim 8, wherein the one or more optical window openings and the one or more optical channels are arranged in the optical element tray in a manner allowing the multiple optical signals to be received by multiple imaging elements of the plurality of imaging elements simultaneously.

10. The system of claim 1, wherein the optical element tray is configured for the rotation of the optical element tray to be controlled to compensate for shaking of the system in a direction tangent to a direction of the rotation of the optical element tray.

11. An optical imaging system, comprising:
one or more optical entrances each configured to receive an optical signal of a first optical signal and a second optional signal;
one or more optical imaging elements configured to capture one or more photographic images;
an optical element tray having a central axis and configured to be rotated about the central axis, the optical element tray configured to be moveable to form one or more optical paths each allowing the received optical signal to travel to an imaging element of the one or more imaging elements, the optical element tray including:
one or more optical window openings each configured to receive the first optical signal from an optical entrance of the one or more optical entrances and allow passage of the first optical signal in a direction substantially parallel to the central axis;
one or more optical channels each configured to receive the second optical signal from an optical entrance of the one or more optical entrances and allow passage of the second optical signal in a direction substantially perpendicular to the central axis;
an incoming reflector configured and positioned to receive the second optical signal and redirect the second optical signal to a selected optical channel of the one or more optical channels;
an outgoing reflector configured and positioned to receive the second optical signal from the selected optical channel and redirect the second optical signal toward an optical imaging element of the one or more optical imaging elements; and
a plurality of first optical elements having optical characteristics different from each other and each placed in an optical window opening of the one or more optical window openings or an optical channel of the one or more optical channels; and
a motor configured to rotate the optical element tray to a position of a plurality of positions each allowing the one or more optical paths to be formed.

12. The system of claim 11, comprising a camera including the one or more optical entrances, the one or more optical imaging elements, the optical element tray, and the motor.

13. The system of claim 12, comprising a cellphone including the camera.

14. The system of claim 12, wherein the one or more optical entrances comprise multiple optical entrances, the one or more optical imaging elements comprise multiple optical imaging elements, and the optical element tray is configured to form multiple optical paths of the one or more optical paths.

15. The system of claim 14, wherein the camera is configured to produce a 3-dimensional photographic image.

16. The system of claim 12, further comprising one or more second optical elements, wherein the one or more optical paths include one or more optical paths each allowing the received optical signal to travel to an imaging element of the one or more imaging elements through one or more first optical elements of the plurality of first optical elements and a second optical element of the one or more second optical elements.

17. The system of claim 12, further comprising one or more guide poles each having a longitudinal axis and positioned with the longitudinal axis parallel to the central axis of the optical element tray, and wherein the optical element tray is configured to be displaceable along the one or more guide poles, and the camera is configured to adjust a length of at least one optical path of the one or more optical paths by displacing the optical element tray along the one or more guide poles.

18. The system of claim 12, wherein the camera is configured to sense a movement of the camera and to control the motor to rotate the optical element tray in response to the movement of the camera being sensed to compensate for shaking of the camera in a direction tangent to a direction of the rotation of the optical element tray.

\* \* \* \* \*